US012233413B2

(12) United States Patent
Sarioglu et al.

(10) Patent No.: US 12,233,413 B2
(45) **Date of Patent: *Feb. 25, 2025**

(54) MASSIVELY PARALLEL MICROFLUIDIC CELL ANALYZER FOR HIGH THROUGHPUT MECHANOPHENOTYPING

(71) Applicant: GEORGIA TECH RESEARCH CORPORATION, Atlanta, GA (US)

(72) Inventors: Ali Fatih Sarioglu, Atlanta, GA (US); A K M Arifuzzman, Atlanta, GA (US); Norh A. Asmare, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/117,612

(22) Filed: Mar. 6, 2023

(65) Prior Publication Data

US 2023/0285962 A1 Sep. 14, 2023

Related U.S. Application Data

(63) Continuation of application No. 17/286,003, filed as application No. PCT/US2019/056622 on Oct. 16, 2019, now Pat. No. 11,596,942.

(Continued)

(51) Int. Cl.
*B01L 3/00* (2006.01)

(52) U.S. Cl.
CPC . *B01L 3/502715* (2013.01); *B01L 2300/0645* (2013.01); *B01L 2300/0816* (2013.01);
(Continued)

(58) Field of Classification Search
CPC ....... B01L 3/502715; B01L 2300/0645; B01L 2300/0816; B01L 2300/0864; B01L 2300/0883
See application file for complete search history.

(56) References Cited

U.S. PATENT DOCUMENTS 6,270,641 B1 8/2001 Griffiths et al.
11,596,942 B2 * 3/2023 Sarioglu ........... B01L 3/502761
(Continued)

OTHER PUBLICATIONS

International Search Report and Written Opinion dated Jan. 9, 2020, from International Application No. PCT/US2019/056622, 9 pages.
(Continued)

*Primary Examiner* — Robert J Eom
(74) *Attorney, Agent, or Firm* — Meunier Carlin & Curfman LLC

(57) ABSTRACT

A microfluidic device may include an inlet, an outlet, first and second channels arranged in parallel, a first sensor pair positioned along the first channel, and a second sensor pair positioned along the second channel. The first channel may include a first upstream zone, a first downstream zone, and a first constriction zone. The second channel may include a second upstream zone, a second downstream zone, and a second constriction zone. The first sensor pair may include a first entry sensor configured to detect a first cell flowing through the first upstream zone, and a first exit sensor configured to detect the first cell flowing through the first downstream zone. The second sensor pair may include a second entry sensor configured to detect a second cell flowing through the second upstream zone, and a second exit sensor configured to detect the second cell flowing through the second downstream zone.

20 Claims, 27 Drawing Sheets

Related U.S. Application Data

(60) Provisional application No. 62/746,022, filed on Oct. 16, 2018.

(52) U.S. Cl.
CPC .................. *B01L 2300/0864* (2013.01); *B01L 2300/0883* (2013.01)

(56) References Cited

U.S. PATENT DOCUMENTS

| | | | |
|---|---|---|---|
| 2012/0295340 | A1 | 11/2012 | Chiu et al. |
| 2013/0130226 | A1 | 5/2013 | Lim et al. |
| 2015/0268029 | A1 | 9/2015 | Rowat et al. |

OTHER PUBLICATIONS

Lee, L.M. et al. "A microfluidic pipette array for mechanophenotyping of cancer cells and mechanical gating of mechanosensitive channels", Lab Chip, 2015, 15(1): 264-273.
Aaronson, G. and Acampora, A. A Frequency-Division Multiplex Key Telephone System. IEEE Trans. Commun. Technol. 19, 1242-1243 (1971).
Adamo, A. et al. Microfluidics-based assessment of cell deformability. Anal. Chem. 84, 6438-6443 (2012).
Au, S. H. et al. Clusters of circulating tumor cells traverse capillary-sized vessels. Proc. Natl. Acad. Sci. 113, 4947-4952 (2016).
Byun, S. et al. Characterizing deformability and surface friction of cancer cells. Proc. Natl. Acad. Sci. 110, 7580-7585 (2013).
Chen, Y. et al. Portable Coulter counter with vertical through-holes for high-throughput applications. Sensors Actuators, B Chem. 213, 375-381 (2015).
DeBlois, R. W. & Bean, C. P. Counting and sizing of submicron particles by the resistive pulse technique. Rev. Sci. Instrum. 41, 909-916 (1970).
Deng, Y. et al. Inertial Microfluidic Cell Stretcher (iMCS): Fully Automated, High-Throughput, and Near Real-Time Cell Mechanotyping. Small 13, 1-11 (2017).
Drury, J. L. & Dembo, M. Aspiration of human neutrophils: Effects of shear thinning and cortical dissipation. Biophys. J. 81, 3166-3177 (2001).
Dudani, J. S., Gossett, D. R., Tse, H. T. K. & Di Carlo, D. Pinched-flow hydrodynamic stretching of single-cells. Lab Chip 13, 3728-3734 (2013).
Ehman, Eric C., et al. "PET/MRI: where might it replace PET/CT?." Journal of Magnetic Resonance Imaging 46.5 (2017): 1247-1262.
Ellappan, P. & Sundararajan, R. A simulation study of the electrical model of a biological cell. J. Electrostat. 63, 297-307 (2005).
Gold, R. Maximal recursive sequences with 3-valued recursive cross-correlation functions. IEEE Trans. Inf. Theory 14, 154-156 (1968).
Gold, R. Optimal binary sequences for spread spectrum multiplexing. IEEE Trans. Inf. Theory 13, 619-621 (1967).
Gonzalez-Cruz, R. D., Fonseca, V. C. & Darling, E. M. Cellular mechanical properties reflect the differentiation potential of adipose-derived mesenchymal stem cells. Proc. Natl. Acad. Sci. 109, E1523-E1529 (2012).
Gossett, D. R. et al. Hydrodynamic stretching of single cells for large population mechanical phenotyping. Proc. Natl. Acad. Sci. 109, 7630-7635 (2012).
Guck, J. et al. The optical stretcher: A novel laser tool to micromanipulate cells. Biophys. J. 81, 767-784 (2001).
Heldin, C. H., Rubin, K., Pietras, K. & Ostman, A. High interstitial fluid pressure—An obstacle in cancer therapy. Nat. Rev. Cancer 4, 806-813 (2004).
Henon, S., Lenormand, G., Richert, A. & Gallet, F. A new determination of the shear modulus of the human erythrocyte membrane using optical tweezers. Biophys. J. 76, 1145-1151 (1999).
Henry, C. B. S. & Duling, B. R. Permeation of the luminal capillary glycocalyx is determined by hyaluronan. Am. J. Physiol. Circ. Physiol. 277, H508-H514 (2017).
Hochmuth, R. M. Micropipette aspiration of living cells. J. Biomech. 33, 15-22 (2000).
Hosseini, P. et al. Cellular normoxic biophysical markers of hydroxyurea treatment in sickle cell disease. Proc. Natl. Acad. Sci. 113, 9527-9532 (2016).
Hou, H. W. et al. Deformability study of breast cancer cells using microfluidics. Biomed. Microdevices 11, 557-564 (2009).
Hu, S. et al. Revealing elasticity of largely deformed cells flowing along confining microchannels. RSC Adv. 8, 1030-1038 (2018).
Hynes, R. O. Metastatic Potential: Generic Predisposition of the Primary Tumor or Rare, Metastatic Variants-Or Both? Cell 113, 821-823 (2004).
Iyer, S., Gaikwad, R. M., Subba-Rao, V., Woodworth, C. D. & Sokolov, I. Atomic force microscopy detects differences in the surface brush of normal and cancerous cells. Nat. Nanotechnol. 4, 389-393 (2009).
Lekka, M., Jach, R. et al. Cancer cell detection in tissue sections using AFM. 518, 151-156 (2012).
Jagtiani, A. V, Carletta, J. & Zhe, J. A microfluidic multichannel resistive pulse sensor using frequency division multiplexing for high throughput counting of micro particles. J. Micromechanics Microengineering A 21, 1-10 (2011).
Ketene, A. N., Schmelz, E. M., Roberts, P. C. & Agah, M. The effects of cancer progression on the viscoelasticity of ovarian cell cytoskeleton structures. Nanomedicine Nanotechnology, Biol. Med. 8, 93-102 (2012).
Khan, Z. S. & Vanapalli, S. A. Probing the mechanical properties of brain cancer cells using a microfluidic cell squeezer device. Biomicrofluidics 7, 1-15 (2013).
Kim, J. et al. Characterizing cellular mechanical phenotypes with mechano-node-pore sensing. Microsystems Nanoeng. 4, 17091 (2018).
Koji, N. et al. A computational study of circulating large tumor cells traversing microvessels. Comput. Biol. Med. 63, 187-195 (2015).
Kozak, D., Anderson, W., Vogel, R. & Trau, M. Advances in resistive pulse sensors: Devices bridging the void between molecular and microscopic detection. Nano Today 6, 531-545 (2011).
Lee, W. C. et al. Multivariate biophysical markers predictive of mesenchymal stromal cell multipotency. Proc. Natl. Acad. Sci. 111, E4409-E4418 (2014).
Li, X. et al. A microfluidic flow cytometer enabling absolute quantification of single-cell intracellular proteins. Lab Chip 17, 3129-3137 (2017).
Li, Xuejin, et al. "Biomechanics and biorheology of red blood cells in sickle cell anemia." Journal of biomechanics 50 (2017): 34-41.
Liu, R. et al. Design and modeling of electrode networks for code-division multiplexed resistive pulse sensing in microfluidic devices. Lab Chip 17, 2650-2666 (2017).
Liu, R., Wang, N., Asmare, N. & Sarioglu, A. F. Biosensors and Bioelectronics Scaling codemultiplexed electrode networks for distributed Coulter detection in micro fl uidics. Biosens. Bioelectron. 120, 30-39 (2018).
Liu, Ruxiu, et al. "Microfluidic CODES: a scalable multiplexed electronic sensor for orthogonal detection of particles in microfluidic channels." Lab on a Chip 16.8 (2016): 1350-1357.
Liu, Y. L. et al. Assessing metastatic potential of breast cancer cells based on EGFR dynamics. Sci. Rep. 9, 1-13 (2019).
Lu, Y.-B. & Reichenbach, A. Viscoelastic properties of individual glial cells. Proc. Natl. Acad. Sci. 103, 17759-17764 (2006).
Lulevich, V., Zink, T., Chen, H. Y., Liu, F. T. & Liu, G. Y. Cell mechanics using atomic force microscopy-based single-cell compression. Langmuir 22, 8151-8155 (2006).
Merryman, W. D. et al. Correlation between heart valve interstitial cell stiffness and transvalvular pressure: implications for collagen biosynthesis. Am. J. Physiol. Circ. Physiol. 290, H224-H231 (2005).
Midde, K. et al. Single-Cell Imaging of Metastatic Potential of Cancer Cells. iScience 10, 53-65 (2018).
Mills, J. P. et al. Effect of plasmodial RESA protein on deformability of human red blood cells harboring Plasmodium falciparum. Proc. Natl. Acad. Sci. 104, 9213-9217 (2007).

(56) References Cited

OTHER PUBLICATIONS

Nath, B., Raza, A., Set, V., Dalal, A. & Sankar, S. Understanding flow dynamics, viability and metastatic potency of cervical cancer (HeLa) cells through constricted microchannel. Sci. Rep. 8, 1-10 (2018).
Otto, O. et al. Real-time deformability cytometry: On-the-fly cell mechanical phenotyping. Nat. Methods 12, 199-202 (2015).
Park, S. & Lee, Y. J. AFM-based dual nano-mechanical phenotypes for cancer metastasis. J. Biol. Phys. 40, 413-419 (2014).
Raman, A. et al. Mapping nanomechanical properties of live cells using multi-harmonic atomic force microscopy. Nat. Nanotechnol. 6, 809-814 (2011).
Sajeesh, P., Raj, A., Doble, M. & Sen, A. K. Characterization and sorting of cells based on stiffness contrast in a microfluidic channel. RSC Adv. 6, 74704-74714 (2016).
Sant, G. R., Knopf, K. B. & Albala, D. M. Live-single-cell phenotypic cancer biomarkers future role in precision oncology? npj Precis. Oncol. 1, 1-6 (2017).
Saung, M. T. et al. A Size-Selective Intracellular Delivery Platform. Small 12, 5873-5881 (2016).
Song, H. et al. A microfluidic impedance flow cytometer for identification of differentiation state of stem cells. Lab Chip 13, 2300-2310 (2013).
Stack, T., Vahabikashi, A., Johnson, M. & Scott, E. Modulation of Schlemm's canal endothelial cell stiffness via latrunculin loaded block copolymer micelles. J. Biomed. Mater. Res.—Part A 106, 1771-1779 (2018).
Suresh, S. et al. Connections between single-cell biomechanics and human disease states: Gastrointestinal cancer and malaria. Acta Biomater. 1, 15-30 (2005).
Suwanarusk, R. et al. The Deformability of Red Blood Cells Parasitized by Plasmodium falciparum and P. vivax. J. Infect. Dis. 189, 190-194 (2004).
Swaminathan, V. et al. Mechanical Stiffness grades metastatic potential in patient tumor cells and in cancer cell lines. Cancer Res. 71, 5075-5080 (2011).
Theret, D. P. Application of the Micropipette Technique to the Measurement of Cultured Porcine Aortic Endothelial Cell Viscoelastic Properties. J. Biomech. Eng. 112, 263 (2008).
Trickey, W. R., Vail, T. P. & Guilak, F. The role of the cytoskeleton in the viscoelastic properties of human articular chondrocytes. J. Orthop. Res. 22, 131-139 (2004).
Tse, H. T. K. et al. Quantitative Diagnosis of Malignant Pleural Effusions by Single-Cell Mechanophenotyping. Sci. Transl. Med. 5, (2013).
Tsikritsis, D. et al. Label-free biomarkers of human embryonic stem cell differentiation to hepatocytes. Cytom. Part A 89, 575-584 (2016).
Valero, A., Braschler, T. & Renaud, P. A unified approach to dielectric single cell analysis: Impedance and dielectrophoretic force spectroscopy. Lab Chip 10, 2216-2225 (2010).
Wang, J., Sanger, J. M. & Sanger, J. W. Differential effects of Latrunculin-A on myofibrils in cultures of skeletal muscle cells: Insights into mechanisms of myofibrillogenesis. Cell Motil. Cytoskeleton 62, 35-47 (2005).
Wei, S. C. & Yang, J. Forcing through Tumor Metastasis: The Interplay between Tissue Rigidity and Epithelial-Mesenchymal Transition. Trends Cell Biol. 26, 111-120 (2016).
Wirtz, D., Konstantopoulos, K. & Searson, P. C. The physics of cancer: The role of physical interactions and mechanical forces in metastasis. Nat. Rev. Cancer 11, 512-522 (2011).
Wu, Y., Stewart, A. G. & Lee, P. V. S. On-chip cell mechanophenotyping using phase modulated surface acoustic wave. Biomicrofluidics 13, 024107 (2019).
Xu, W. et al. Cell Stiffness Is a Biomarker of the Metastatic Potential of Ovarian Cancer Cells. PLoS One 7, (2012).
Yang, T. et al. An integrated optofluidic device for single-cell sorting driven by mechanical properties. Lab Chip 15, 1262-1266 (2015).
Yang, T., Bragheri, F. & Minzioni, P. A comprehensive review of optical stretcher for cell mechanical characterization at single-cell level. Micromachines 7, 1-30 (2016).
Yang, X., Chen, Z., Miao, J., Cui, L. & Guan, W. High-throughput and label-free parasitemia quantification and stage differentiation for malaria-infected red blood cells. Biosens. Bioelectron. 98, 408-414 (2017).
Zheng, Y., Shojaei-Baghini, E., Azad, A., Wang, C. & Sun, Y. High-throughput biophysical measurement of human red blood cells. Lab Chip 12, 2560-2567 (2012).
Zhou, Y. et al. Characterizing Deformability and Electrical Impedance of Cancer Cells in a Microfluidic Device. Anal. Chem. 90, 912-919 (2018).
Kotesa, R. S., et al. "Real Time Measurement of Deformability Index for Electro-Mechanodiagnostics." 2018 IEEE 13th Annual International Conference on Nano/Micro Engineered and Molecular Systems (NEMS). IEEE, 2018.
Goedecke, Nils, et al. "Easy and accurate mechano-profiling on micropost arrays." JoVE (Journal of Visualized Experiments) 105 (2015): e53350.
Ghassemi, Parham. Multi-Constriction Microfluidic Sensors for Single-Cell Biophysical Characterization. Diss. Virginia Tech, 2017.

* cited by examiner

MASSIVELY PARALLEL MICROFLUIDIC CELL ANALYZER FOR HIGH THROUGHPUT MECHANOPHENOTYPING

CROSS-REFERENCE TO RELATED APPLICATIONS

This application is a continuation of U.S. application Ser. No. 17/286,003, filed Apr. 16, 2021, which claims the benefit of national stage application filed under 35 U.S.C. § 371 of PCT/US2019/056622, filed on Oct. 16, 2019, and U.S. provisional patent application No. 62/746,022, filed on Oct. 16, 2018, and entitled “Massively Parallel Microfluidic Cell Analyzer for High Throughput Mechanophenotyping,” the disclosure of which is expressly incorporated herein by reference in its entirety.

FIELD OF THE DISCLOSURE

The present disclosure relates generally to mechanophenotyping and more particularly to a massively parallel microfluidic cell analyzer and related methods for high throughput mechanophenotyping.

BACKGROUND OF THE DISCLOSURE

As biological cells experience physiological and pathological events, the cells express changes in their mechanical properties. Capturing and evaluating these changes, especially in large cell populations, may yield valuable insight into cell state that can inform clinical decisions. For example, measuring the deformability of cells may enable detection of various blood cell pathologies, such as malaria and sickle cell disease, identification of stem cells within heterogeneous cell populations, and prediction of tumor metastatic propensity.

The mechanical phenotype, or mechanophenotype, of biological cells has been increasingly used as a label-free biomarker for assessing cell state. See Wu, Y., Stewart, A. G. & Lee, P. V. S. On-chip cell mechanophenotyping using phase modulated surface acoustic wave. *Biomicrofluidics* 13, 024107 (2019); Sant, G. R., Knopf, K. B. & Albala, D. M. Live-single-cell phenotypic cancer biomarkers future role in precision oncology? npj Precis. *Oncol.* 1, 1-6 (2017); Kim, J. et al. Characterizing cellular mechanical phenotypes with mechano-node-pore sensing. *Microsystems Nanoeng.* 4, 17091 (2018). Because a wide variety of changes in cell metabolism manifest themselves in the cell mechanophenotype, capturing such information may yield invaluable insight while still keeping the cell viable. In fact, mechanophenotyping of cells has enabled rapid assessment and progression monitoring of various blood cell pathologies, such as sickle cell disease (see Hosseini, P. et al. Cellular normoxic biophysical markers of hydroxyurea treatment in sickle cell disease. *Proc. Natl. Acad. Sci.* 113, 9527-9532 (2016); Ehman, E. C. et al. Biomechanics and biorheology of red blood cells in sickle cell anemia. *J Biomech.* 46, 1247-1262 (2017)) and malaria (see Suwanarusk, R. et al. The Deformability of Red Blood Cells Parasitized by *Plasmodium falciparum* and *P. vivax. J. Infect. Dis.* 189, 190-194 (2004); Suresh, S. et al. Connections between single-cell biomechanics and human disease states: Gastrointestinal cancer and malaria. *Acta Biomater.* 1, 15-30 (2005)), and identification of stem and progenitor cells in mixed cell populations (see Tsikritsis, D. et al. Label-free biomarkers of human embryonic stem cell differentiation to hepatocytes. *Cytom. Part A* 89, 575-584 (2016); Lee, W. C. et al. Multivariate biophysical markers predictive of mesenchymal stromal cell multipotency. *Proc. Natl. Acad. Sci.* 111, E4409-E4418 (2014); Gonzalez-Cruz, R. D., Fonseca, V. C. & Darling, E. M. Cellular mechanical properties reflect the differentiation potential of adipose-derived mesenchymal stem cells. *Proc. Natl. Acad. Sci.* 109, E1523-E1529 (2012)).

Another promising application of cell mechanophenotyping is the assessment of tumor cell metastatic potential. See Liu, Y. L. et al. Assessing metastatic potential of breast cancer cells based on EGFR dynamics. *Sci. Rep.* 9, 1-13 (2019); Midde, K. et al. Single-Cell Imaging of Metastatic Potential of Cancer Cells. *iScience* 10, 53-65 (2018); Hynes, R. O. Metastatic Potential: Generic Predisposition of the Primary Tumor or Rare, Metastatic Variants—Or Both? Cell 113, 821-823 (2004). To successfully proliferate the body, or metastasize, tumor cells from a primary tumor site have to enter the bloodstream by squeezing past capillaries through gaps much smaller than the tumor cells themselves. See Au, S. H. et al. Clusters of circulating tumor cells traverse capillary-sized vessels. *Proc. Natl. Acad. Sci.* 113, 4947-4952 (2016); Wei, S. C. & Yang, J. Forcing through Tumor Metastasis: The Interplay between Tissue Rigidity and Epithelial-Mesenchymal Transition. *Trends Cell Biol.* 26, 111-120 (2016); Henry, C. B. S. & Duling, B. R. Permeation of the luminal capillary glycocalyx is determined by hyaluronan. *Am. J. Physiol.* Circ. Physiol. 277, H508-H514 (2017); Heldin, C. H., Rubin, K., Pietras, K. & Ostman, A. High interstitial fluid pressure—An obstacle in cancer therapy. *Nat. Rev. Cancer* 4, 806-813 (2004); Koji, N. et al. A computational study of circulating large tumor cells traversing microvessels. *Comput. Biol. Med.* 63, 187-195 (2015). This can only be accomplished due to the elevated deformability of cancerous cells, which is a characteristic that has been extensively studied and shown to be linked to increased metastatic propensity. See Sajeesh, P., Raj, A., Doble, M. & Sen, A. K. Characterization and sorting of cells based on stiffness contrast in a microfluidic channel *RSC Adv.* 6, 74704-74714 (2016); Wirtz, D., Konstantopoulos, K. & Searson, P. C. The physics of cancer: The role of physical interactions and mechanical forces in metastasis. *Nat. Rev. Cancer* 11, 512-522 (2011); Swaminathan, V. et al. Mechanical Stiffness grades metastatic potential in patient tumor cells and in cancer cell lines. *Cancer Res.* 71, 5075-5080 (2011); Xu, W. et al. Cell Stiffness Is a Biomarker of the Metastatic Potential of Ovarian Cancer Cells. *PLoS One* 7, (2012).

A multitude of techniques have been employed to measure cell mechanical properties. These techniques generally may rely on the quantitative measurement of cell deformation in response to an applied external force by employing various transduction mechanisms. Atomic force microscopy (AFM), a workhorse for nanoscale surface characterization, also has been widely used to measure cell elastic modulus. See Park, S. & Lee, Y. J. AFM-based dual nano-mechanical phenotypes for cancer metastasis. *J. Biol.* Phys. 40, 413-419 (2014); Lulevich, V., Zink, T., Chen, H. Y., Liu, F. T. & Liu, G. Y. Cell mechanics using atomic force microscopy-based single-cell compression. *Langmuir* 22, 8151-8155 (2006); Raman, A. et al. Mapping nanomechanical properties of live cells using multi-harmonic atomic force microscopy. *Nat. Nanotechnol.* 6, 809-814 (2011); Ketene, A. N., Schmelz, E. M., Roberts, P. C. & Agah, M. The effects of cancer progression on the viscoelasticity of ovarian cell cytoskeleton structures. *Nanomedicine Nanotechnology, Biol. Med.* 8, 93-102 (2012); Iyer, S., Gaikwad, R. M., Subba-Rao, V., Woodworth, C. D. & Sokolov, I. Atomic force microscopy detects differences in the surface brush of normal and cancerous cells. *Nat. Nanotechnol.* 4, 389-393 (2009). The AFM technique can non-destructively probe mechanical properties of a live cell anchored to a substrate and can capture local variations in cell membrane mechanical properties with molecular-scale spatial resolution afforded by its atomically sharp tip. While offering a way to quantitatively determine cell mechanical properties with extreme precision, the AFM technique suffers from very low throughput (less than one (1) cell per minute) and the need for a highly trained operator. Micropipette aspiration (see Hochmuth, R. M. Micropipette aspiration of living cells. *J. Biomech.* 33, 15-22 (2000); Merryman, W. D. et al. Correlation between heart valve interstitial cell stiffness and transvalvular pressure: implications for collagen biosynthesis. *Am. J. Physiol.* Circ. Physiol. 290, H224-H231 (2005); Trickey, W. R., Vail, T. P. & Guilak, F. The role of the cytoskeleton in the viscoelastic properties of human articular chondrocytes. *J. Orthop. Res.* 22, 131-139 (2004); Theret, D. P. Application of the Micropipette Technique to the Measurement of Cultured Porcine Aortic Endothelial Cell Viscoelastic Properties. *J. Biomech. Eng.* 112, 263 (2008); Drury, J. L. & Dembo, M. Aspiration of human neutrophils: Effects of shear thinning and cortical dissipation. *Biophys. J.* 81, 3166-3177 (2001)) and optical stretching (see Lu, Y.-B. & Reichenbach, A. Viscoelastic properties of individual glial cells. *Proc. Natl. Acad. Sci.* 103, 17759-17764 (2006); Yang, T., Bragheri, F. & Minzioni, P. A comprehensive review of optical stretcher for cell mechanical characterization at single-cell level. *Micromachines* 7, 1-30 (2016); Yang, T. et al. An integrated optofluidic device for single-cell sorting driven by mechanical properties. *Lab Chip* 15, 1262-1266 (2015); Henon, S., Lenormand, G., Richert, A. & Gallet, F. A new determination of the shear modulus of the human erythrocyte membrane using optical tweezers. *Biophys. J.* 76, 1145-1151 (1999); Mills, J. P. et al. Effect of plasmodial RESA protein on deformability of human red blood cells harboring *Plasmodium falciparum. Proc. Natl. Acad. Sci.* 104, 9213-9217 (2007); Guck, J. et al. The optical stretcher: A novel laser tool to micromanipulate cells. *Biophys. J.* 81, 767-784 (2001)) also suffer from similar throughput limitations and are well suited only for basic research applications with a limited number of cells under test.

On the other end of the throughput spectrum, recently introduced hydrodynamic approaches prioritize throughput by imposing momentary compressive forces on suspended cells flowing in continuous streams and capturing the hydrodynamically-induced cell deformation using high-speed imaging. See Dudani, J. S., Gossett, D. R., Tse, H. T. K. & Di Carlo, D. Pinched-flow hydrodynamic stretching of single-cells. Lab Chip 13, 3728-3734 (2013); Tse, H. T. K. et al. Quantitative Diagnosis of Malignant Pleural Effusions by Single-Cell Mechanophenotyping. *Sci. Transl. Med.* 5, (2013). According to one such approach, cells are directed into a cross-flow junction such that the cells experience a pinching force for a few microseconds under two opposing flow streams and deform appreciably. See Gossett, D. R. et al. Hydrodynamic stretching of single cells for large population mechanical phenotyping. *Proc. Natl. Acad. Sci.* 109, 7630-7635 (2012). According to another technique, cells are flowed into a drastically reduced channel cross-section, leading to cell strain under high shear forces induced by a rapid increase in flow velocity. See Otto, O. et al. Real-time deformability cytometry: On-the-fly cell mechanical phenotyping. *Nat. Methods* 12, 199-202 (2015). In both of these cases, image processing techniques are used to quantify each cell's deformation. Although these techniques may be used to achieve throughput performances in the order of one thousand (1000) cells per second, the necessary high-speed cameras coupled with microscopes and computers to do the processing incur significant overhead costs. See Deng, Y. et al. Inertial Microfluidic Cell Stretcher (iMCS): Fully Automated, High-Throughput, and Near Real-Time Cell Mechanotyping. *Small* 13, 1-11 (2017). This cost is even higher when real-time analysis is desired, as the camera interfacing and computing capabilities need to be powerful enough to handle such loads. In view of these costs, such systems are less likely to be used in situations where skilled personnel and financing are not readily available.

In an effort to develop portable and low-cost techniques for mechanical characterization of cells while still achieving reasonably high throughput, researchers often have resorted to microchip-based technologies. These technologies typically drive cells through photolithographically-defined microconstrictions and measure the time taken by individual cells as they deform and compress to pass through these constrictions. See Zhou, Y. et al. Characterizing Deformability and Electrical Impedance of Cancer Cells in a Microfluidic Device. *Anal. Chem.* 90, 912-919 (2018); Hu, S. et al. Revealing elasticity of largely deformed cells flowing along confining microchannels. *RSC Adv.* 8, 1030-1038 (2018); Khan, Z. S. & Vanapalli, S. A. Probing the mechanical properties of brain cancer cells using a microfluidic cell squeezer device. *Biomicrofluidics* 7, 1-15 (2013). Although some of these microchips still require imaging for measurements (see Hou, H. W. et al. Deformability study of breast cancer cells using microfluidics. *Biomed. Microdevices* 11, 557-564 (2009)), standalone platforms with integrated sensing also have been demonstrated with the goal of directly providing quantitative data (see Song, H. et al. A microfluidic impedance flow cytometer for identification of differentiation state of stem cells. *Lab Chip* 13, 2300-2310 (2013)). In one such approach, a microfluidic channel with a microconstriction may be embedded within an oscillating cantilever beam, and the cell transit time through the microconstriction may be measured by tracking the cell position on the cantilever beam by measuring changes in the beam resonance frequency. See Byun, S. et al. Characterizing deformability and surface friction of cancer cells. *Proc. Natl. Acad. Sci.* 110, 7580-7585 (2013). According to another technique, a microconstriction may be placed between a pair of electrodes, and the Coulter principle may be used to measure cell transit time as a measure of the cells' stiffness. See Zheng, Y., Shojaei-Baghini, E., Azad, A., Wang, C. & Sun, Y. High-throughput biophysical measurement of human red blood cells. *Lab Chip* 12, 2560-2567 (2012); Yang, X., Chen, Z., Miao, J., Cui, L. & Guan, W. High-throughput and label-free parasitemia quantification and stage differentiation for malaria-infected red blood cells. *Biosens. Bioelectron.* 98, 408-414 (2017). Although transit-time based approaches have been successful in numerous studies ranging from distinguishing between cancer cells of differing metastatic potentials (see Nat, B., Raza, A., Set, V., Dalai, A. & Sankar, S. Understanding flow dynamics, viability and metastatic potency of cervical cancer (HeLa) cells through constricted microchannel. *Sci. Rep.* 8, 1-10 (2018)) to single-cell proteomics studies (see Li, X. et al. A microfluidic flow cytometer enabling absolute quantification of single-cell intracellular proteins. *Lab Chip* 17, 3129-3137 (2017)), the time it takes for a cell to compress into and traverse a microconstriction has limited the throughput achievable using this method.

A need therefore exists for improved devices, systems, and methods for high throughput mechanophenotyping.

SUMMARY OF THE DISCLOSURE

The present disclosure provides microfluidic devices for cell mechanophenotyping and methods for cell mechanophenotyping using a microfluidic device. In one aspect, a microfluidic device for cell mechanophenotyping is provided. In one embodiment, the microfluidic device may include an inlet, an outlet, a first channel in fluid communication with the inlet and the outlet, a second channel arranged in parallel with the first channel and in fluid communication with the inlet and the outlet, a first sensor pair positioned along the first channel, and a second sensor pair positioned along the second channel. The first channel may include a first upstream zone having a first cross-sectional area in a lateral direction perpendicular to a direction of fluid flow through the first channel, a first downstream zone having a second cross-sectional area in the lateral direction, and a first constriction zone positioned between the first upstream zone and the first downstream zone and having a third cross-sectional area in the lateral direction, with the third cross-sectional area being less than each of the first cross-sectional area and the second cross-sectional area. The second channel may include a second upstream zone having a fourth cross-sectional area in the lateral direction, a second downstream zone having a fifth cross-sectional area in the lateral direction, and a second constriction zone positioned between the second upstream zone and the second downstream zone and having a sixth cross-sectional area in the lateral direction, with the sixth cross-sectional area being less than each of the fourth cross-sectional area and the fifth cross-sectional area. The first sensor pair may include a first entry sensor positioned along the first upstream zone and configured to detect a first cell flowing through the first upstream zone, and a first exit sensor positioned along the first downstream zone and configured to detect the first cell flowing through the first downstream zone. The second sensor pair may include a second entry sensor positioned along the second upstream zone and configured to detect a second cell flowing through the second upstream zone, and a second exit sensor positioned along the second downstream zone and configured to detect the second cell flowing through the second downstream zone.

In some embodiments, the first entry sensor may include a first plurality of electrodes having a first electrode configuration, and the first exit sensor may include a second plurality of electrodes having the first electrode configuration. In some embodiments, the second entry sensor may include a third plurality of electrodes having a second electrode configuration different from the first electrode configuration, and the second exit sensor may include a fourth plurality of electrodes having the second electrode configuration. In some embodiments, the first entry sensor may be configured to generate a first entry sensor waveform in response to detecting the first cell flowing through the first upstream zone, the first exit sensor may be configured to generate a first exit sensor waveform in response to detecting the first cell flowing through the first downstream zone. In some embodiments, the first entry sensor waveform may include a first sensor code corresponding to the first channel, and the first exit sensor waveform may include the first sensor code.

In some embodiments, the microfluidic device also may include a lock-in amplifier configured to generate an excitation signal for exciting the first sensor pair and the second sensor pair. In some embodiments, the lock-in amplifier also may be configured to: receive an output signal comprising the first entry sensor waveform, the first exit sensor waveform, the second entry sensor waveform, and the second exit sensor waveform; and demodulate the output signal. In some embodiments, the microfluidic device also may include a processing unit configured to: receive the demodulated output signal; determine, based at least in part on the demodulated output signal, a first cell transit time for the first cell; and determine, based at least in part on the demodulated output signal, a second cell transit time for the second cell. In some embodiments, the processing unit may be configured to: determine the first cell transit time based at least in part on a first entry timestamp associated with the first entry sensor waveform and a first exit timestamp associated with the first exit sensor waveform; and determine the second cell transit time based at least in part on a second entry timestamp associated with the second entry sensor waveform and a second exit timestamp associated with the second exit sensor waveform. In some embodiments, the processing unit may be configured to: determine, based at least in part on the demodulated output signal, a first cell size of the first cell; and determine, based at least in part on the demodulated output signal, a second cell size of the second cell. In some embodiments, the processing unit may be configured to: determine the first cell size based at least in part on the first entry sensor waveform; and determine the second cell size based at least in part on the second entry sensor waveform. In some embodiments, the processing unit may be configured to: determine the first cell size based at least in part on a first peak amplitude of the first entry sensor waveform; and determine the second cell size based at least in part on a second peak amplitude of the second entry sensor waveform. In some embodiments, the processing unit may be configured to: determine, based at least in part on the first sensor code, that the first entry sensor waveform and the first exit sensor waveform are associated with the first channel; and determine, based at least in part on the second sensor code, that the second entry sensor waveform and the second exit sensor waveform are associated with the second channel.

In some embodiments, the first sensor pair may be configured to not detect the first cell flowing through the first constriction zone, and the second sensor pair may be configured to not detect the second cell flowing through the second constriction zone. In some embodiments, the first entry sensor may have a first detection zone extending along a portion of the first upstream zone and spaced apart from the first constriction zone, and the first exit sensor may have a second detection zone extending along a portion of the first downstream zone and spaced apart from the first constriction zone. In some embodiments, the second entry sensor may have a third detection zone extending along a portion of the second upstream zone and spaced apart from the second constriction zone, and the second exit sensor may have a fourth detection zone extending along a portion of the second downstream zone and spaced apart from the second constriction zone.

In some embodiments, the third cross-sectional area may be equal to the sixth cross-sectional area. In some embodiments, the third cross-sectional area may be different from the sixth cross-sectional area. In some embodiments, the first constriction zone may have a first width, and the second constriction zone may have a second width different from the first width. In some embodiments, the first constriction zone may have a first height, and the second constriction zone may have a second height equal to or different from the first height. In some embodiments, the first channel also may include a third constriction zone positioned between the first constriction zone and the first downstream zone and having a seventh cross-sectional area in the lateral direction, with the seventh cross-sectional area being less than the third cross-sectional area. In some embodiments, the first cross-sectional area may be equal to the second cross-sectional area, and the fourth cross-sectional area may be equal to the fifth cross-sectional area. In some embodiments, the microfluidic device may include a first plurality of protrusions extending into the first constriction zone, and a second plurality of protrusions extending into the second constriction zone. In some embodiments, the microfluidic device may include a substrate and a microfluidic layer attached to one another, with the first sensor pair and the second sensor pair being positioned on the substrate, and with the first channel and the second channel being at least partially defined in the microfluidic layer. In some embodiments, the substrate may be formed of glass, and the microfluidic layer may be formed of polydimethylsiloxane. In some embodiments, the microfluidic device may include a first expandable member positioned along the first constriction zone and configured to expand between a first state and a second state to vary the third cross-sectional area, and a second expandable member positioned along the second constriction zone and configured to expand between a third state and a fourth state to vary the sixth cross-sectional area. In some embodiments, the first expandable member may include a first inflatable bladder, and the second expandable member may include a second inflatable bladder.

In some embodiments, the microfluidic device may include a feed channel extending from the inlet and in fluid communication with the first channel and the second channel. In some embodiments, the feed channel may include a third upstream zone having a seventh cross-sectional area in the lateral direction, a third downstream zone having an eighth cross-sectional area in the lateral direction, and an expansion zone positioned between the third upstream zone and the third downstream zone and having a ninth cross-sectional area in the lateral direction, with the seventh cross-sectional area being greater than each of the first cross-sectional area and the fourth cross-sectional area, and with the ninth cross-sectional area being greater than each of the seventh cross-sectional area and the eighth cross-sectional area. In some embodiments, the feed channel may include a third upstream zone having a linear shape, a third downstream zone having a linear shape, and an inertial focuser zone positioned between the third upstream zone and the third downstream zone and having a contoured shape configured to inhibit cell overlap in the lateral direction. In some embodiments, the inertial focuser may have a serpentine shape. In some embodiments, the microfluidic device may include a plurality of protrusions extending vertically into the feed channel and configured to inhibit cell overlap in a vertical direction. In some embodiments, the microfluidic device may include a plurality of micropillars extending into the feed channel and configured to direct cells to one of the first channel or the second channel based on cell size. In some embodiments, the third cross-sectional area may be greater than the sixth cross-sectional area, and the plurality of micropillars may be configured to direct larger cells to the first channel and to direct smaller cells to the second channel.

In another aspect, a method for cell mechanophenotyping is provided. In one embodiment, the method may include flowing a solution comprising a plurality of cells through a microfluidic device. The microfluidic device may include an inlet, an outlet, a first channel, and a second channel arranged in parallel with the first channel. The first channel may include a first upstream zone having a first cross-sectional area in a lateral direction perpendicular to a direction of fluid flow through the first channel, a first downstream zone having a second cross-sectional area in the lateral direction, and a first constriction zone positioned between the first upstream zone and the first downstream zone and having a third cross-sectional area in the lateral direction, with the third cross-sectional area being less than each of the first cross-sectional area and the second cross-sectional area. The second channel may include a second upstream zone having a fourth cross-sectional area in the lateral direction, a second downstream zone having a fifth cross-sectional area in the lateral direction, and a second constriction zone positioned between the second upstream zone and the second downstream zone and having a sixth cross-sectional area in the lateral direction, with the sixth cross-sectional area being less than each of the fourth cross-sectional area and the fifth cross-sectional area. The method also may include: detecting, via a first entry sensor positioned along the first upstream zone, a first cell flowing through the first upstream zone; detecting, via a first exit sensor positioned along the first downstream zone, the first cell flowing through the first downstream zone; detecting, via a second entry sensor positioned along the second upstream zone, a second cell flowing through the second upstream zone; and detecting, via a second exit sensor positioned along the second downstream zone, the second cell flowing through the second downstream zone.

In some embodiments, the first entry sensor may include a first plurality of electrodes having a first electrode configuration, and the first exit sensor may include a second plurality of electrodes having the first electrode configuration. In some embodiments, the second entry sensor may include a third plurality of electrodes having a second electrode configuration different from the first electrode configuration, and the second exit sensor may include a fourth plurality of electrodes having the second electrode configuration. In some embodiments, the method also may include: generating, via the first entry sensor, a first entry sensor waveform in response to detecting the first cell flowing through the first upstream zone, with the first entry sensor waveform including a first sensor code corresponding to the first channel; and generating, via the first exit sensor, a first exit sensor waveform in response to detecting the first cell flowing through the first downstream zone, with the first exit sensor waveform including the first sensor code. In some embodiments, the method also may include: generating, via the second entry sensor a second entry sensor waveform in response to detecting the second cell flowing through the second upstream zone, with the second entry sensor waveform including a second sensor code corresponding to the second channel; and generating, via the second exit sensor, a second exit sensor waveform in response to detecting the second cell flowing through the second downstream zone, with the second exit sensor waveform including the second sensor code.

In some embodiments, the method also may include comprising generating, via a lock-in amplifier, an excitation signal for exciting the first entry sensor, the first exit sensor, the second entry sensor, and the second exit sensor. In some embodiments, the method also may include: receiving, via the lock-in amplifier, an output signal including the first entry sensor waveform, the first exit sensor waveform, the second entry sensor waveform, and the second exit sensor waveform; and demodulating, via the lock-in amplifier, the output signal. In some embodiments, the method also may include: receiving, via a processing unit, the demodulated output signal; determining, via the processing unit and based at least in part on the demodulated output signal, a first cell transit time for the first cell; and determining, via the processing unit and based at least in part on the demodulated output signal, a second cell transit time for the second cell. In some embodiments, determining the first cell transit time may include determining the first cell transit time based at least in part on the first entry sensor waveform and the first exit sensor waveform, and determining the second cell transit time may include determining the second cell transit time based at least in part on the second entry sensor waveform and the second exit sensor waveform. In some embodiments, determining the first cell transit time may include determining the first cell transit time based at least in part on a first entry timestamp associated with the first entry sensor waveform and a first exit timestamp associated with the first exit sensor waveform, and determining the second cell transit time may include determining the second cell transit time based at least in part on a second entry timestamp associated with the second entry sensor waveform and a second exit timestamp associated with the second exit sensor waveform. In some embodiments, the method also may include: determining, via the processing unit and based at least in part on the demodulated output signal, a first cell size of the first cell; and determining, via the processing unit and based at least in part on the demodulated output signal, a second cell size of the second cell. In some embodiments, determining the first cell size may include determining the first cell size based at least in part on the first entry sensor waveform; and determining the second cell size may include determining the second cell size based at least in part on the second entry sensor waveform. In some embodiments, determining the first cell size may include determining the first cell size based at least in part on a first peak amplitude of the first entry sensor waveform, and determining the second cell size may include determining the second cell size based at least in part on a second peak amplitude of the second entry sensor waveform. In some embodiments, the method also may include: determining, via the processing unit and based at least in part on the first sensor code, that the first entry sensor waveform and the first exit sensor waveform are associated with the first channel; and determining, via the processing unit and based at least in part on the second sensor code, that the second entry sensor waveform and the second exit sensor waveform are associated with the second channel.

In some embodiments, the first entry sensor may not detect the first cell flowing through the first constriction zone, the first exit sensor may not detect the first cell flowing through the first constriction zone, the second entry sensor may not detect the second cell flowing through the second constriction zone, and the second exit sensor may not detect the second cell flowing through the second constriction zone. In some embodiments, the first entry sensor may have a first detection zone extending along a portion of the first upstream zone and spaced apart from the first constriction zone, and the first exit sensor may have a second detection zone extending along a portion of the first downstream zone and spaced apart from the first constriction zone. In some embodiments, the second entry sensor may have a third detection zone extending along a portion of the second upstream zone and spaced apart from the second constriction zone, and the second exit sensor may have a fourth detection zone extending along a portion of the second downstream zone and spaced apart from the second constriction zone.

In some embodiments, the third cross-sectional area may be equal to the sixth cross-sectional area. In some embodiments, the third cross-sectional area may be different from the sixth cross-sectional area. In some embodiments, the first constriction zone may have a first width, and the second constriction zone may have a second width different from the first width. In some embodiments, the first constriction zone may have a first height, and the second constriction zone may have a second height equal to or different from the first height. In some embodiments, the first channel also may include a third constriction zone positioned between the first constriction zone and the first downstream zone and having a seventh cross-sectional area in the lateral direction, with the seventh cross-sectional area being less than the third cross-sectional area. In some embodiments, the first cross-sectional area may be equal to the second cross-sectional area, and the fourth cross-sectional area may be equal to the fifth cross-sectional area. In some embodiments, the microfluidic device may include a first plurality of protrusions extending into the first constriction zone, and a second plurality of protrusions extending into the second constriction zone. In some embodiments, the microfluidic device may include a substrate and a microfluidic layer attached to one another, with the first sensor pair and the second sensor pair being positioned on the substrate, and with the first channel and the second channel being at least partially defined in the microfluidic layer. In some embodiments, the substrate may be formed of glass, and the microfluidic layer may be formed of polydimethylsiloxane. In some embodiments, the method also may include: expanding a first expandable member of the microfluidic device positioned along the first constriction zone to vary the third cross-sectional area; and expanding a second expandable member of the microfluidic device positioned along the second constriction zone to vary the sixth cross-sectional area. In some embodiments, the first expandable member may include a first inflatable bladder, and the second expandable member may include a second inflatable bladder.

In some embodiments, the microfluidic device also may include a feed channel extending from the inlet and in fluid communication with the first channel and the second channel, and flowing the solution through the microfluidic device may include flowing the solution through the feed channel. In some embodiments, flowing the solution through the feed channel may include: flowing the solution through a third upstream zone of the feed channel, with the third upstream zone having a seventh cross-sectional area in the lateral direction, and with the seventh cross-sectional area being greater than each of the first cross-sectional area and the fourth cross-sectional area; flowing the solution through a third downstream zone of the feed channel, with the third downstream zone having an eighth cross-sectional area in the lateral direction; and flowing the solution through an expansion zone of the feed channel, with the expansion zone positioned between the third upstream zone and the third downstream zone and having a ninth cross-sectional area in the lateral direction, and with the ninth cross-sectional area being greater than each of the seventh cross-sectional area and the eighth cross-sectional area. In some embodiments, flowing the solution through the feed channel may include: flowing the solution through a third upstream zone of the feed channel, with the third upstream zone having a linear shape; flowing the solution through a third downstream zone of the feed channel, with the third downstream zone having a linear shape; and inhibiting cell overlap in the lateral direction by flowing the solution through an inertial focuser of the feed channel, with the inertial focuser positioned between the third upstream zone and the third downstream zone and having a contoured shape. In some embodiments, the inertial focuser may have a serpentine shape. In some embodiments, flowing the solution through the feed channel may include inhibiting cell overlap in a vertical direction by flowing the solution past a plurality of protrusions extending vertically into the feed channel. In some embodiments, flowing the solution through the feed channel comprises directing cells to one of the first channel or the second channel based on cell size by flowing the solution through a plurality of micropillars extending into the feed channel. In some embodiments, the third cross-sectional area may be greater than the sixth cross-sectional area, and directing cells to one of the first channel or the second channel may include: directing, via the plurality of micropillars, larger cells to the first channel; and directing, via the plurality of micropillars, smaller cells to the second channel.

These and other aspects and improvements of the present disclosure will become apparent to one of ordinary skill in the art upon review of the following detailed description when taken in conjunction with the several drawings and the appended claims.

Figure 1:
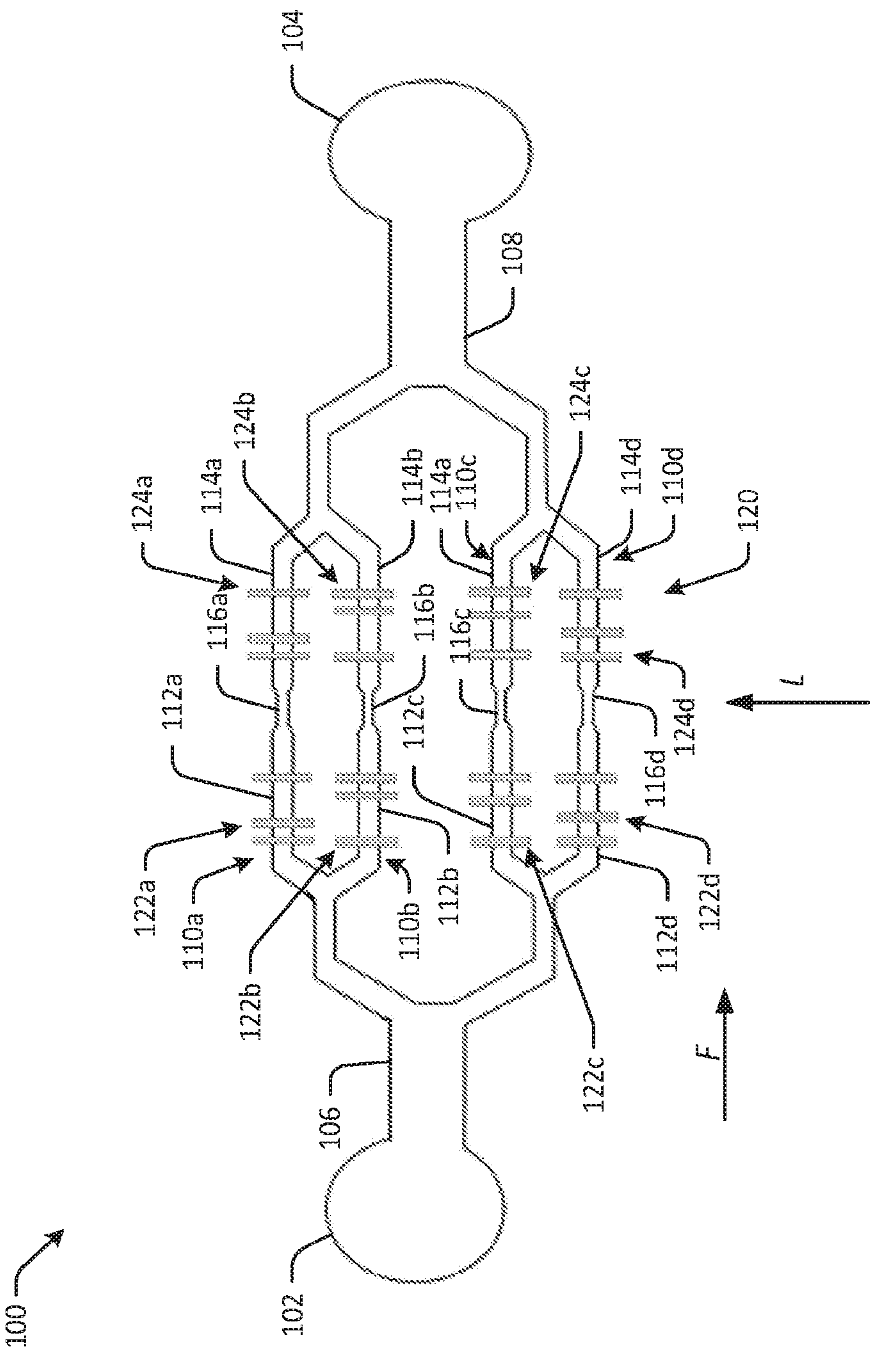
FIG. 1 depicts a top view of an example microfluidic device in accordance with one or more embodiments of the disclosure, showing an inlet, a feed channel, an outlet, a plurality of parallel channels each having a constriction zone, and a sensor network of the microfluidic device.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION OF THE DISCLOSURE

In the following description, specific details are set forth describing some embodiments consistent with the present invention. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. In some instances, well known methods, procedures, components, and circuits have not been described in detail so as not to unnecessarily obscure aspects of the embodiments.

Embodiments of microfluidic devices for cell mechanophenotyping as well as related systems and methods for cell mechanophenotyping using microfluidic device are provided. As described herein, a microfluidic device may include a plurality of parallel channels, each including a constriction zone, and an integrated multiplexed sensor network that can simultaneously quantify the transit time for all cells passing through the channels. In some instances, a frequency division scheme may be implemented to allow multiple copies of the sensing network and parallel channels to operate concurrently, thereby providing scalability for the microfluidic device. The microfluidic devices described herein advantageously may minimize sensor idle time and maximize throughput. During the time when a cell compresses to enter a constriction zone, the flow through that particular parallel channel is near zero, and the channel is rendered idle. Because other parallel channels will be open during this period, the incoming cells will flow through the other channels instead. Accordingly, provided a consistent delivery of cells to the parallel channels and a cell concentration that is not too high, the overall device idle time is non-existent, thus pushing the throughput of the microfluidic device near that of a Coulter counter. Further, such throughput may be achieved while still providing continuous cell transit time measurement. Additional advantages and benefits of the described microfluidic devices and related methods will be appreciated from the following description.

FIG. 1 illustrates an example microfluidic device 100 (which also may be referred to as a "microfluidic cell analyzer" of a "massively parallel microfluidic cell analyzer") for cell mechanophenotyping. As shown, the microfluidic device 100 may include an inlet 102, an outlet 104, a feed channel 106, a discharge channel 108, a plurality of parallel channels 110 (which also may be referred to as "microchannels"), and a sensor network 120 (which also may be referred to as a "multiplexed sensor network"). During use of the microfluidic device 100, a solution including a plurality of cells may flow through the device 100 for cell mechanophenotyping. Specifically, the solution may flow from the inlet 102, through the feed channel 106, through the parallel channels 110, through the discharge channel 108, and then to the outlet 104 in a direction of fluid flow F. According to the illustrated example, the microfluidic device 100 may include a first channel 110*a*, a second channel 110*b*, a third channel 110*c*, and a fourth channel

110c arranged in parallel with one another. However, the microfluidic device 100 may include any number of parallel channels 110 according to various embodiments. As shown, the microfluidic device 100 may include a plurality of bifurcations positioned between the feed channel 106 and the parallel channels 110, with the number of bifurcations depending on the number of parallel channels 110. In this manner, respective portions of the solution passed through the microfluidic device 100 may be distributed from the feed channel 106 to respective parallel channels 110. In a similar manner, the microfluidic device 100 may include a plurality of conjunctions positioned between the parallel channels 110 and the discharge channel 108, with the number of conjunctions depending on the number of parallel channels 110. In this manner, respective portions of the solution passed through the respective parallel channels 110 may converge into the discharge channel 108.

As shown, each of the parallel channels 110 may include an upstream zone 112 (which also may be referred to as an "upstream portion" or an "upstream region"), a downstream zone 114 (which also may be referred to as a "downstream portion" or a "downstream region"), and a constriction zone 116 (which also may be referred to as a "constriction portion" or a "constriction region") positioned between the upstream zone 112 and the downstream zone 114. In this manner, the solution may flow in the direction of fluid flow F through the upstream zone 112, through the constriction zone 116, and then through the downstream zone 114. The upstream zone 112 may have a first cross-sectional area in a lateral direction L perpendicular to the direction of fluid flow F through the parallel channel 110, the downstream zone 114 may have a second cross-sectional area in the lateral direction L, and the constriction zone 116 may have a third cross-sectional area in the lateral direction L. As shown, the third cross-sectional area may be less than each of the first cross-sectional area and the second cross-sectional area. In other words, the constriction zone 116 may have a smaller cross-sectional area that each of the upstream zone 112 and the downstream zone 114. In some embodiments, as shown, the first cross-sectional area may be equal to the second cross-sectional area. In other words, the upstream zone 112 and the downstream zone 114 may have the same cross-sectional area. According to the illustrated example, the first channel 110a may include a first upstream zone 112a, a first downstream zone 114a, and a first constriction zone 116a, the second channel 110b may include a second upstream zone 112b, a second downstream zone 114b, and a second constriction zone 116b, the third channel 110c may include a third upstream zone 112c, a third downstream zone 114c, and a third constriction zone 116c, and the fourth channel 110c may include a fourth upstream zone 112d, a fourth downstream zone 114d, and a fourth constriction zone 116d.

As shown in FIG. 1, the sensor network 120 may include a pair of sensors for each of the parallel channels 110. Each sensor pair may include an entry sensor 122 and an exit sensor 124 for the respective parallel channel 110. The entry sensor 122 may be positioned along the upstream zone 112 of the respective parallel channel 110 and configured to detect a cell flowing through the upstream zone 112. In this manner, the entry sensor 122 may be configured to detect a cell within the upstream zone 112 before the cell enters the constriction zone 116. The exit sensor 124 may be positioned along the downstream zone 114 of the respective parallel channel 110 and configured to detect a cell flowing through the downstream zone 114. In this manner, the exit sensor 124 may be configured to detect a cell within the downstream zone 114 after the cell has exited the constriction zone 116. As described further below, the entry sensor 122 may be configured generate an entry sensor waveform that is indicative of cell detections in the upstream zone 112, and the exit sensor 124 may be configured generate an exit sensor waveform that is indicative of cell detections in the downstream zone 114. During signal processing, the entry sensor waveform and the exit sensor waveform may be used to determine cell transit times for respective cells flowed through the parallel channels 110. Specifically, the entry sensor waveform may be used to determine an entry timestamp for a particular cell, the exit sensor waveform may be used to determine an exit timestamp for the cell, and the cell transit time may be determined as the difference between the entry timestamp and the exit timestamp. During signal processing, the entry sensor waveform also may be used to determine cell sizes for respective cells flowed through the parallel channels 110. Specifically, a peak amplitude of the entry sensor waveform may be used to determine a cell size for a particular cell, because the amplitude of the signal generated by the entry sensor 122 may be positively correlated with cell volume. In some embodiments, the exit sensor waveform also may be used to determine cell sizes, although the peak amplitude of the exit sensor waveform may not provide as accurate a measure of cell size when a cell maintains a slightly deformed after flowing through the constriction zone 116 of the corresponding parallel channel 110. According to the illustrated example, the sensor network 120 may include a first entry sensor 122a and a first exit sensor 124a for the first channel 110a, a second entry sensor 122b and a second exit sensor 124b for the second channel 110b, a third entry sensor 122c and a third exit sensor 124c for the third channel 110c, and a fourth entry sensor 122d and a fourth exit sensor 124d for the fourth channel 110d. In some embodiments, the entry sensors 112 and the exit sensors 124 may be electrical impedance-based sensors, although other types of electrical or optical sensors may be used in other embodiments.

The sensor network 120 may implement an electrical detection technique that is based on the Microfluidic CODES scheme (see Liu, Ruxiu, et al. "Microfluidic CODES: a scalable multiplexed electronic sensor for orthogonal detection of particles in microfluidic channels." *Lab on a Chip* 16.8 (2016): 1350-1357), which enables assignment of a unique identifier to each of the parallel channels 110. This may be achieved by first defining a set of binary sequences that are orthogonal to each other, and then micropatterning electrodes of the sensors 122, 124, with the sensor electrodes represents 1's and 0's to follow these sequences for each parallel channel 110. The resulting signal produced by the electrodes can then be decoded via signal processing. Because the outputs of all the sensors 122, 124 may be summed together, cell detections that occur simultaneously will interfere with each other. It is for this reason that the orthogonal sequences may be used, as they allow decoding even in the presence of interference. The electrodes in the sensors 122, 124 may maintain an AC electric field between them (e.g., 500 kHz, 300 mVpp). When a cell flows through this field, the cell increases the impedance, and therefore reduces the measured current, between the electrode pair. The change in current manifests itself as amplitude modulation of the excitation frequency. The output signal then may be amplified, demodulated, and filtered. The demodulation may be performed in a lock-in amplifier which may be identical in principle to that of a homodyne or direct-downconversion receiver. The amplitude modulated signal then may be mixed with a frequency matched local oscillator and filtered to remove undesired artifacts. In the final output signal, the cell events may appear as a sequence of pulses, the timing of which is determined by the physical layout of the electrodes.

Figure 3:
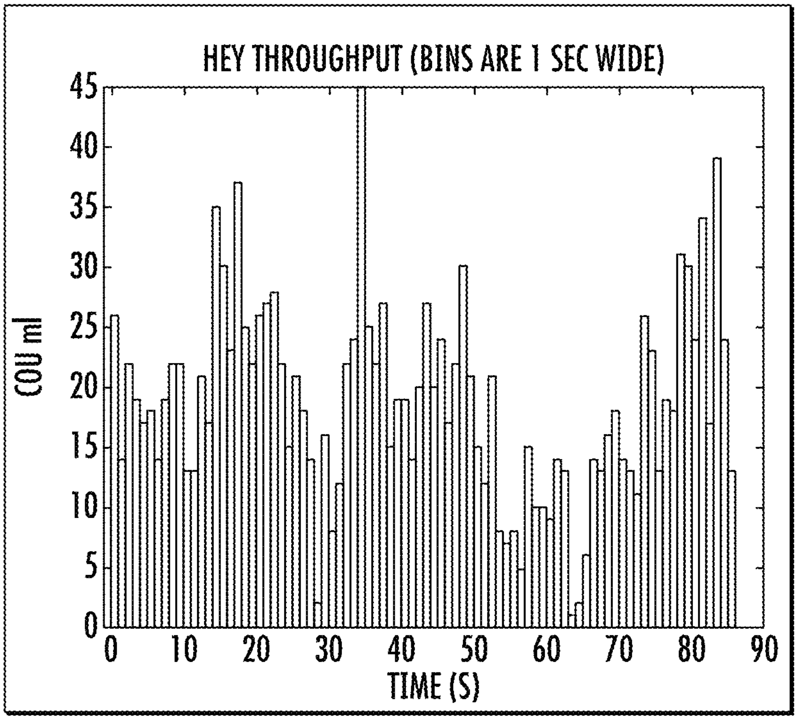
FIG. 3 depicts a bar graph of data obtained using the microfluidic device of FIG. 1, showing throughput performance for a first cell line.
Figure 4:
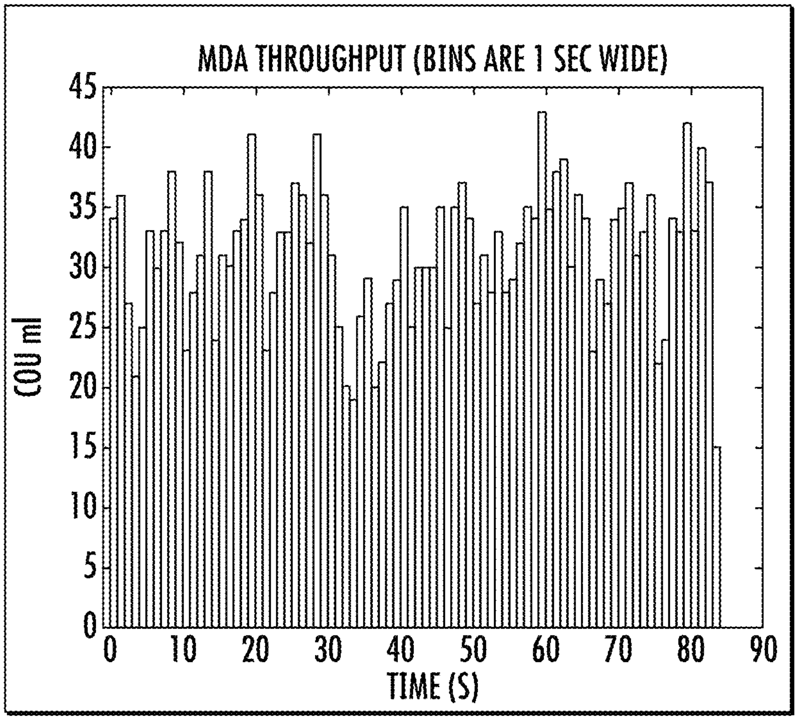
FIG. 4 depicts a bar graph of data obtained using the microfluidic device of FIG. 1, showing throughput performance for a second cell line having different deformability as compared to the first cell line.

FIGS. 3 and 4 illustrate experimental data obtained using a microfluidic device configured in a manner similar to that of the microfluidic device 100 described above. Testing was completed for two cell lines of differing deformability. Specifically, a suspension of HeyA8 ovarian cancer cells was used as the first cell line, and a suspension of MDA-MB-231 (human mammary adenocarcinoma) cells was used as the second cell line. Cell transit times were determined in accordance with the approach described above. FIG. 3 illustrates throughput performance for the first cell line. FIG. 4 illustrates throughput performance for the second cell line.

Figure 2:
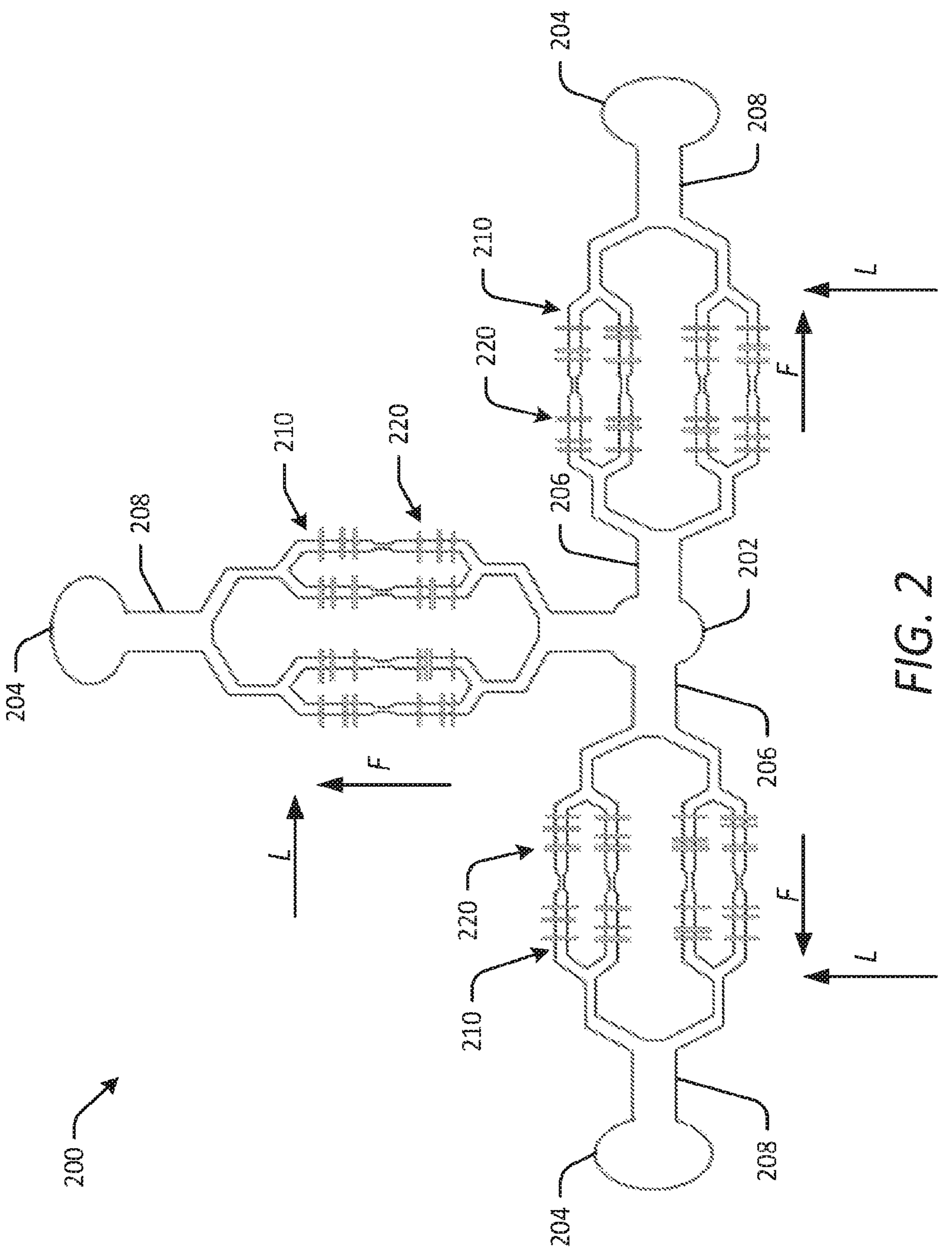
FIG. 2 depicts a top view of an example microfluidic device in accordance with one or more embodiments of the disclosure, showing an inlet, a plurality of outlets, a plurality of branches, and a sensor network of the microfluidic device, with each of the branches including a feed channel and a plurality of parallel channels each having a constriction zone.

FIG. 2 illustrates an example microfluidic device 200 (which also may be referred to as a "microfluidic cell analyzer" of a "massively parallel microfluidic cell analyzer") for cell mechanophenotyping. Certain similarities and differences between the microfluidic device 200 and the microfluidic device 100 described above will be appreciated from the following description and the corresponding figures. The primary difference is that the microfluidic device 200 includes three branches as compared to the single-branch configuration of the microfluidic device 100. As shown, the microfluidic device 200 may include an inlet 202, a plurality of outlets 204 (one for each branch), a plurality of feed channels 206 (one for each branch), a plurality of discharge channels 208 (one for each branch), a plurality of parallel channels 210 (which also may be referred to as "microchannels") for each branch, and a sensor network 220 (which also may be referred to as a "multiplexed sensor network"). During use of the microfluidic device 200, a solution including a plurality of cells may flow through the device 200 for cell mechanophenotyping. Specifically, respective portions of the solution may flow from the inlet 202 into the respective branches. For each branch, the portion of the solution may flow through the feed channel 206, through the parallel channels 210, through the discharge channel 208, and then to the outlet 204 in a direction of fluid flow F. As shown, the parallel channels 210 for each branch may be arranged and configured in a manner similar to the parallel channels 110 described above, with each channel including an upstream zone, a downstream zone, and a constriction zone.

As shown in FIG. 2, the sensor network 220 may include three banks corresponding to the three branches of the microfluidic device, with each bank including respective sensor pairs of entry sensors and exit sensors for each parallel channel 210 within the corresponding branch. In some embodiments, each bank of the sensor network 220 may provide the corresponding branch with its own unique excitation frequency. For example, the first branch may be provided with an excitation frequency of 500 kHz, the second branch may be provided with an excitation frequency of 550 kHz, and the third branch may be provided with an excitation frequency of 587 kHz. The cell detection events that occur in a given branch may only modulate the signal applied to that branch, thus achieving true frequency channelization. The outputs of each branch may be summed to produce one aggregate signal. This aggregate signal in turn may undergo the same amplification, demodulation, and filtration as described above. However, instead of a single demodulation, the aggregate signal may be duplicated to produce three copies. A local oscillator, frequency matched to one of the excitation frequencies, may be applied to one of the copies to lock onto and demodulate the contents specific to a particular frequency, and therefore a particular branch. The same principle may be applied to the remaining two copies, producing three data streams corresponding to the respective branches, which can be recorded for subsequent analysis. The microfluidic device 200 thus demonstrates the scalability of the microfluidic device 100, enabling the microfluidic device 200 to achieve roughly three times the throughput as the microfluidic device 100.

FIGS. 5A-5L illustrate various features that may be implemented with the microfluidic device 100 or the microfluidic device 200 described above as well as other microfluidic device configurations. Such features may be implemented in certain embodiments to improve performance of a microfluidic device. As described below, the features discussed with reference to FIGS. 5A-5D relate to spatial control of cells prior to the cells entering parallel channels of a microfluidic device, while the features discussed with reference to FIGS. 5E and 5F relate to the mechanism used to impose stress on cells within parallel channels of a microfluidic device (i.e., features related to constriction zones of the parallel channels). FIGS. 5G-5L illustrate various combinations of the features discussed with reference to FIGS. 5A-5F in a microfluidic device.

Figure 5A:
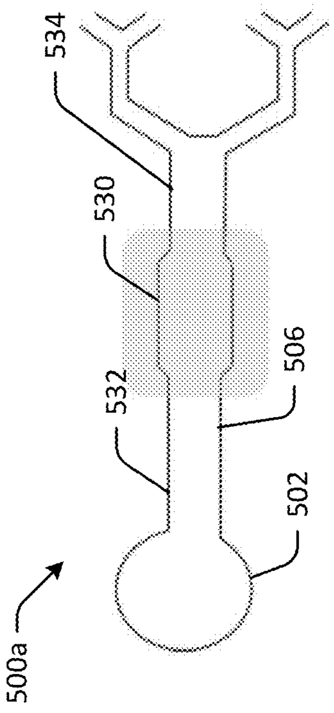
FIG. 5A depicts a top view of a portion of an example microfluidic device in accordance with one or more embodiments of the disclosure, showing an inlet and a feed channel of the microfluidic device, with the feed channel including an expansion zone.

FIG. 5A illustrates a portion of an example microfluidic device **500*a* that is configured to provide spatial control of cells prior to the cells entering parallel channels of the microfluidic device 500*a*. As shown, the microfluidic device 500*a* may include an inlet 502 and a feed channel 506. It will be appreciated that the microfluidic device 500*a* also may include additional features corresponding to those of the microfluidic devices described herein. Because there is no direct control over spatial distribution of cells within a given unit volume of a solution, cell arrival at the parallel channels of a microfluidic device often may be sporadic and may hinder optimal usage of the device. For example, when relatively many cells arrive at the parallel channels at once, the amount of interference caused by excessive coincident cell detections may surpass the decoding limit of the sensor scheme and lead to some detection errors. To address this potential concern, the feed channel of a microfluidic device may be provided with an expansion zone (which also may be referred to as an "expansion chamber" or an "expansion portion") configured to impose a minimum interparticle spacing. According to the illustrated embodiment, the feed channel 506 may include an expansion chamber 530 positioned between an upstream zone 532 and a downstream zone 534 of the feed channel 506. In this manner, the solution may flow in the direction of fluid flow F through the upstream zone 532, through the expansion chamber 530, and then through the downstream zone 534. The upstream zone 532 may have a first cross-sectional area in the lateral direction L, the downstream zone 534 may have a second cross-sectional area in the lateral direction L, and the expansion zone 530 may have a third cross-sectional area in the lateral direction L. As shown, the third cross-sectional area may be greater than each of the first cross-sectional area and the second cross-sectional area. In other words, the expansion zone 530 may have a larger cross-sectional area that each of the upstream zone 532 and the downstream zone 534. In some embodiments, as shown, the first cross-sectional area may be equal to the second cross-sectional area. In other words, the upstream zone 532 and the downstream zone 534 may have the same cross-sectional area. During use of the microfluidic device 500*a*, the expansion zone 530 may facilitate spacing of cells in the solution in the direction of fluid flow F as the solution flows through the feed channel 506 prior to entry into the bifurcations and the parallel chambers of the device 500*a***.

Figure 5B:
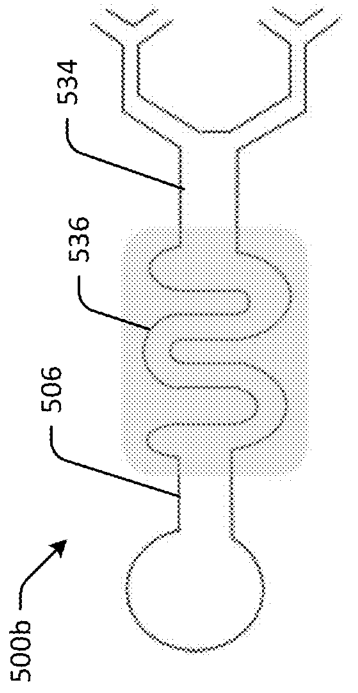
FIG. 5B depicts a top view of a portion of an example microfluidic device in accordance with one or more embodiments of the disclosure, showing an inlet and a feed channel of the microfluidic device, with the feed channel including an inertial focuser.

FIG. 5B illustrates a portion of an example microfluidic device 500*b* that is configured to provide spatial control of cells prior to the cells entering parallel channels of the microfluidic device 500*b*. As shown, the microfluidic device 500*b* may include an inlet 502 and a feed channel 506. It will be appreciated that the microfluidic device 500*b* also may include additional features corresponding to those of the microfluidic devices described herein. Although the expansion zone 530 of the of the microfluidic device 500*a* described above may facilitate spacing of cells in a solution, the expansion zone 530 does so only along the longitudinal axis of the feed channel (i.e., in the direction of fluid flow F). Accordingly, if two or more cells have similar longitudinal positions but different lateral positions, the expansion zone 530 may not successfully impose a desired minimum longitudinal interparticle spacing. To address this potential concern, the feed channel of a microfluidic device may be provided with an inertial focuser (which also may be referred to as an "inertial cell focuser") configured to inhibit cell overlap in the lateral direction L. According to the illustrated embodiment, the feed channel 506 may include an inertial focuser 536 positioned between an upstream zone 532 and a downstream zone 534 of the feed channel 506. In this manner, the solution may flow in the direction of fluid flow F through the upstream zone 532, through the inertial focuser 536, and then through the downstream zone 534. As shown, the upstream zone 532 may have a linear shape, the downstream zone 534 may have a linear shape, and the inertial focuser 536 may have a contoured shape. For example, the inertial focuser 536 may have a serpentine shape, as shown, although other suitable shapes may be used in other embodiments. During use of the microfluidic device 500*b*, the inertial focuser 536 may inhibit cell overlap in the lateral direction L as the solution flows through the feed channel 506 prior to entry into the bifurcations and the parallel chambers of the device 500.

Figure 5C:
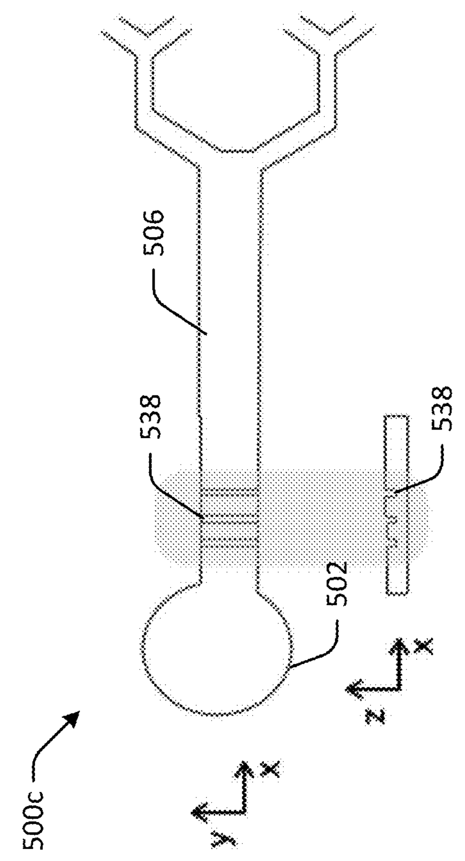
FIG. 5C depicts a top view and a partial side view of a portion of an example microfluidic device in accordance with one or more embodiments of the disclosure, showing an inlet and a feed channel of the microfluidic device, with the feed channel having a plurality of protrusions extending into the feed channel.

FIG. 5C illustrates a portion of an example microfluidic device 500*c* that is configured to provide spatial control of cells prior to the cells entering parallel channels of the microfluidic device 500*c*. As shown, the microfluidic device 500*c* may include an inlet 502 and a feed channel 506. It will be appreciated that the microfluidic device 500*c* also may include additional features corresponding to those of the microfluidic devices described herein. Similar to the potential challenge of having multiple cells overlapping in the lateral direction L, as discussed above, cells may overlap in the vertical direction V as well. To address this potential concern, the feed channel of a microfluidic device may be provided with one or more protrusions configured to inhibit cell overlap in the vertical direction V. According to the illustrated embodiment, the feed channel 506 may include a plurality of protrusions 538 extending vertically into the feed channel 506. In some embodiments, as shown, the protrusions 538 may extend downward from a top of the feed channel 506. In this manner, the solution may flow in the direction of fluid flow F under the protrusions 538. In other embodiments, the protrusions 538 may extend upward from a bottom of the feed channel 506. In this manner, the solution may flow in the direction of fluid flow F over the protrusions 538. In some embodiments, as shown, each protrusions 538 may be formed as an elongated rib, and the protrusions 538 collectively may form a stepped structure, although other suitable shapes and configurations of the protrusions 538 may be used in other embodiments. During use of the microfluidic device 500*c*, the protrusions 538 may inhibit cell overlap in the vertical direction V as the solution flows through the feed channel 506 prior to entry into the bifurcations and the parallel chambers of the device 500*c*.

Figure 5D:
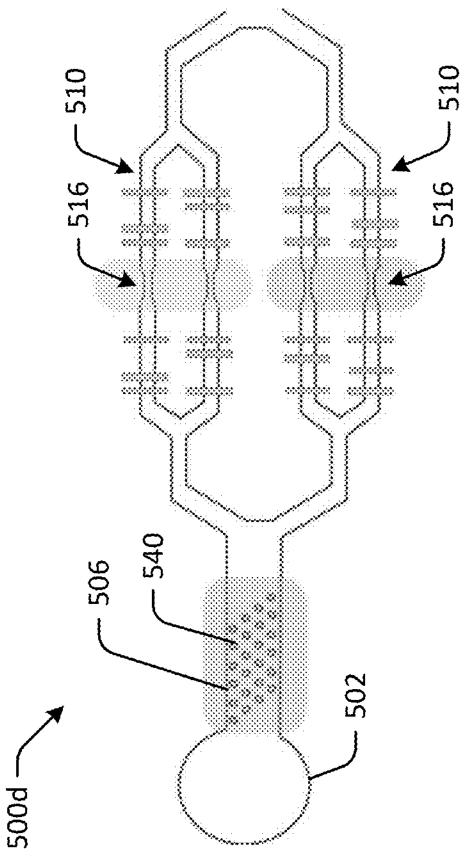
FIG. 5D depicts a top view of a portion of an example microfluidic device in accordance with one or more embodiments of the disclosure, showing an inlet, a feed channel, and a plurality of parallel channels of the microfluidic device, with a plurality of micropillars extending into the feed channel, and with the parallel channels having constriction zones of different widths.

FIG. 5D illustrates a portion of an example microfluidic device 500*d* that is configured to provide spatial control of cells prior to the cells entering parallel channels of the microfluidic device 500*d*. As shown, the microfluidic device 500*d* may include an inlet 502, a feed channel 506, and a plurality of parallel channels 510 each having constriction zones 516. It will be appreciated that the microfluidic device 500*d* also may include additional features corresponding to those of the microfluidic devices described herein. Another potential challenge faced by a microfluidic device having parallel channels with constriction zones is clogging of the constriction zones caused by large and/or stiff cells. Such clogging reduces throughput and disturbs the flow rate of the solution through the unclogged parallel channels. To address this potential concern, the constriction zones of different parallel channels of a microfluidic device may be provided with different cross-sectional areas, and the feed channel may be provided with a sorting structure configured to direct larger cells to parallel channels having a larger cross-sectional area. According to the illustrated embodiment, the constriction zones 516 of two of the parallel channels 510 may have a larger cross-sectional area than the cross-sectional area of the constriction zones 516 of the other two parallel channels 510. For example, the larger cross-sectional area may be provided by having a larger width, while the height of the constriction zones 516 of all of the parallel channels 510 is the same. Further, according to the illustrated embodiment, a sorting structure in the form of a plurality of micropillars 540 may extend vertically into the feed channel and may be configured to direct larger cells to the parallel channels 510 having the larger cross-sectional area and to direct smaller cells to the parallel channels 510 having the smaller cross-sectional area. In some embodiments, as shown, the micropillars 540 may be arranged in an array configured to direct the cells of different sizes toward the desired parallel channels 510. During use of the microfluidic device 500*d*, the micropillars 540 may inhibit cell clogging of the constriction zones 516 of the parallel channels 510 as the cells in the solution are directed to parallel channels 510 better suited for the size of the cells.

Figure 5E:
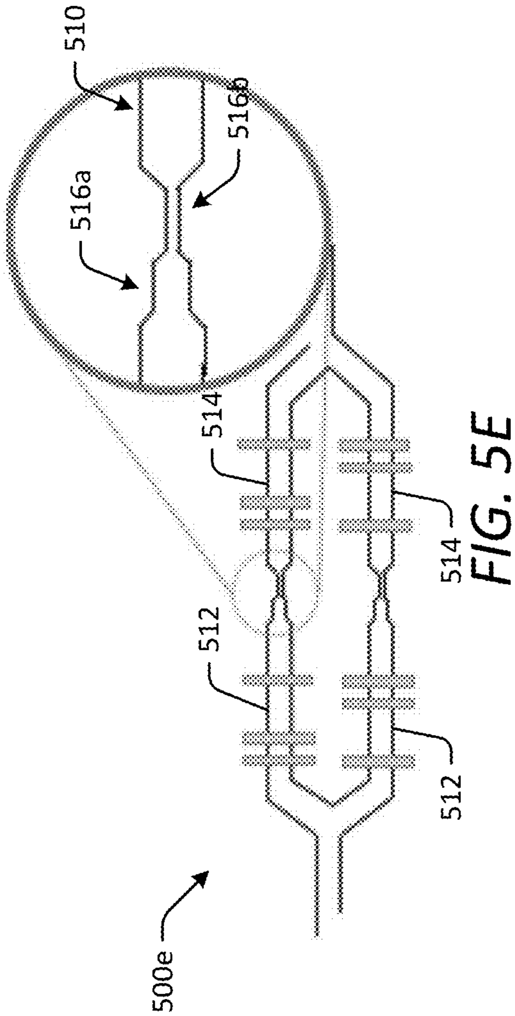
FIG. 5E depicts a top view of a portion of an example microfluidic device in accordance with one or more embodiments of the disclosure, showing a plurality of parallel channels of the microfluidic device, with the parallel channels each having a plurality of constriction zones of different widths.

FIG. 5E illustrates a portion of an example microfluidic device 500*e* that is configured to impose desired stress on cells, particularly highly deformable cells, traversing parallel channels of the microfluidic device 500*e*. As shown, the microfluidic device 500*e* may include a plurality of parallel channels 510 each having a plurality of constriction zones 516. It will be appreciated that the microfluidic device 500*e* also may include additional features corresponding to those of the microfluidic devices described herein. As discussed above, larger cells generally may take longer to pass through a constriction zone than smaller cells. During experimental testing, high-speed camera footage has shown that a cell spends a drastically longer time during the compression phase than traversing the constriction zone itself. In some instances, it may be desirable to amplify the time spent by larger cells in traversing a constriction zone. To achieve that purpose, parallel channels each having a multi-constriction configuration may be used instead of a single-constriction configuration. Although it is not expected that smaller cells will experience an appreciable difference in transit time with a multi-constriction configuration, the increased number of compressions experienced by larger cells will cause larger cells to experience longer transit times. The use of a multi-constriction configuration may be especially beneficial for highly deformable cells, as the transit times of larger cells generally may not be dramatically longer than those of their smaller counterparts when using a single-constriction configuration. According to the illustrated embodiment, each of the parallel channels 510 may include a plurality of constriction zones 516 positioned between the upstream zone 512 and the downstream zone 514 of the channel 510. For example, each of the parallel channels 510 may include a first constriction zone 516*a* and a second constriction zone 516*b*, with the first constriction zone 516*a* being positioned between the upstream zone 512 and the second constriction zone 516*b*. As shown, the first constriction zone 516*a* may have a larger cross-sectional area than the cross-sectional area of the second constriction zone 516*b*. For example, the larger cross-sectional area may be provided by having a larger width, while the height of the constriction zones 516*a*, 516*b* is the same. During use of the microfluidic device 500*e*, a larger cell may experience two compressions, one compression when the cell enters the first constriction zone 516*a*, and another compression when the cell enters the second constriction zone 516*b*, thereby amplifying the time spent by the larger cell in traversing the parallel channel 510.

Figure 5F:
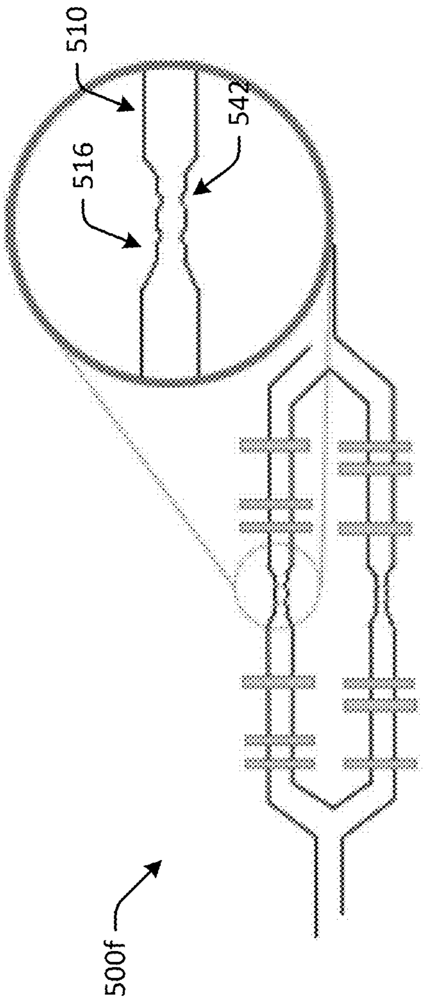
FIG. 5F depicts a top view of a portion of an example microfluidic device in accordance with one or more embodiments of the disclosure, showing a plurality of parallel channels of the microfluidic device, with the parallel channels each having a plurality of protrusions extending into a constriction zone of the parallel channel.

FIG. 5F illustrates a portion of an example microfluidic device 500*f* that is configured to impose desired stress on cells traversing parallel channels of the microfluidic device 500*f*. As shown, the microfluidic device 500*f* may include a plurality of parallel channels 510 each having a constriction zone 516. It will be appreciated that the microfluidic device 500*f* also may include additional features corresponding to those of the microfluidic devices described herein. As discussed above, a potential challenge faced by a microfluidic device having parallel channels each with a single constriction zone is clogging of the constriction zone caused by large and/or stiff cells. Such clogging reduces throughput and disturbs the flow rate of the solution through the unclogged parallel channels. To address this potential concern to minimize the chances of clogging while still maintaining a deformability dependent method to stress the cells, the constriction zone of each parallel channel of a microfluidic device may be provided with a plurality of protrusions (which also may be referred to as "micro-protrusions") extending into the parallel channel. According to the illustrated embodiment, the constriction zones 516 of the parallel channels 510 each may include a plurality of protrusions 542 extending into the parallel channel 510. In some embodiments, as shown, the protrusions 542 may extend laterally into the parallel channel 510 from each of the sidewalls of the channel 510, although other suitable configurations of the protrusions 542 may be used in other embodiments. During use of the microfluidic device 500*f*, the protrusions 542 may increase friction between cells and the walls of the parallel channel 510, with larger cells having more area in contact with the protrusions 542 and thus experiencing more friction, leading to a longer transit time.

In some embodiments, the constriction zones described herein may be formed by fixed walls defining the parallel channels. In other embodiments, constriction zones may be defined at least in part by one or more expandable members to allow variation of the cross-sectional area of the constriction zones. In this manner, the cross-sectional area of a constriction zone may be dynamically changed to accommodate a particular use of a microfluidic device. For example, an expandable member may be positioned along a constriction zone and configured to expand between a first state and a second state to vary a cross-sectional area of the constriction zone. In some embodiments, the expandable member may include an inflatable bladder, such as a fluid-inflatable bladder, configured to be inflated and deflated between the first state and the second state to increase or decrease the cross-sectional area of the constriction zone. In some embodiments, the expandable member may be positioned along the side or the top of the constriction zone, although other configurations may be used in other embodiments.

Figure 5G:
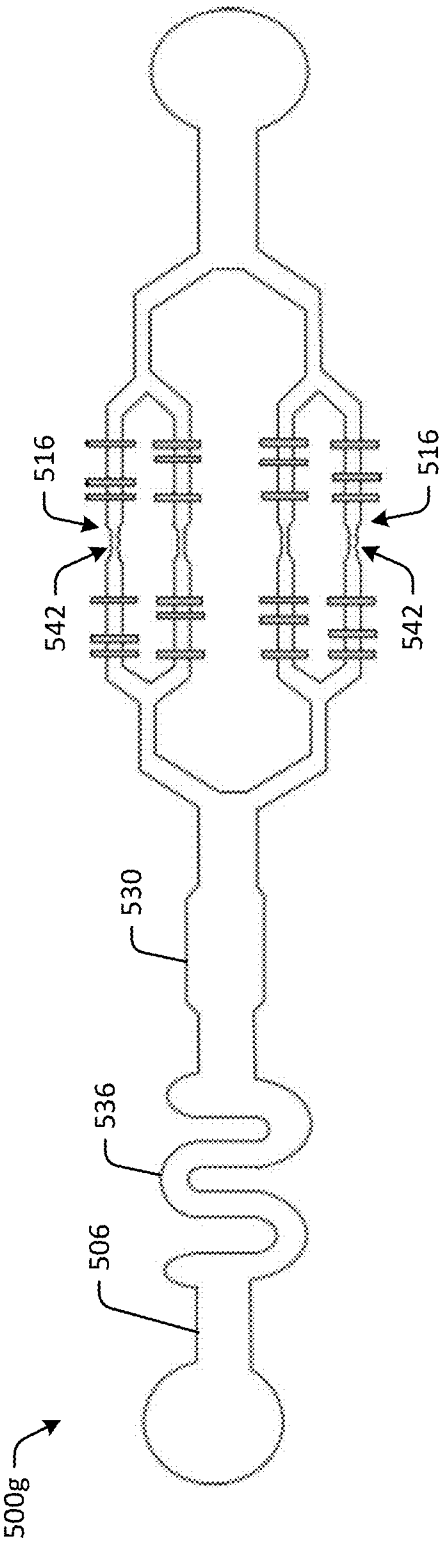
FIG. 5G depicts a top view of an example microfluidic device in accordance with one or more embodiments of the disclosure, showing an inlet, a feed channel, an outlet, a plurality of parallel channels each having a constriction zone, and a sensor network of the microfluidic device, with the feed channel including an inertial focuser and an expansion zone, and with the parallel channels each having a plurality of protrusions extending into the constriction zone of the parallel channel.
Figure 5H:
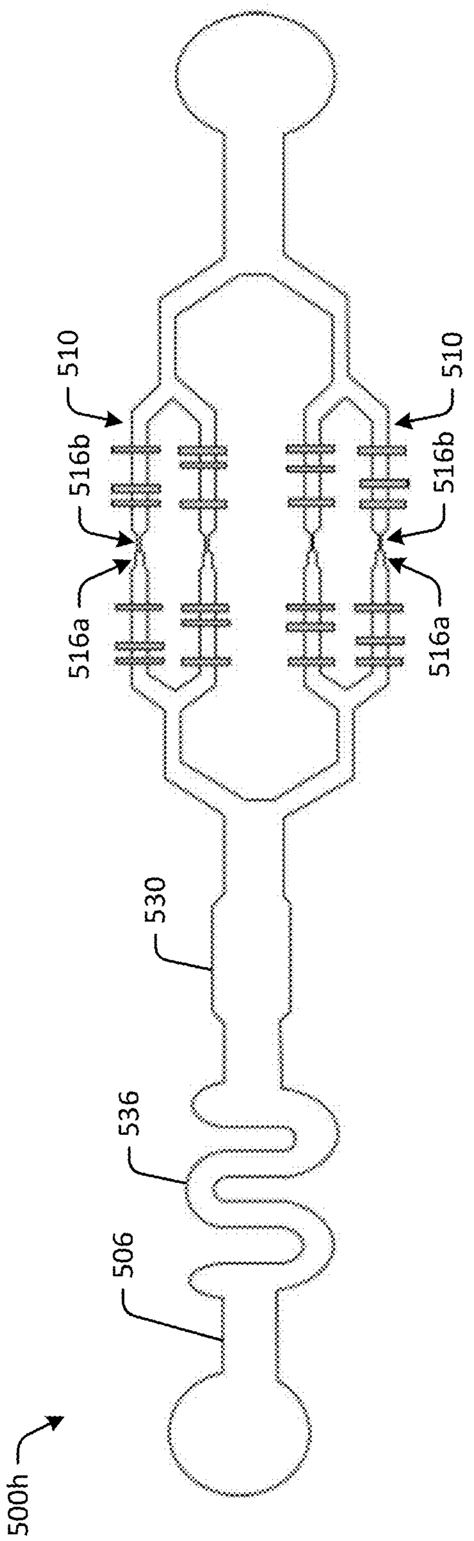
FIG. 5H depicts a top view of an example microfluidic device in accordance with one or more embodiments of the disclosure, showing an inlet, a feed channel, an outlet, a plurality of parallel channels, and a sensor network of the microfluidic device, with the feed channel including an inertial focuser and an expansion zone, and with the parallel channels each having a plurality of constriction zones of different widths.
Figure 5I:
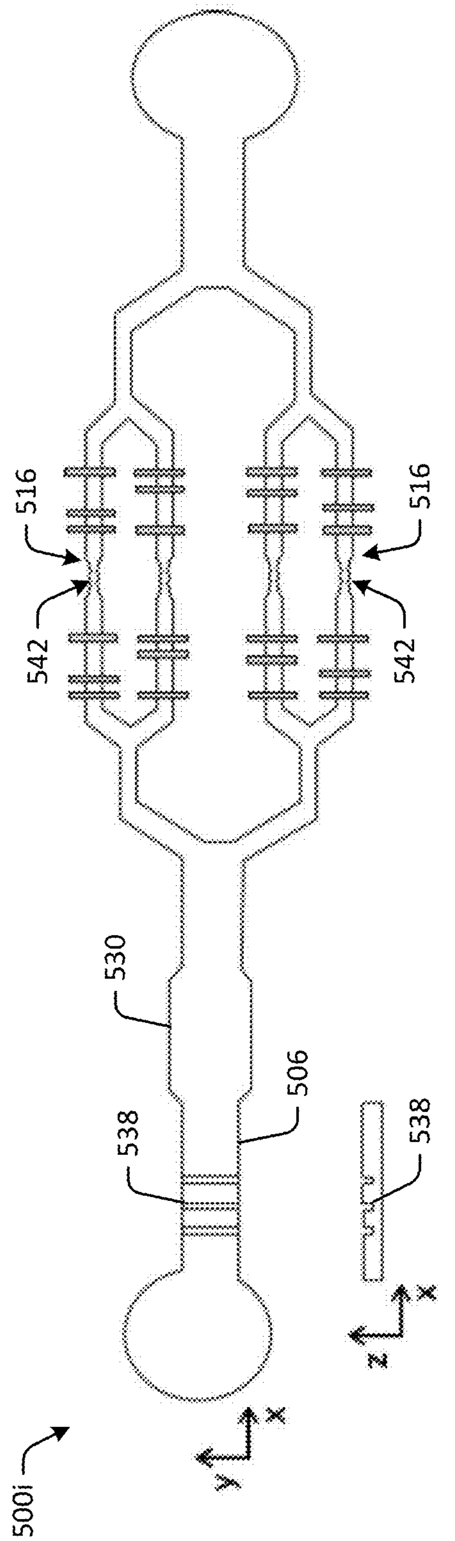
FIG. 5I depicts a top view and a partial side view of an example microfluidic device in accordance with one or more embodiments of the disclosure, showing an inlet, a feed channel, an outlet, a plurality of parallel channels each having a constriction zone, and a sensor network of the microfluidic device, with the feed channel including an expansion zone and having a plurality of protrusions extending into the feed channel, and with the parallel channels each having a plurality of protrusions extending into the constriction zone of the parallel channel.
Figure 5J:
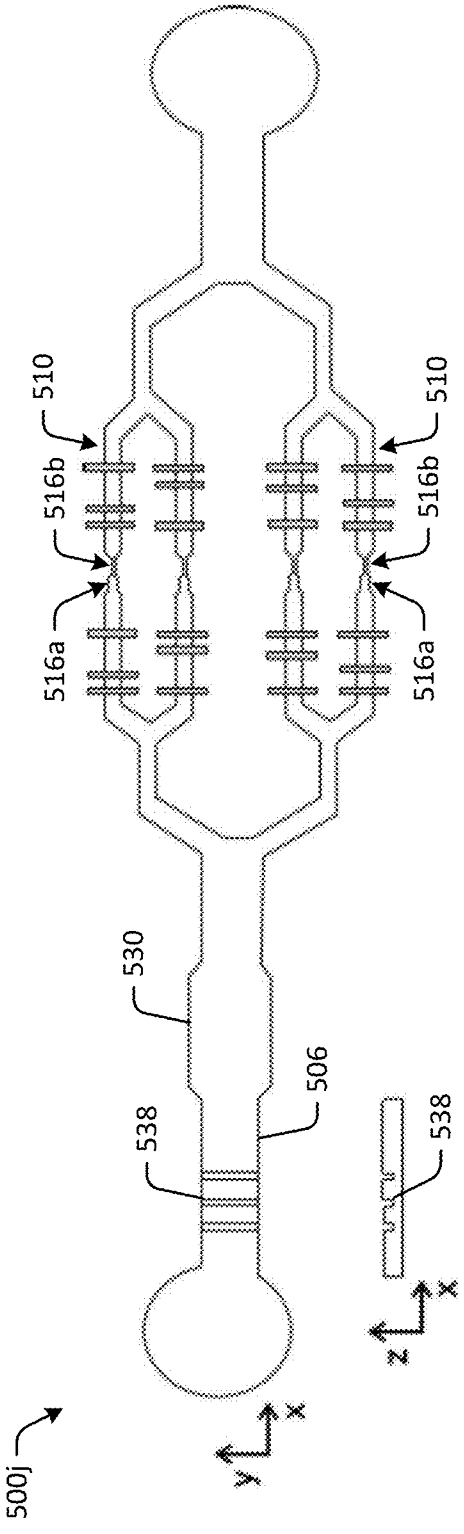
FIG. 5J depicts a top view and a partial side view of an example microfluidic device in accordance with one or more embodiments of the disclosure, showing an inlet, a feed channel, an outlet, a plurality of parallel channels, and a sensor network of the microfluidic device, with the feed channel including an expansion zone and having a plurality of protrusions extending into the feed channel, and with the parallel channels each having a plurality of constriction zones of different widths.
Figure 5K:
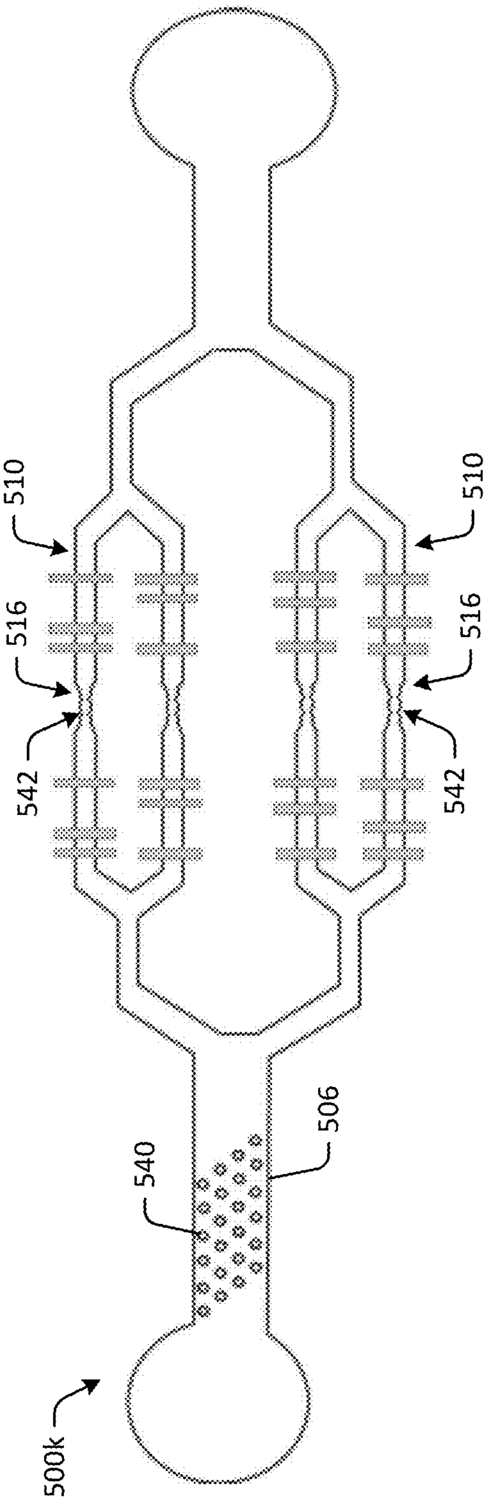
FIG. 5K depicts a top view of an example microfluidic device in accordance with one or more embodiments of the disclosure, showing an inlet, a feed channel, an outlet, a plurality of parallel channels, and a sensor network of the microfluidic device, with the feed channel having a plurality of micropillars extending into the feed channel, with the parallel channels having constriction zones of different widths, and with the parallel channels each having a plurality of protrusions extending into the constriction zone of the parallel channel.
Figure 5L:
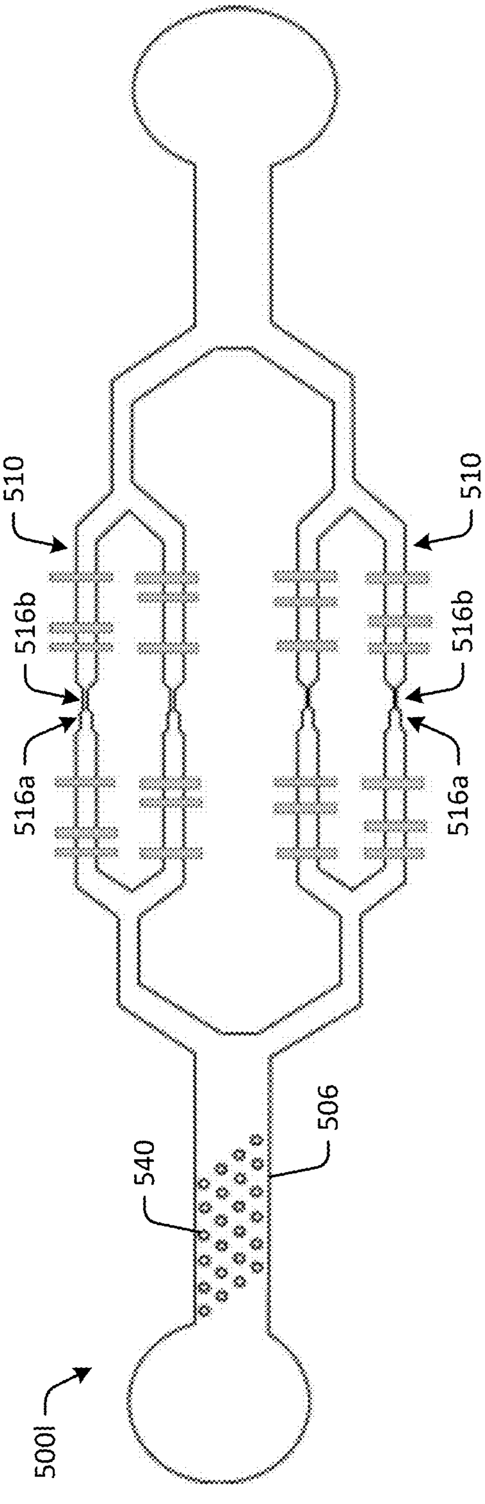
FIG. 5L depicts a top view of an example microfluidic device in accordance with one or more embodiments of the disclosure, showing an inlet, a feed channel, an outlet, a plurality of parallel channels, and a sensor network of the microfluidic device, with the feed channel having a plurality of micropillars extending into the feed channel, with the parallel channels having constriction zones of different widths, and with the parallel channels each having a plurality of constriction zones of different widths.

FIGS. 5G-5L illustrate various combinations of the features discussed with reference to FIGS. 5A-5F in a microfluidic device. FIG. 5G shows a microfluidic device 500*g* that includes the expansion zone 530 and the inertial focuser 536 of the feed channel 506, as well as the protrusions 542 of the constriction zones 516. FIG. 5H shows a microfluidic device 500*h* that includes the expansion zone 530 and the inertial focuser 536 of the feed channel 506, as well as the plurality of constriction zones 516*a*, 516*b* of the parallel channels 510. FIG. SI shows a microfluidic device 500*i* that includes the expansion zone 530 and the protrusions 538 of the feed channel 506, as well as the protrusions 542 of the constriction zones 516. FIG. 5J shows a microfluidic device 500*j* that includes the expansion zone 530 and the protrusions 538 of the feed channel 506, as well as the plurality of constriction zones 516*a*, 516*b* of the parallel channels 510. FIG. 5K shows a microfluidic device 500*k* that includes the micropillars 540 of the feed channel 506, as well as the protrusions 542 of the constriction zones 516 and the parallel channels 510 having different cross-sectional areas. FIG. 5L shows a microfluidic device 500*l* that includes the micropillars 540 of the feed channel 506, as well as the plurality of constriction zones 516*a*, 516*b* of the parallel channels 510 and the parallel channels 510 having different cross-sectional areas. Still other combinations of the features described above may be used in other embodiments.

Figure 6B:
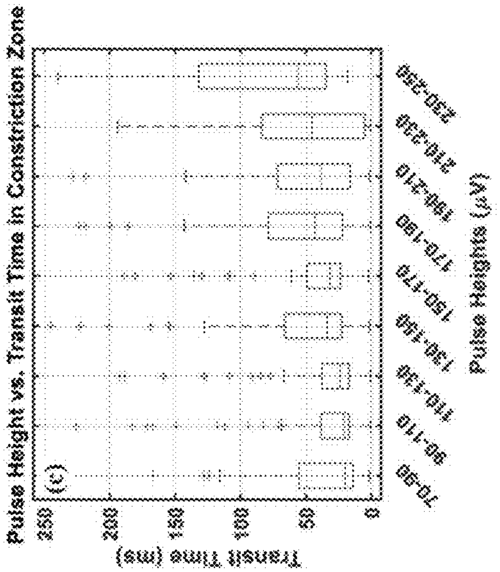
FIG. 6B depicts a box-whisker plot of data obtained using the microfluidic device of FIG. 6A, showing cell transit time versus peak height for a single cell line.
Figure 6A:
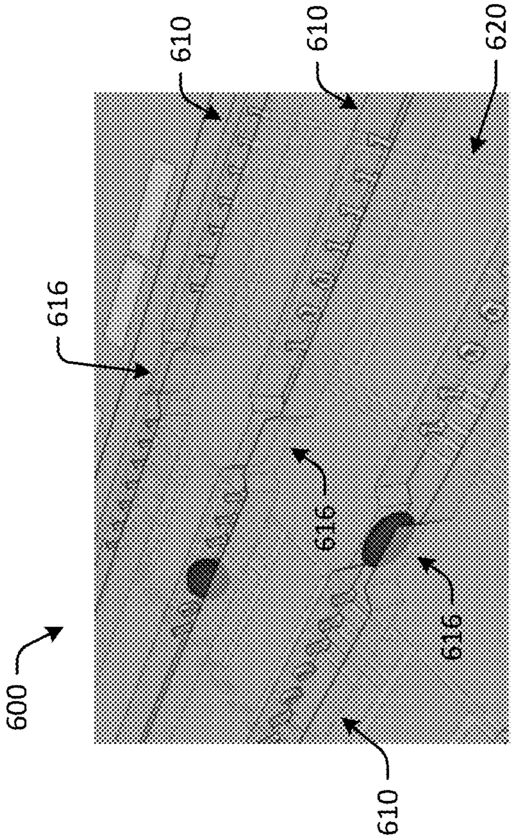
FIG. 6A depicts a perspective view of a portion of an example microfluidic device in accordance with one or more embodiments of the disclosure, showing a plurality of parallel channels, and a sensor network of the microfluidic device, with the parallel channels each having a constriction zone, and with cells passing through the parallel channels.

FIG. 6A illustrates an example microfluidic device 600 (which also may be referred to as a "microfluidic cell analyzer" of a "massively parallel microfluidic cell analyzer") for cell mechanophenotyping. Certain similarities and differences between the microfluidic device 600 and the microfluidic devices described above will be appreciated from the following description and the corresponding figures. As shown, the microfluidic device 600 may include a plurality of parallel channels 610 (which also may be referred to as "microchannels") each including a constriction zone 616, and a sensor network 620 (which also may be referred to as a "multiplexed sensor network").

Figure 6C:
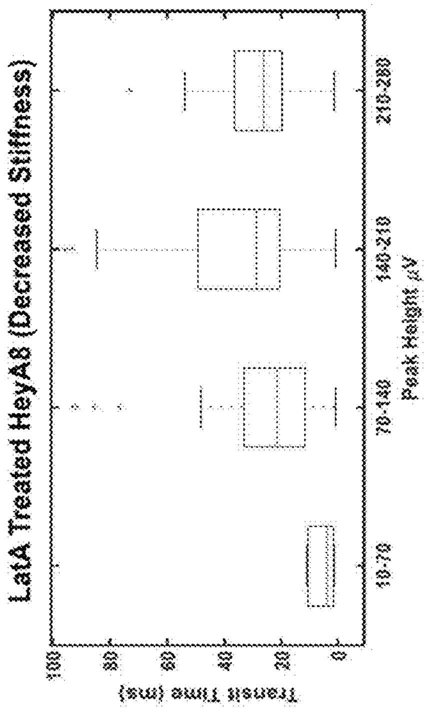
FIG. 6C depicts a box-whisker plot of data obtained using the microfluidic device of FIG. 6A, showing cell transit time versus peak height for a first suspension of cells having a decreased stiffness.
Figure 6D:
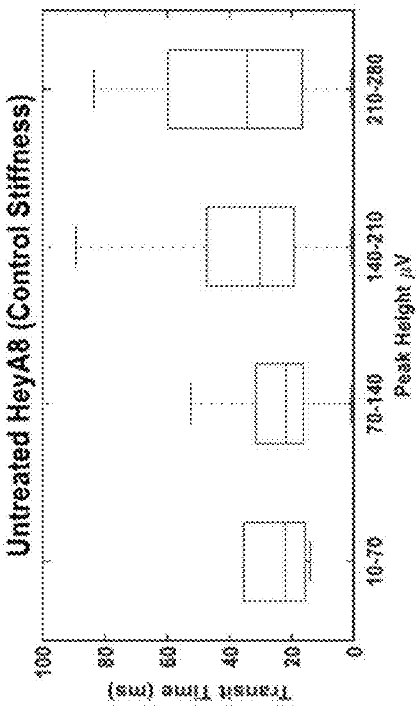
FIG. 6D depicts a box-whisker plot of data obtained using the microfluidic device of FIG. 6A, showing cell transit time versus peak height for a second suspension of cells having a control stiffness.
Figure 6E:
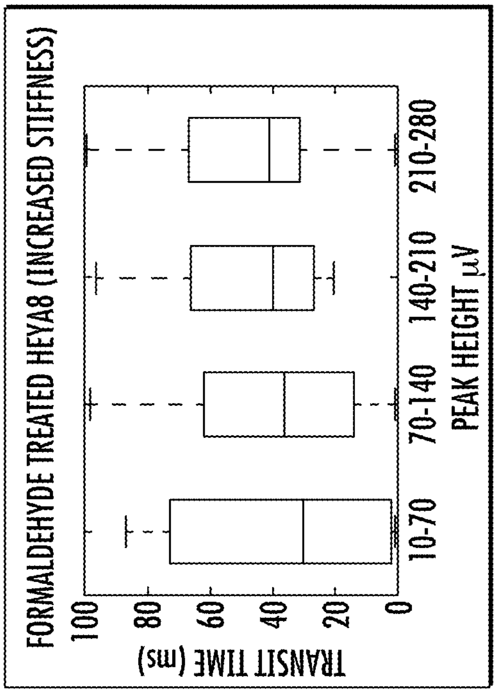
FIG. 6E depicts a box-whisker plot of data obtained using the microfluidic device of FIG. 6A, showing cell transit time versus peak height for a third suspension of cells having an increased stiffness.
Figure 6F:
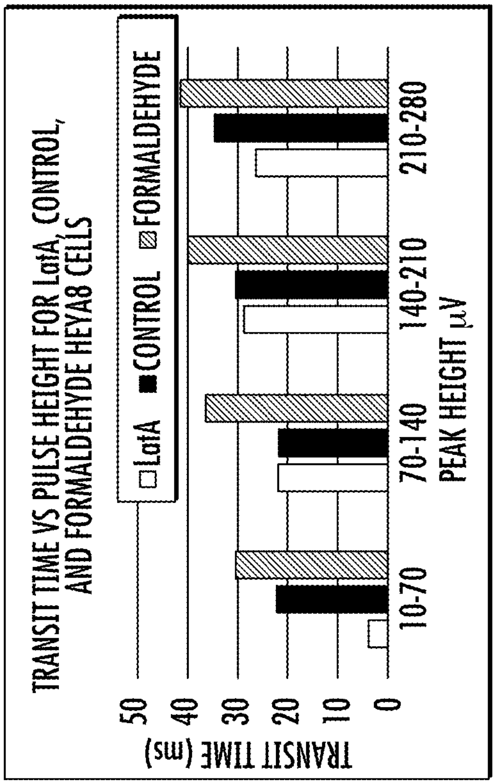
FIG. 6F depicts a bar graph of data obtained using the microfluidic device of FIG. 6A, showing medians of cell transit times for ranges of peak heights for the first suspension of cells, the second suspension of cells, and the third suspension of cells.

FIGS. 6B-6F illustrate experimental data obtained using the microfluidic device 600. FIG. 6B shows cell transit time versus peak height for a single cell line, a suspension of HeyA8 ovarian cancer cells. Cell transit times were determined in accordance with the approach described above. As shown, the plot of the transit time as a function of the pulse height shows larger cells taking longer to pass through the constriction zones. Cells that produced 70-90 μV large pulse heights had an average transit time of 17.43 ms, whereas those that produced the larger 230-250 μV pulse heights took an average of 73.28 ms. FIGS. 6C-6E show cell transit time versus peak height for three different suspensions of cells having differing stiffness. In the testing, Phosphate Buffered Saline (PBS) suspended HeyA8 ovarian cancer cells were driven through the device using a pressure pump controller (Fluigent MFCS-EZ) at 80 mbar. Three suspensions of cells with varying stiffness were prepared. The first sample was exposed to 1 μM Latrunculin A, abbreviated as LatA, (Sigma-Aldrich), an Actin polymerization inhibitor, for 60 mins at 37° C. to reduce the cell stiffness. The second sample was left untreated. The third sample was exposed to a 70 nM Formaldehyde (Sigma-Aldrich) solution for 7 mins at room temperature to increase the cell stiffness. In operation, the sensor network 620 was driven with an 500 kHz AC signal and the electrical sensor data from the chip was recorded using a lock-in-amplifier (Zurich Instruments HF2LI) and sampled into a computer. The cell size and the transit time were both measured from the sensor signal peak amplitude and the time delay between the code waveforms corresponding to sensor pairs, respectively. The expected positive correlation between stiffness and transit time was observed. On average, the transit time of the untreated cells was 34% longer than that of the LatA treated cells. Similarly, the Formaldehyde treated cells had a 36% longer transit time compared to the untreated cells. The peak signal amplitude was also positively correlated with the transit time. When measured transit time values for each of the three cell samples were binned according to the peak signal amplitude, larger signal amplitudes registered longer transit times for all three stiffness levels, thereby confirming that larger cells take more time to deform and pass through the constriction. The cell transit time versus peak height data for the three different suspensions of cells are shown in FIGS. 6C-6E, respectively. FIG. 6F shows medians of cell transit times for ranges of peak heights for the respective suspensions of cells.

Figure 7A:
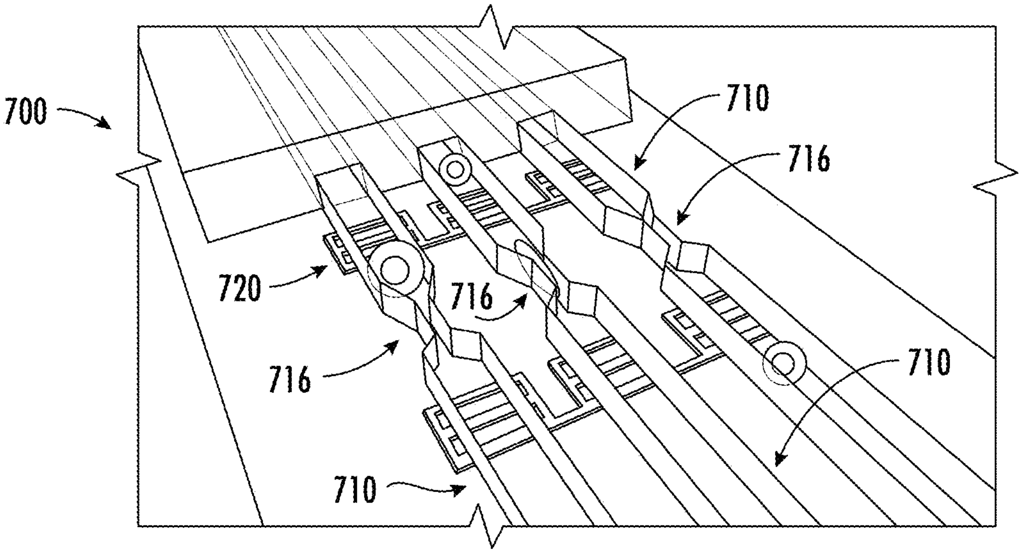
FIG. 7A depicts a perspective view of a portion of an example microfluidic device in accordance with one or more embodiments of the disclosure, showing a plurality of parallel channels, and a sensor network of the microfluidic device, with the parallel channels each having a constriction zone, and with cells passing through the parallel channels.
Figure 7B:
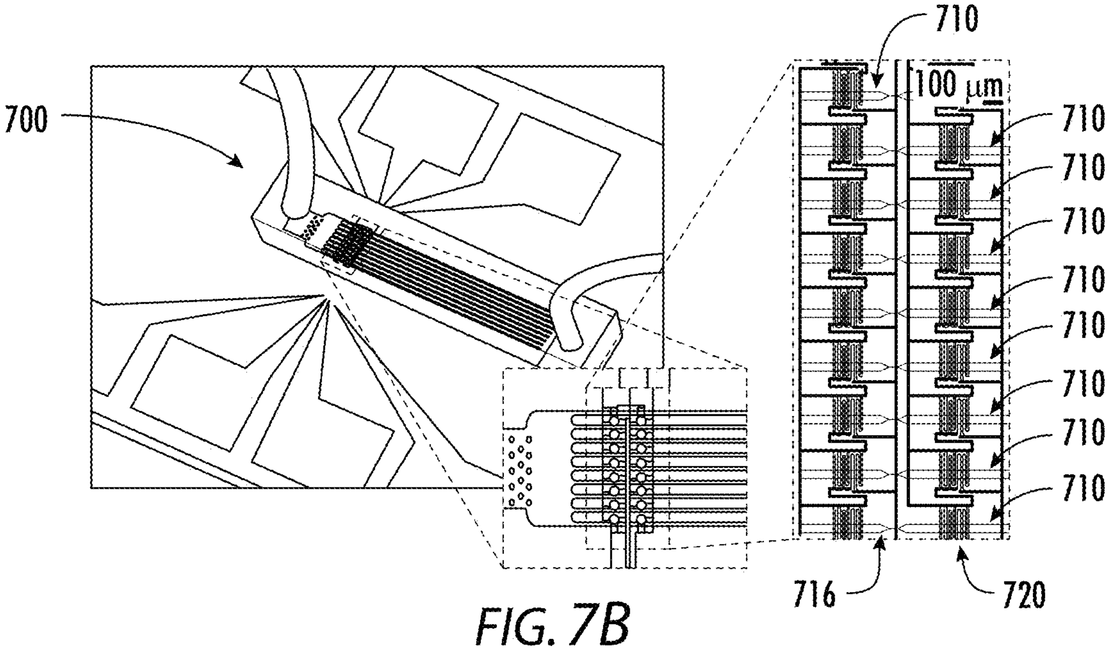
FIG. 7B depicts a perspective view of the microfluidic device of FIG. 7A, showing the parallel channels, the sensor network, an inlet, and an outlet of the microfluidic device.

FIGS. 7A and 7B illustrate an example microfluidic device 700 (which also may be referred to as a "microfluidic cell analyzer" of a "massively parallel microfluidic cell analyzer") for cell mechanophenotyping. Certain similarities and differences between the microfluidic device 700 and the microfluidic devices described above will be appreciated from the following description and the corresponding figures. As shown, the microfluidic device 700 may include a plurality of parallel channels 710 (which also may be referred to as "microchannels" or "microconstrictions") each including a constriction zone 716, and a sensor network 720 (which also may be referred to as a "multiplexed sensor network"). FIG. 7A shows the device 700 with the sensor network 700 including coded electrical sensors strategically placed to timestamp each cell immediately before and after it traverses any of the parallel microconstrictions 710. FIG. 7B shows the parallel channels 710 of the device 700 and the alignment of the channels 710 with surface electrodes of the sensor network 720 positioned to log the cell entry times and exit times.

Similar to the embodiments described above, microfluidic device 700 couples the parallel microconstrictive channels 710 for mechanical manipulation of cells with the electrical sensor network 720 for quantitative measurement of cells' responses to the microconstrictions 716. The electrical sensor network 720 may be based on the Microfluidic CODES platform, which employs micromachined electrodes to generate location-specific signature waveforms to multiplex cytometry data in a single electrical waveform. With this scheme, each microconstriction 716 of the device 700 may be simultaneously monitored by a pair of electrical sensors formed by distinctly micropatterned electrodes. These distinct electrode patterns sandwiching each microconstriction 716 may generate unique electrical waveforms each time a cell enters into and exits from a microconstriction 716, effectively labeling each cell event with a pair of digital identifiers in the output signal (see FIG. 7B). These digital identifiers can then be recognized through signal processing and each event can uniquely be mapped to the specific microconstriction 716 of the device 700. Therefore, not only can the transit time for each cell be measured by calculating the time delay between entry and exit signals, but the cell size also can be independently determined from the amplitude of the sensor waveforms due to the Coulter principle.

Figure 7C:
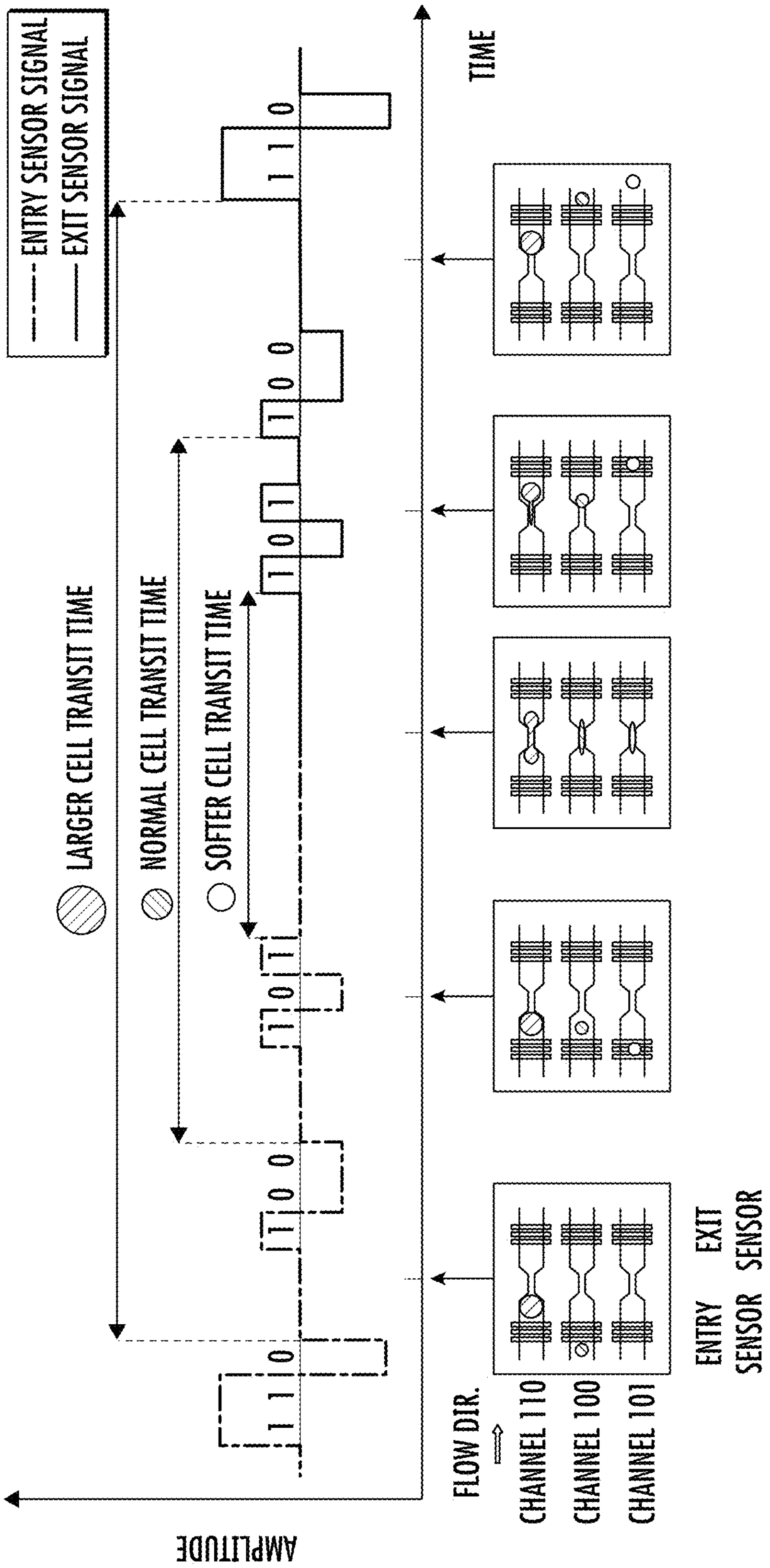
FIG. 7C depicts a hybrid graph and flow diagram for three cells of different sizes and stiffnesses flowing through the microfluidic device of FIG. 7A.

To achieve a high throughput, the technique implemented by the device 700 may overcome the inherent time delay in constriction-based analysis of cells in two steps. First, by detecting the cell only before and after the constriction 716, measurements may be performed on a cell when it is flowing at high speed instead of when it is significantly slower while traversing the microconstriction 716. Circumventing the most time-consuming aspect of the process from the sensor output effectively allows the transit time measurement for each cell to be performed in a fraction of the time required for the cell to pass the constriction, thereby opening up possibilities for multiplexing. Second, the sensor idle time may be utilized by simultaneously running measurements on multiple constrictions 716 with essentially the same sensor. By electrically labeling cell entry and exit events with coded sensors, events corresponding to the same cell may be computationally searched and matched from the entire data, and the transit time and the size may be calculated for each cell (see FIG. 7B). FIG. 7C illustrates how cell transit times depend on both the cell size and mechanical properties, with larger and stiffer cells taking longer to traverse a microconstriction 716. The transit time for each cell is determined from the delay between a matching pair of code signals from the corresponding entry and exit sensors. Cell size can independently be determined from the amplitude of the sensor signal based on the Coulter principle.

As shown, the device 700 may include nine (9) parallel microconstrictions 716 that are monitored by eighteen (18) coded electrical sensors. In some embodiments, each pair of sensors monitoring these microconstrictions 716 may be separated by 380 μm in order to: (i) avoid crosstalk via the electric fields interfering with each other, and (ii) allow the cells leaving the microconstrictions 716 some time to rebound to their previous shape so that the detection waveforms generated by the exit sensor look similar to those generated by the entry sensor and can be matched easily. In some embodiments, each of the microfluidic channels 710 may have a height of 15 μm, a width of 30, and a length of 12 mm, and each of the constrictions 716 may have a width of 5 μm, and a length of 50 μm. In some embodiments the microfluidic channels 710 may be molded in a microfluidic layer formed of polydimethylsiloxane (PDMS). The sensor network 720 may be created by micromachining a gold film deposited on a glass substrate to create 5 μm-wide coding electrodes. Each electrical sensor may be coded with 7-bit Gold sequences, which are mutually orthogonal to each other.

In operation, cells may be pneumatically driven through the device 700 at a constant pressure. Pressure-driven cell flow may be critical for proper device operation because it ensures a constant driving force across all parallel constrictions and therefore makes the cell transit times directly comparable between different cells. When all of the microconstrictions 716 are vacant, the applied pressure may be distributed equally across the channels. When one or more cells occlude the channels 710 however, the pressure delivered across them changes because the hydraulic resistance of the channels 710 has changed. This phenomenon can be modeled as one or more branches of a parallel resistor network becoming open circuits, i.e., a zero-current condition analogous to a zero-flow condition due to the occluded channels 710, leading to an increase in the equivalent resistance of the network (see FIGS. 8A-8F). Because the parallel channels 710 form a pressure divider with the main channel, modeled as series resistance $R_s$ it becomes vital to ensure that all possible cell blockage-induced changes to the equivalent resistance of the parallel channels 710 lead to negligible fluctuations in the delivered pressure. To accomplish this, the parallel channels 710 may be configured to have a significantly higher hydraulic resistance than the series resistances to which they are connected. The hydraulic resistance of a single branch of the parallel channel 710 network $R_{ch}$ may be $2.4813\times10^{15}$ Pa·s·m$^{-3}$, compared to a much smaller $1.6610\times10^{12}$ Pa·s·m$^{-3}$ for that of the series resistance $R_s$. In this manner, the majority of the applied pressure is dropped across the parallel channels 710 and changes in the channel occlusions may have negligible effect on the cell driving pressure through the microconstrictions 716.

To quantify the maximum pressure fluctuation using a pressure driven system, two situations may be considered: (i) the pressure across the microconstriction channel 710 when one channel is blocked, $P_1$, and (ii) the pressure across the microconstriction channel 710 when all channels 710 are blocked, $P_N$, where N=9, representing the total number of parallel channels 710. The maximum error percentage may be computed as follows:

$$\frac{P_N - P_1}{P_1} \times 100 = (N-1)\frac{R_s}{R_{ch}} \times 100 = 0.5352\%$$

Figure 8E:
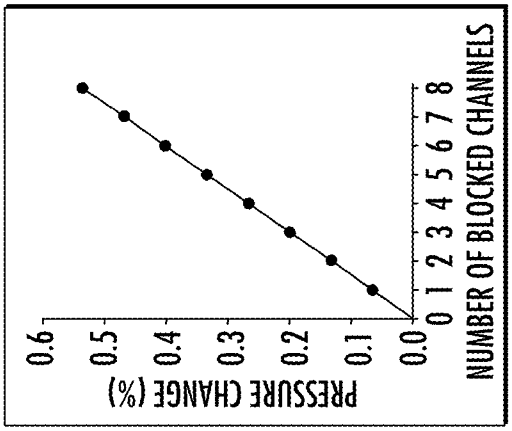
FIG. 8E depicts a line graph showing pressure change versus number of blocked parallel channels for the microfluidic device of FIG. 8C.
Figure 8F:
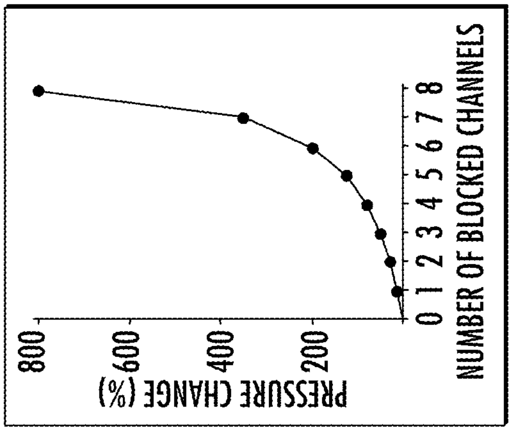
FIG. 8F depicts a line graph showing pressure change versus number of blocked parallel channels for the microfluidic device of FIG. 8D.
Figure 8C:
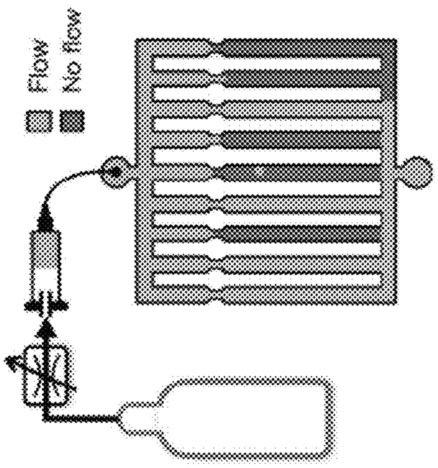
FIG. 8C depicts a top view of an example microfluidic device in accordance with one or more embodiments of the disclosure, showing an inlet, an outlet, a plurality of parallel channels each having a constriction zone, a pressure source, and a pressure regulator of the microfluidic device, with cells passing through the parallel channels.
Figure 8D:
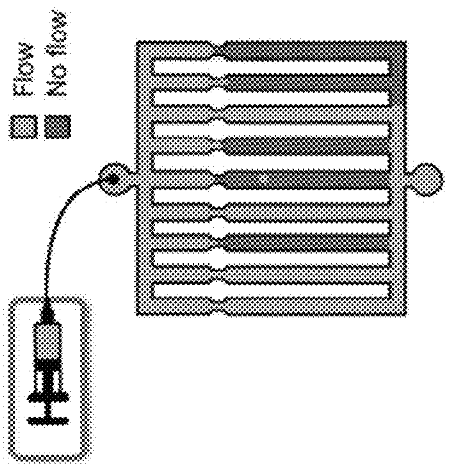
FIG. 8D depicts a top view of an example microfluidic device in accordance with one or more embodiments of the disclosure, showing an inlet, an outlet, a plurality of parallel channels each having a constriction zone, and a syringe pump driving the microfluidic device, with cells passing through the parallel channels.
Figure 8A:
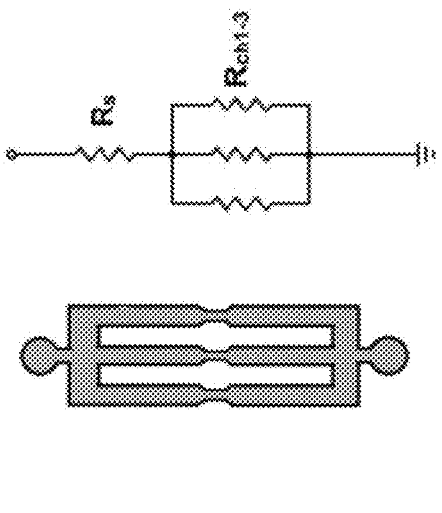
FIG. 8A depicts a top view of an example microfluidic device in accordance with one or more embodiments of the disclosure, showing an inlet, an outlet, and a plurality of parallel channels of the microfluidic device, with the parallel channels each having a constriction zone, and with cells passing through the parallel channels, along with an equivalent electrical circuit representation of the microfluidic device based on the respective positions of the cells within the parallel channels.
Figure 8B:
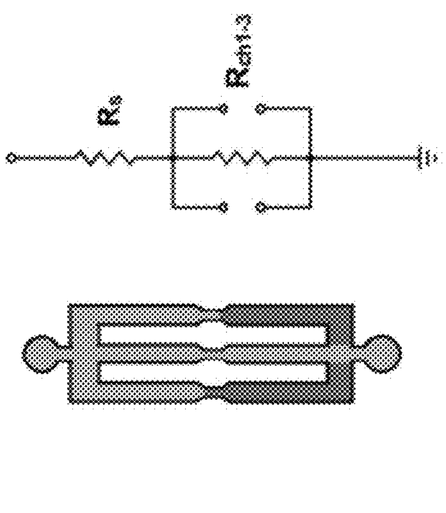
FIG. 8B depicts a top view of the example microfluidic device of FIG. 8A, showing the cells in different positions within the parallel channels, along with an equivalent electrical circuit representation of the microfluidic device based on the respective positions of the cells within the parallel channels.

If a syringe pump were to be used, intermittent occlusion of the microconstrictions 716 during cell transit would result in pressure spikes in other microconstrictions 716 to ensure constant flow rate (see FIGS. 8D and 8F). A syringe pump driven system can be represented by a current source powering a network of nine parallel resistors, which are analogous to the parallel channel microconstrictions 716. By computing the maximum percentage error for the same conditions used in the pressure driven model, the maximum percentage error may reach up to 800%. Such sensitivity causes fluctuations in the flow velocity, which in turn introduce artifacts into the electrical detection waveforms and transit time measurements.

Figure 8H:
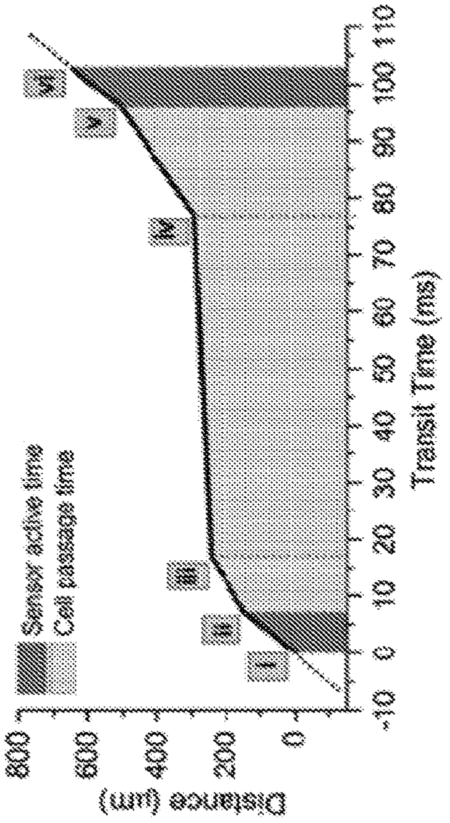
FIG. 8H depicts a line graph showing distance travelled by the cell versus cell transit time, with the labeled data points corresponding to the cell's position illustrated in FIG. 8G.
Figure 8G:
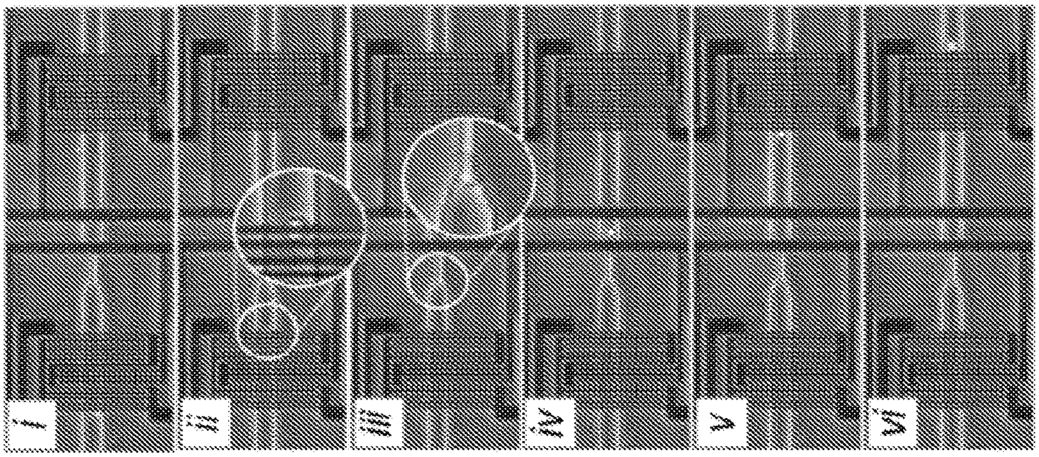
FIG. 8G depicts a series of top views of a cell traversing a parallel channel of an example microfluidic device in accordance with one or more embodiments of the disclosure.
Figure 8I:
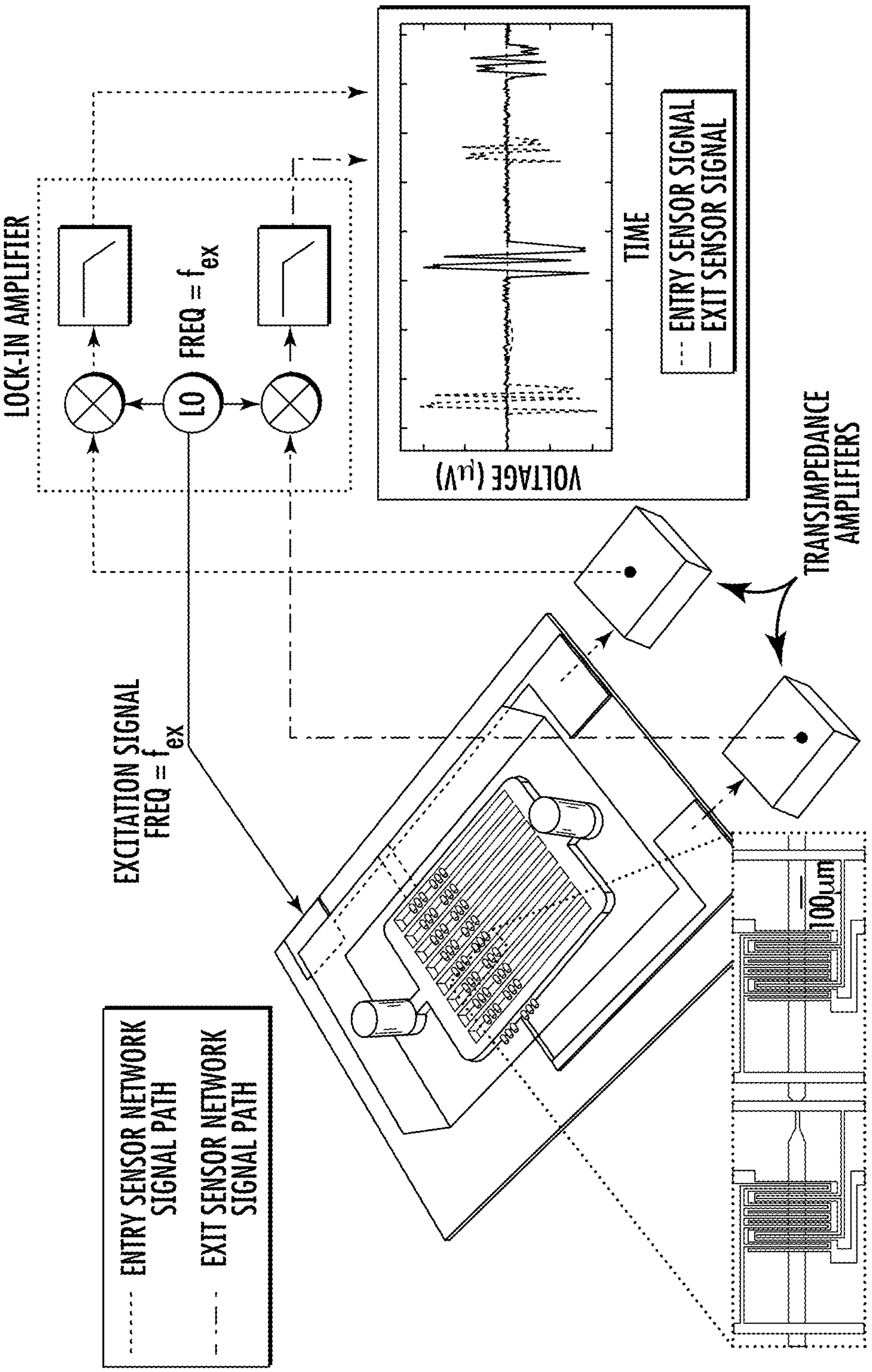
FIG. 8I depicts a schematic diagram of an example microfluidic device in accordance with one or more embodiments of the disclosure, showing an inlet, an outlet, a plurality of parallel channels each having a constriction zone, a sensor network, a lock-in amplifier, and a pair of transimpedance amplifiers of the microfluidic device.
Figure 8J:
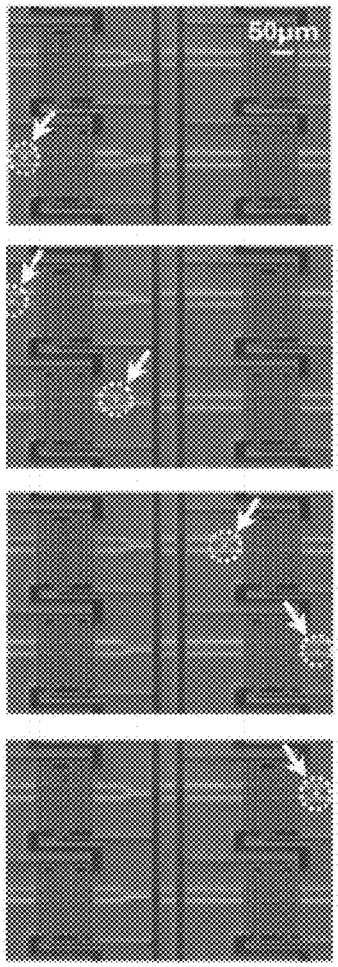
FIG. 8J depicts a series of top views of two cells traversing respective parallel channels of the microfluidic device of FIG. 8I.
Figure 8K:
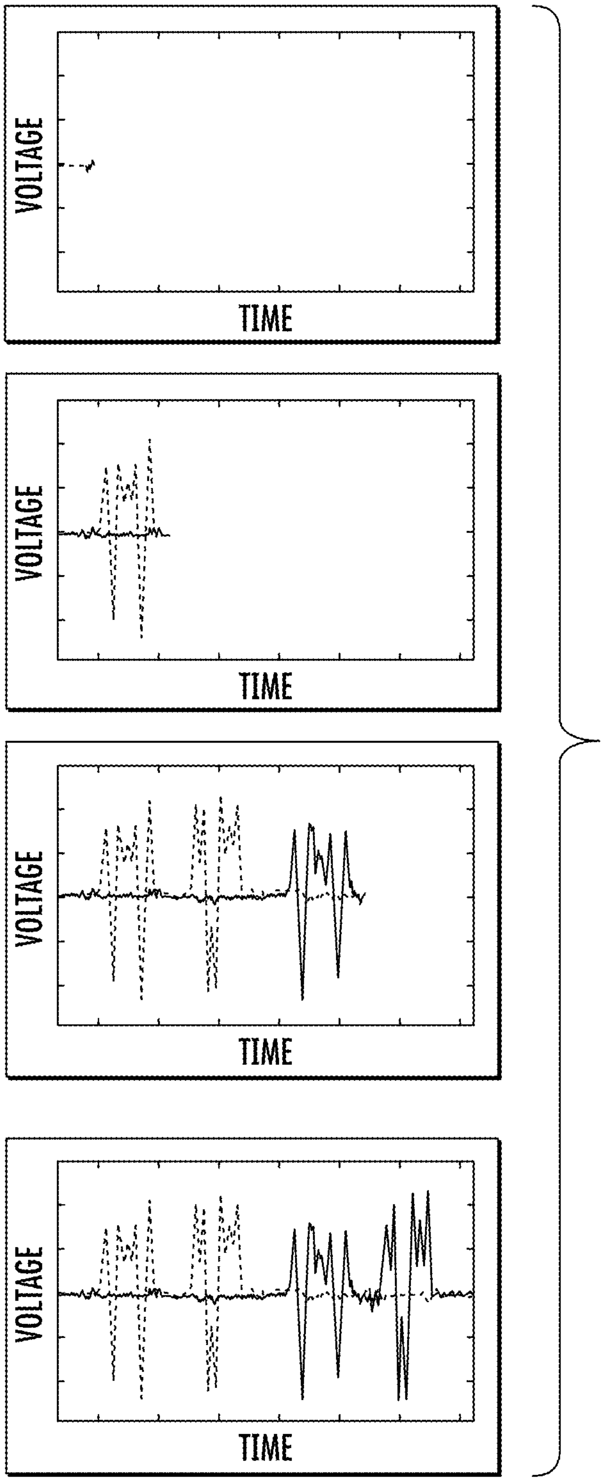
FIG. 8K depicts a series of a line graphs showing respective entry sensor waveforms and exit sensor waveforms for the two cells traversing the respective parallel channels, with the extent of the waveforms corresponding to the cells' positions illustrated in FIG. 8J.

FIGS. 8A-8F illustrate a comparison between the effects of a flow-driven system and a pressure-driven system on the intra-channel flow velocity during momentary channel occlusions caused by transiting cells. The cessation of fluid flow through a microconstriction due to a transiting cell can be modeled as opening the circuit of a resistor branch $R_{ch}$. The resulting increase in the combined equivalent resistance of the parallel channels leads to higher pressure drop across these channels. In a constant pressure-driven system, these momentary channel occlusions cause minimal pressure fluctuations (<1%) due to intentionally designed high channel to series resistance ratio, $R_{ch}$:$R_s$. For the same device dimensions, a flow-driven system (e.g. a syringe pump) would result in dramatic increases in channel pressure (— 800%) during occlusions as the pump attempts to maintain a constant flow volume through the system. FIGS. 8G and 8H illustrate a representative breakdown of cell transit time as a cell traverses a microconstriction investigated using high speed microscopy. The cell spends a much longer time passing through the constriction than it does over the sensors, thus illustrating the advantage of measuring a cell's entry and exit instances for multiplexing instead of its transit though a microconstriction. The dashed lines represent extrapolated time elapsed and distance covered by the cell. FIG. 8I schematically illustrates an example experimental setup for electrical measurement of cell transit time. The electrical sensor network may be excited by an AC signal (500 kHz, 800 mVpp sinusoid) and the resulting output signal may be measured with a lock-in amplifier. This signal is composed of coded current modulations dictated by the detecting sensor electrode pattern. FIG. 8J illustrates a series of images showing MDA-MB-231 cells, circled and pointed to by arrows, transiting through parallel constrictions, while FIG. 8K shows the corresponding sensor waveforms simultaneously recorded with the images.

For cell transit time measurements, signals from the entry and exit sensor networks were separately acquired. This data acquisition scheme allowed the same digital identifier to be assigned to both the entry and exit sensors without suffering from ambiguity in the data analysis. Comparison of the entry and exit sensor waveforms recorded from the same cell showed similar waveform patterns with small but observable variations (see FIG. 8K). Viscoelastic response of the cell was found to be one of the reasons behind these variations, as the transient deformations in cell morphology could not be recovered post microconstriction in the millisecond-scale time frame as observed from simultaneously recorded high speed microscopy images of the cell before and after the constriction. Other reasons for signal variations might include changes in the vertical distance between the cell and the sensor electrodes as well as differences in sensor properties due to unavoidable nonuniformity in the fabrication processes.

The experimental parameters, namely the driving pressure of 100 mbar and cell suspension concentration of $1.5\times10^6$ cells/mL, were selected for optimal transit time variance and throughput, respectively. Too high a driving pressure results in a minimized difference between the transit times of soft and stiff cells. This would reduce the transit time profile resolution and make it difficult to compare across different samples. Hence, a driving pressure was selected, which was low enough for our system to produce a distinguishable transit time profile, while still being high enough to maintain a favorable throughput. Similarly, the selected cell concentration was high enough such that the resulting throughput was not unnecessarily lowered, but not so high that the sensors become saturated and prevent reliable transit time measurements.

Figure 9A:
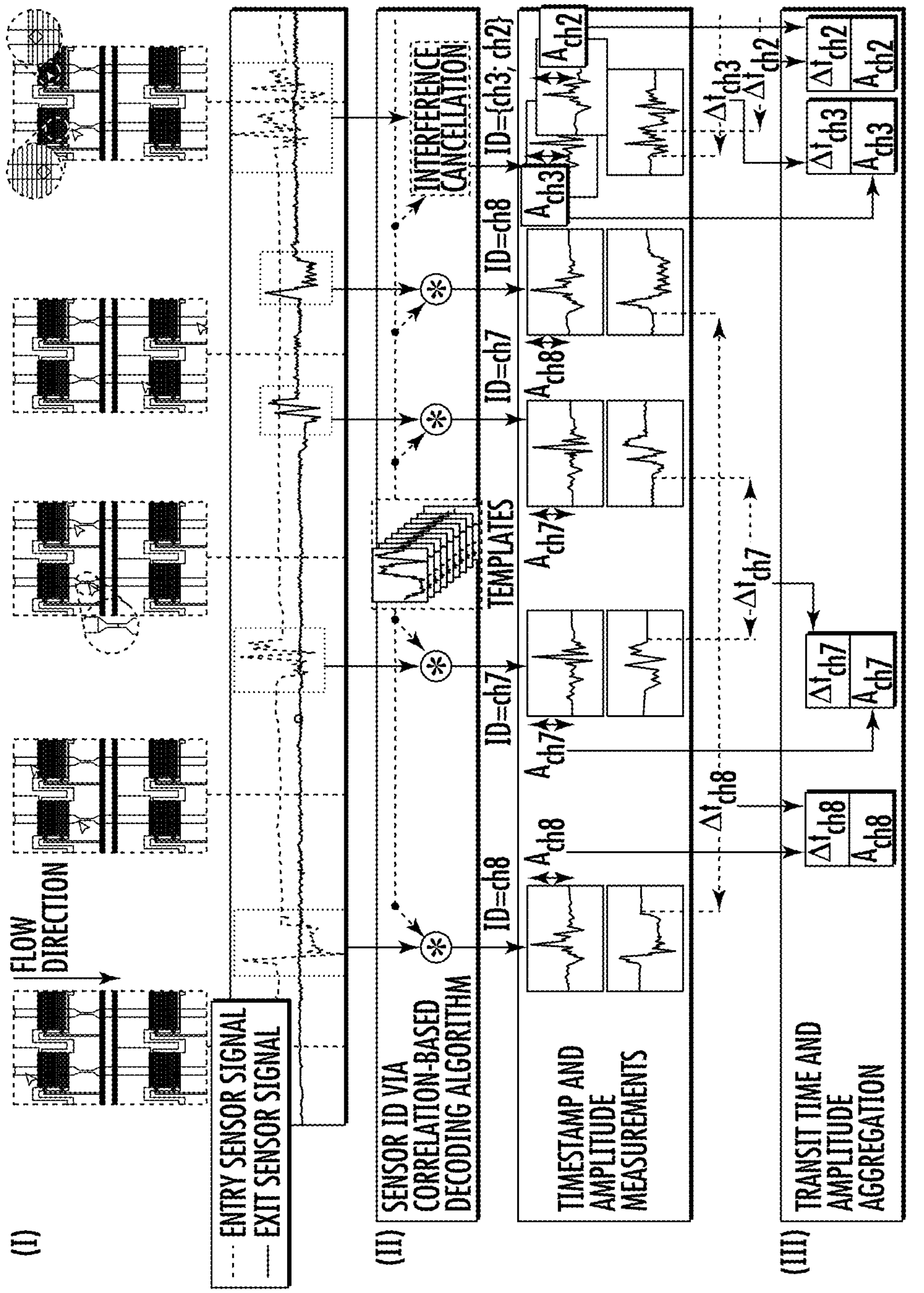
FIG. 9A depicts an example signal processing workflow for processing signals obtained using a microfluidic device in accordance with one or more embodiments of the disclosure.

FIG. 9A illustrates an example signal processing workflow for processing signals obtained using a microfluidic device in accordance with one or more embodiments of the disclosure. Portion (i) shows cells (pointed to by arrows) passing over the entry sensor network and the exit sensor network, which generate bipolar signals at the device outputs. These signals follow prescribed digital codes and are unique to every channel sensor. Scale bar shown is 100 μm. At portion (ii), the signals are classified by correlating them with a template library of all waveforms corresponding to all sensors in the device, thus identifying the channel from which a signal was generated. Since the set of codes used to design the sensors are mutually orthogonal, the signals will exhibit a strong correlation with a single matching template (pink, yellow, red and purple), and very weak correlation with the remaining templates (grey). Distorted signals undergo a recursive interference cancellation stage to deconvolute the individual components and recover the detections. Once the channel ID's are determined, the correlation peak height, which is proportional to signal amplitude and therefore cell size, and signal timestamps are collected. At portion (iii), the duration between corresponding entry and exit signals is computed as the transit time and is saved along with the correlation peak height.

To measure the transit time for each cell, the cell entry and exit events are computationally identified from the output signal. To match coded waveforms in the output signal to a particular microconstriction, a decoding algorithm was used to compute the correlation between the code waveform in question and each of the computer-generated templates corresponding to all coded sensors on the device to find the matching template with the highest correlation. Because sensor codes were specifically designed to be orthogonal to each other, only the matching template produced a strong correlation and allowed the waveforms to be identified accurately (see FIG. 9A). Using such correlation-based pattern matching offers improved success in low signal-to-noise-ratio situations such as those caused by variations in cell morphology and vertical position (see FIGS. 9C-9H).

Figure 9B:
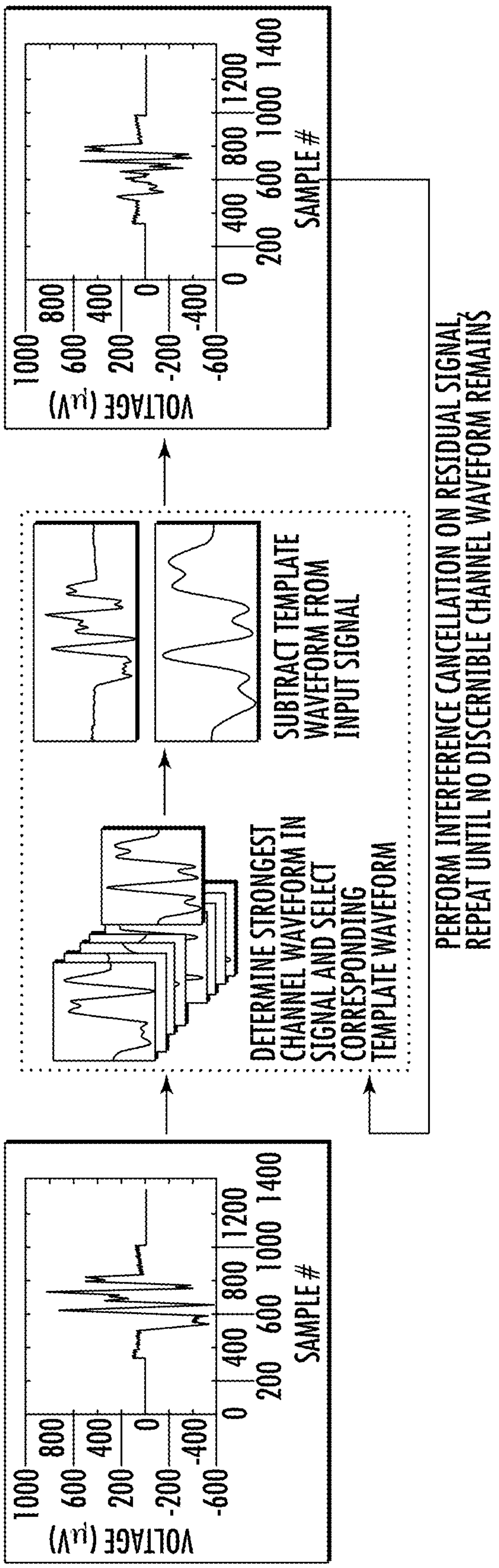
FIG. 9B depicts an example signal processing workflow for a successive interference calculation algorithm, as may be implemented as a part of the signal processing workflow of FIG. 9A.
Figure 9C:
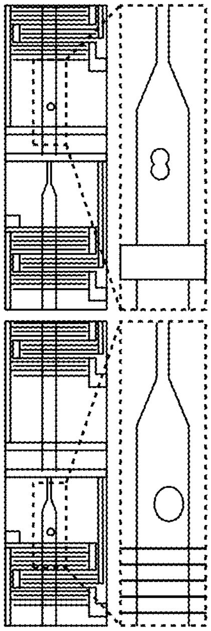
FIG. 9C depicts a series of top views of a cell traversing a parallel channel of a microfluidic device, showing the cell retaining a deformed shape after exiting a constriction zone of the parallel channel.
Figure 9D:
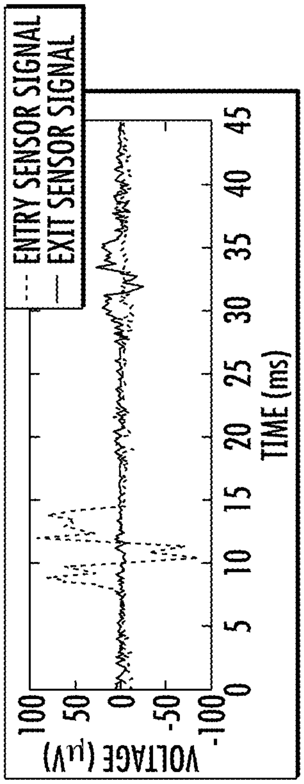
FIG. 9D depicts a line graph showing an entry sensor waveform and an exit sensor waveform corresponding to the traversal of the cell of FIG. 9C.
Figure 9E:
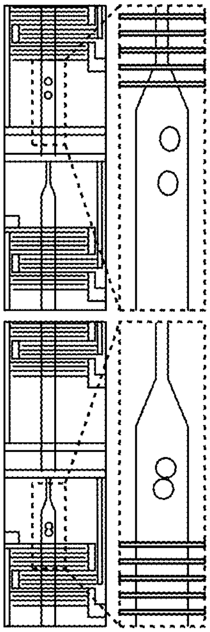
FIG. 9E depicts a series of top views of a cell cluster traversing a parallel channel of a microfluidic device, showing the cell cluster dissociating after exiting a constriction zone of the parallel channel.
Figure 9F:
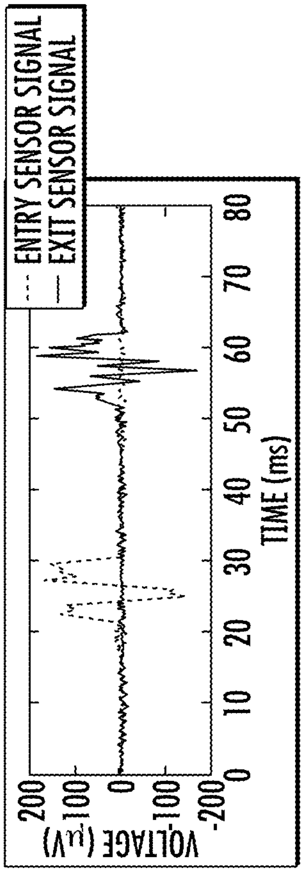
FIG. 9F depicts a line graph showing an entry sensor waveform and an exit sensor waveform corresponding to the traversal of the cell cluster of FIG. 9E.
Figure 9G:
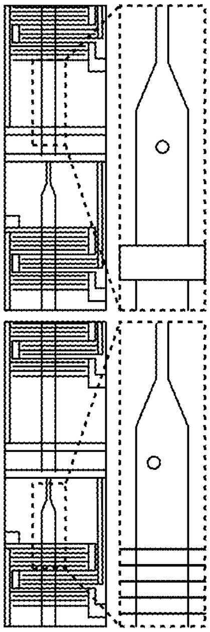
FIG. 9G depicts a series of top views of cell debris traversing a parallel channel of a microfluidic device.
Figure 9H:
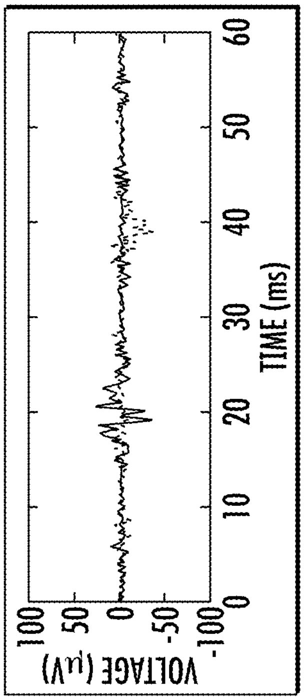
FIG. 9H depicts a line graph showing an entry sensor waveform and an exit sensor waveform corresponding to the traversal of the cell debris of FIG. 9G.

Because sensors monitoring different constrictions shared the same electrical output in the device, occasionally, coincident cells detected by the sensor network resulted in interfering waveform patterns. To recover the cell data in those cases, a recursive approach was used, where the individual sensor signals were extracted one by one starting with the strongest one (see FIG. 9B). Using the mutual orthogonality of the waveforms, we first estimated the sensor signal based on the template that produced the highest correlation and subtracted the estimated signal from the input. The residual waveform was then correlated with the templates and the process was repeated until no template could be matched to the waveform. FIG. 9B illustrates a signal processing workflow of the successive interference cancellation algorithm. The distorted detection waveform is interrogated in order to identify the interfering components by computing its correlation with all the template waveforms in the template library. The template that produces the strongest correlation is designated as the ID of the strongest interfering component and is subtracted from the detection waveform. Pan-template library correlation is performed on the residual signal to identify secondary component and subtract that component out as well. This process continues until no discernable waveform remains.

Once the code waveforms were labeled with constriction IDs and timestamps, events in the entry and exit data were matched and the cell transit time was calculated from the time delay between the cell entry and exit (see FIG. 9A, portion (ii)). This matching process was also used to find and discard erroneous or unreliable waveforms. For example, if we could not detect an exit event that corresponded to a cell entry detection, that entry event was discarded. This inability to find matching detection waveforms is typically caused by the occasional cell damage post-constriction (see FIGS. 9C and 9D), dissociated cell clusters (see FIGS. 9E and 9F), or debris from contaminants or lysed cells lysing due to mechanical compression (see FIGS. 9G and 9H).

For each transit time measurement, we also measured the size of the corresponding cell. In addition to being an important physical biomarker, the size of cell directly affects the microconstriction transit time and needs to be taken into account when correlating the transit time measurements with cell mechanical properties. To obtain the sizes of the cells for each of these cell lines, we used the correlation peak height as it is proportional to the detection waveform amplitude, which is in turn proportional to cell volume according to the Coulter principle. The detection waveforms used were solely from the entry sensor network, i.e. before the cell passes through a microconstriction, in order to avoid errors due to cell morphology change following the microconstriction.

Figure 10A:
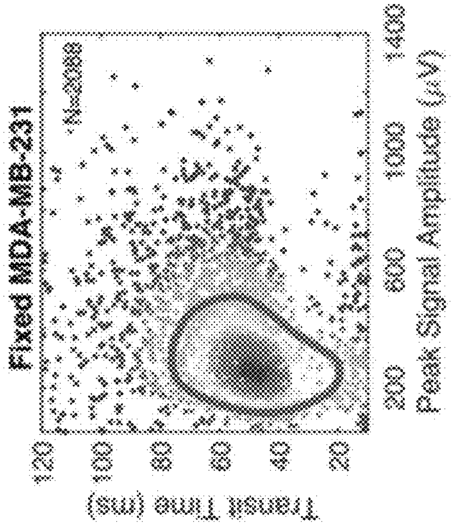
FIG. 10A depicts a scatter heatmap of data obtained using a microfluidic device, showing cell transit time versus peak signal amplitude for a first cell line.
Figure 10B:
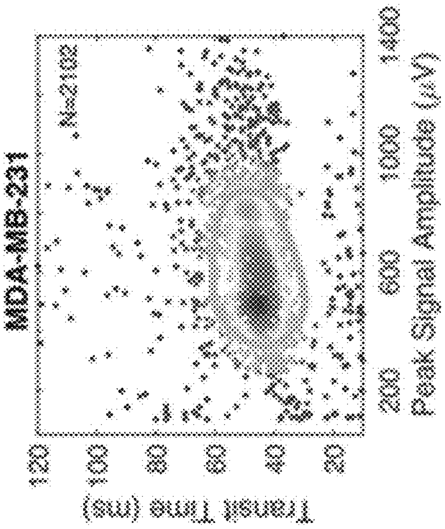
FIG. 10B depicts a scatter heatmap of data obtained using the microfluidic device, showing cell transit time versus peak signal amplitude for a second cell line.
Figure 10C:
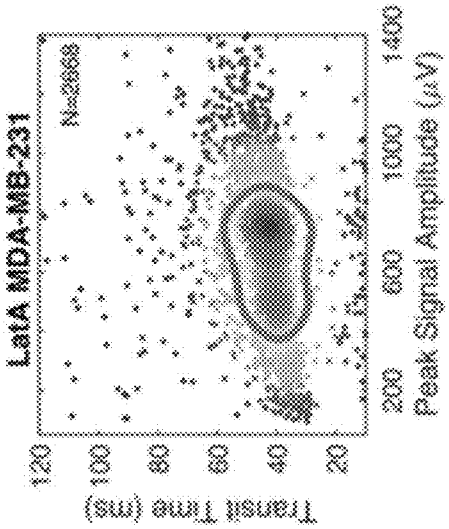
FIG. 10C depicts a scatter heatmap of data obtained using the microfluidic device, showing cell transit time versus peak signal amplitude for a third cell line.

The device was employed to characterize three different MDA-MB-231 (human mammary adenocarcinoma) cell populations of differing deformability: a control untreated population, a population exposed to a softening agent Latrunculin A (LatA)62,63, and a population treated with the fixative formaldehyde to increase stiffness. For each population in our experiments, we used the computed sensor signal amplitude and constriction transit time as measures of the cell size and its stiffness, respectively (see FIGS. 10A-10C). As anticipated, the data showed a clear trend that, for all the cell populations, the larger cells, which produced larger amplitudes, took longer to traverse the constrictions.

Figure 10D:
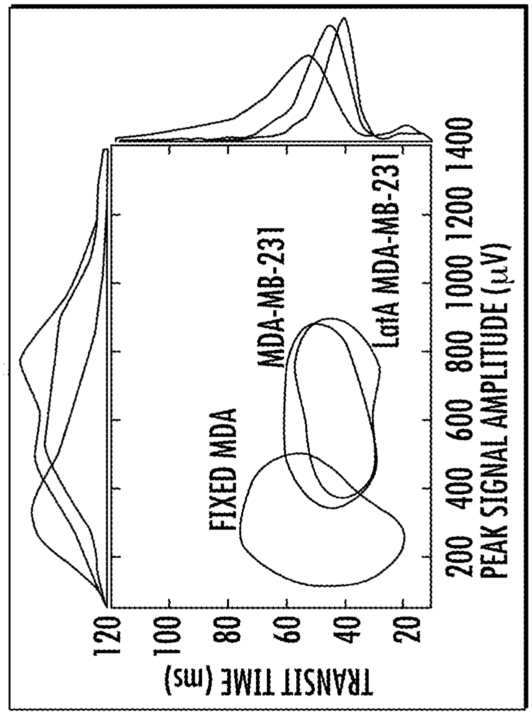
FIG. 10D depicts a 50% density contour plot for the first cell line, the second cell line, and the third cell line of FIGS. 10A-10C, along with marginal density distributions of the transit times and peal signal amplitudes.
Figure 10E:
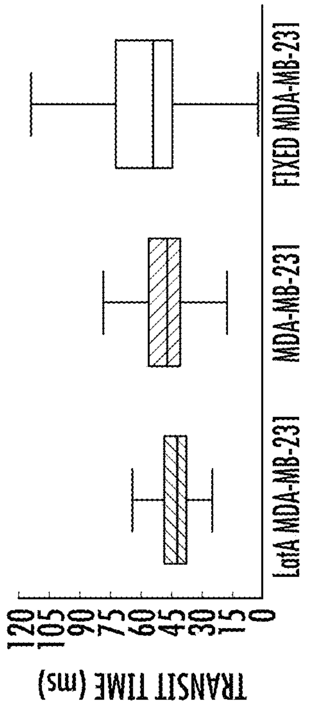
FIG. 10E depicts a box-whisker plot showing medians of cell transit times and interquartile ranges for the first cell line, the second cell line, and the third cell line of FIGS. 10A-10C.

Because the data on different cell populations were acquired under the same driving pressure and electrical excitation, we could directly compare the characterization results (see FIG. 10D). Electrical measurements identified the fixed population to be, on average, smaller than their control counterparts. In terms of constriction transit times, LatA-treated MDA-MB-231 cells required on average 8.9% (42.35 ms vs 46.52 ms) less time than untreated MDA-MB-231 cells (see FIG. 10E), a result that clearly demonstrates a softened cytoskeleton due to loosening of actin by LatA. Furthermore, we found that the fixed MDA-MB-231 cells expectedly had the largest average transit time (54.01 ms) pointing to a reduced deformability than the control and softened MDA-MB-231 populations.

Figure 10F:
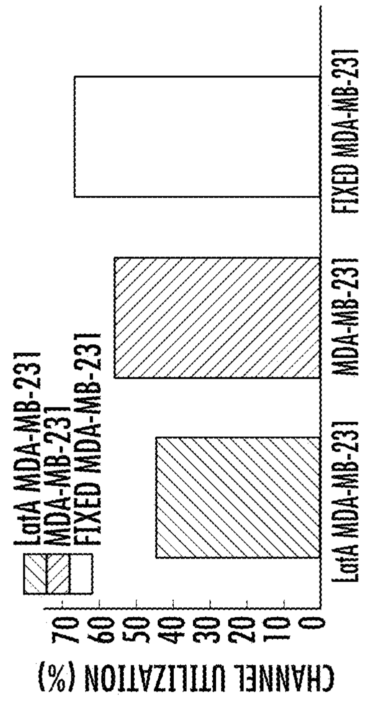
FIG. 10F depicts a bar graph showing percentage of peak channel utilization for the first cell line, the second cell line, and the third cell line of FIGS. 10A-10C.
Figure 10G:
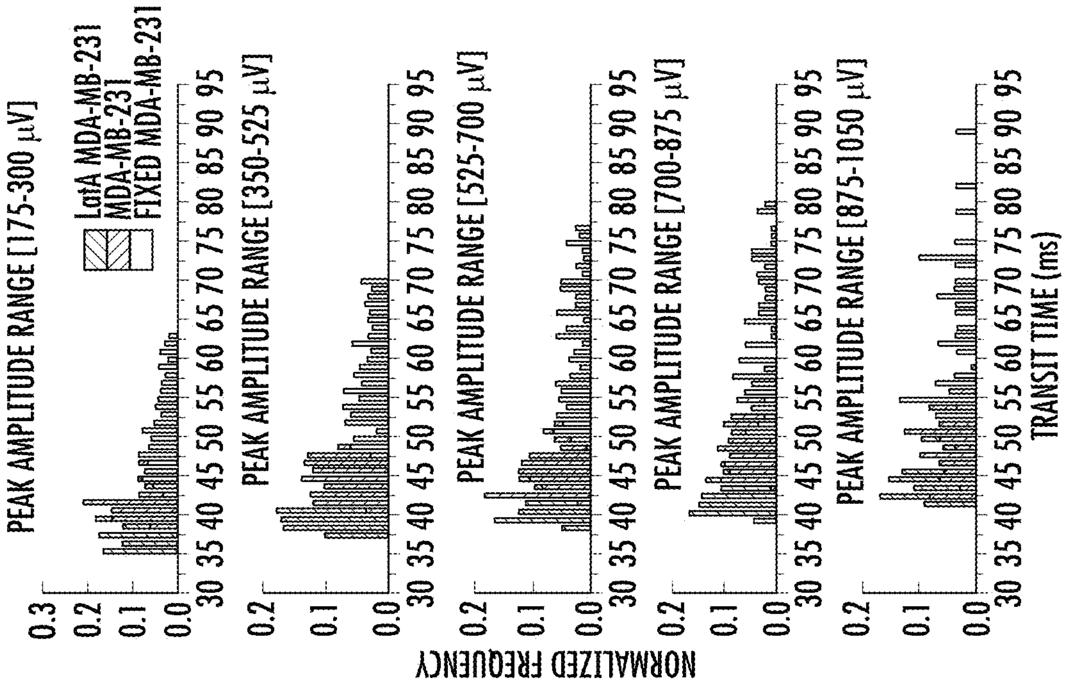
FIG. 10G depicts histograms of cell transit times for ranges of peak signal amplitudes for the first cell line, the second cell line, and the third cell line of FIGS. 10A-10C.

To determine the relative cell stiffnesses, it is necessary to remove the influence of cell size as it also affects constriction transit time. To accomplish this, we grouped the transit time data for all the cells by peak signal amplitude (see FIG. 10G). This way, the differences in transit time in these groups become primarily attributed to stiffness since they were produced by very similarly sized cells from the different cell lines. Besides showing the transit time differences between fixed and control MDA-MB-231 cell populations, size-gated data can clearly distinguish between the LatA-treated and control populations, which produced very similar mean transit times (see FIG. 10G). Moreover, we found that the rank of stiffness held true for all the peak signal amplitude groups, validating the methodology. However, comparing cells that are larger also shows higher sensitivity for the stiffness comparisons, since it takes longer for a cell to enter constriction effectively spreading out transit times between different cells due to longer mechanical compression/probing process. Normally, measurement of these longer transit times would have presented a trade-off for throughput but our system eliminates this since the compression and transit processes are not monitored by the sensors.

To quantify the utility of our multi-constriction approach in increasing the cell mechanophenotyping throughput, we calculated the number of cells that were traversing other constrictions while a cell occupied another microconstriction. This metric effectively determines how efficiently the constrictions are utilized, and hence named as the channel utilization factor, and it is a measure of throughput enhancement. The channel utilization factor depends on multiple factors including the sample properties as well as the number of parallel constrictions and the sample density. Between the three different cell populations tested at the same concentration ($1.5\times10^6$ cells/mL), we found that the channel utilization factor increases with increasing cell stiffness (see FIG. 10F). This is due to the fact that stiffer cells occupy the constrictions for longer thereby increasing the time window the incoming cells can start traversing other constrictions. For example, we found that on average 6 out of 9 constrictions were occupied during a single fixed MDA-MB-231 cell was traversing a constriction and this number dropped to 4 of 9 constrictions for the LatA-treated population, the most compliant one of the three samples tested. The channel utilization factor can be increased by increasing the sample concentration to the point that coincident cells lead to high error rates. In that respect, longer transit times provide more room for improvement.

Figure 11A:
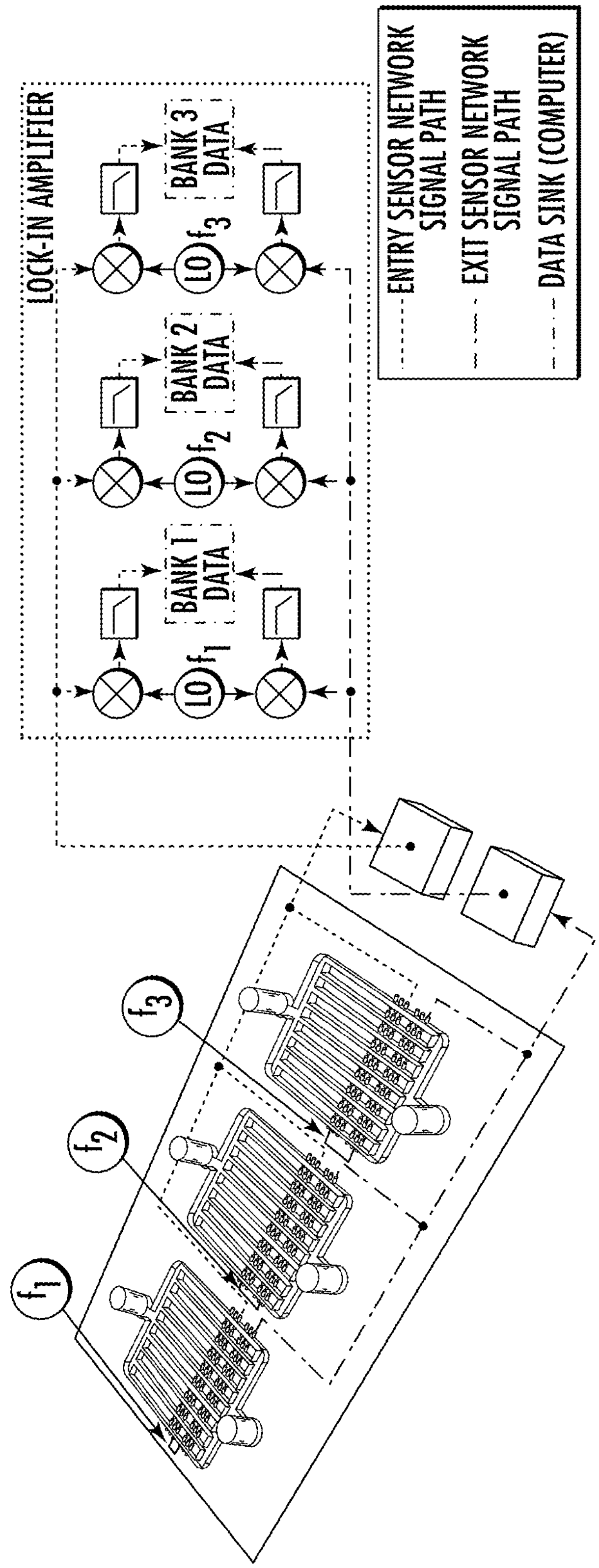
FIG. 11A depicts a schematic diagram of an example microfluidic device in accordance with one or more embodiments of the disclosure, showing a plurality of branches, a sensor network, a lock-in amplifier, and a pair of transimpedance amplifiers of the microfluidic device, with each branch including an inlet, an outlet, a plurality of parallel channels each having a constriction zone, and with the sensor network including a plurality of banks.
Figure 11B:
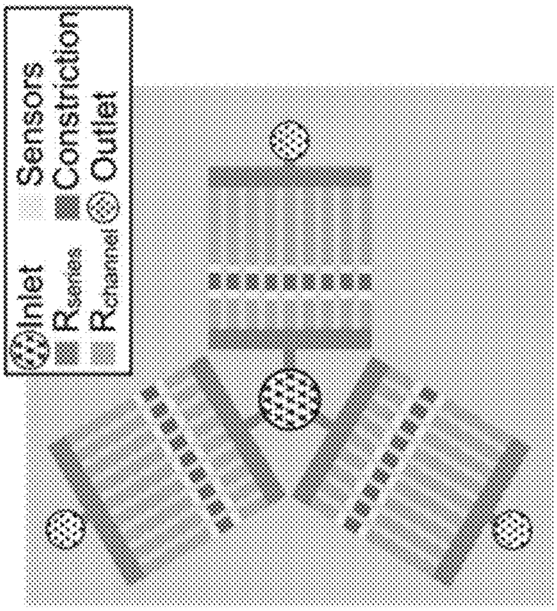
FIG. 11B depicts a schematic diagram of an example microfluidic device in accordance with one or more embodiments of the disclosure, showing an inlet, a plurality of branches, and a sensor network of the microfluidic device, with each branch including an outlet and a plurality of parallel channels each having a constriction zone, and with the sensor network including a plurality of banks.
Figure 11C:
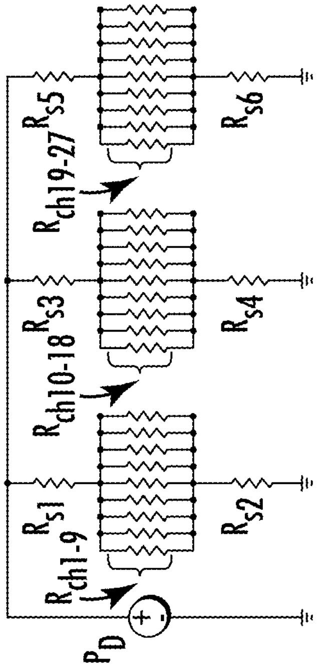
FIG. 11C depicts an equivalent electrical circuit representation of the microfluidic device of FIG. 11B.
Figure 11D:
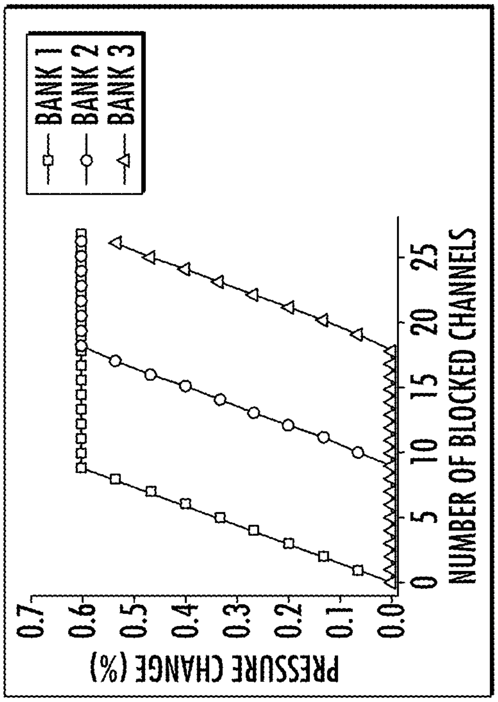
FIG. 11D depicts a line graph showing percentage of pressure change versus number of blocked parallel channels for the microfluidic device of FIG. 11B.

To further increase the throughput of our multi-constriction cell mechanophenotyping approach, we combined frequency multiplexing, another technique used in communications, with code-division multiplexed electrical sensors. Multi-frequency approaches for electrical sensors have been commonly used for impedance spectroscopy of cells as well as for multiplexing of Coulter counters. In our technique, we create multiple instances, or banks, of code-multiplexed sensor networks monitoring the entry and exit of microconstrictions but operate each of them at different frequencies (see FIG. 11A). This allows us to combine signals from individual networks into one signal and maintain the same number of device outputs. The multiplexed information from different networks can then be demultiplexed using frequency domain signal processing techniques. The fluidic pathways of the three banks were also identical, thus allowing straightforward calculation of pressure fluctuations throughout the entire device caused by momentary channel occlusions by cells (see FIGS. 11B-11D).

Figure 11E:
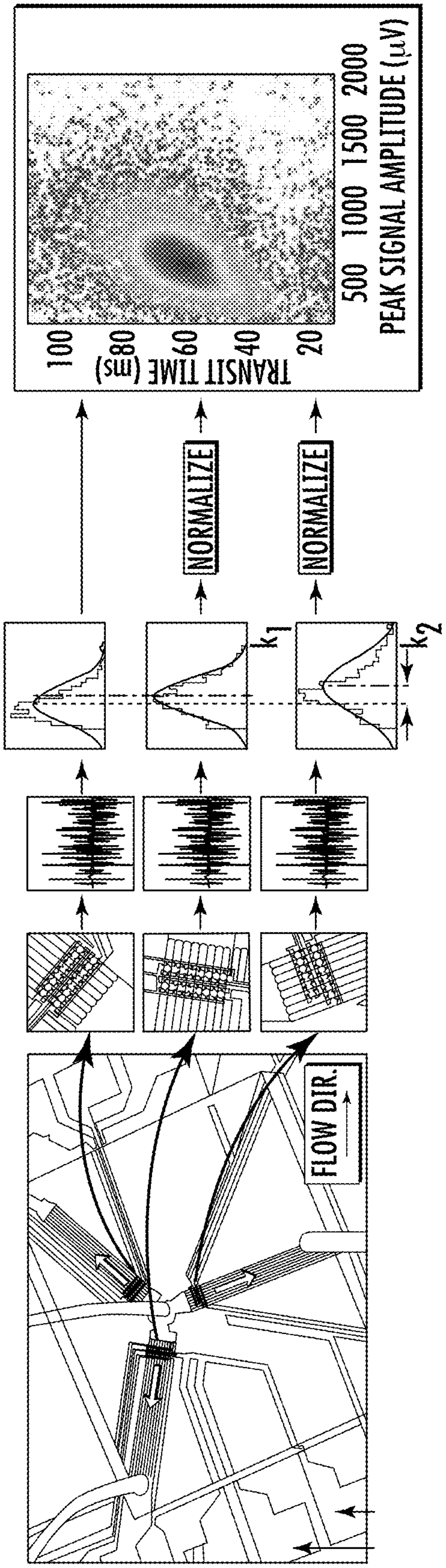
FIG. 11E depicts a process diagram for the microfluidic device of FIG. 11A.

To demonstrate this scaling approach, we expanded our device to contain three code-multiplexed sensor networks with microfluidic constrictions, all with identical electrical and fluidic parameters but excited with different frequencies (500 kHz, 900 kHz, and 1300 kHz). In the expanded microfluidic device, cells were directed into the three code-multiplexed networks, each with 9 microconstrictions, via a trifurcating channel that originated at the inlet (see FIG. 11E). In operation, a driving pressure of 100 mbar and excitation signal amplitude of 800 mVpp were used. All of the data from the device was combined into two signals: one for entry and one for exit sensors on the device. The output signal, which at this point was composed of code multiplexed data that exist in three distinct frequency bands, was fed into a lock-in amplifier, where it was demodulated by mixing the output signal with local oscillators running at one of the excitation frequencies. The result was three deconvoluted data streams that contain only the coded waveforms produced by each sensor network and each was decoded using the same computational steps described before.

Figure 11F:
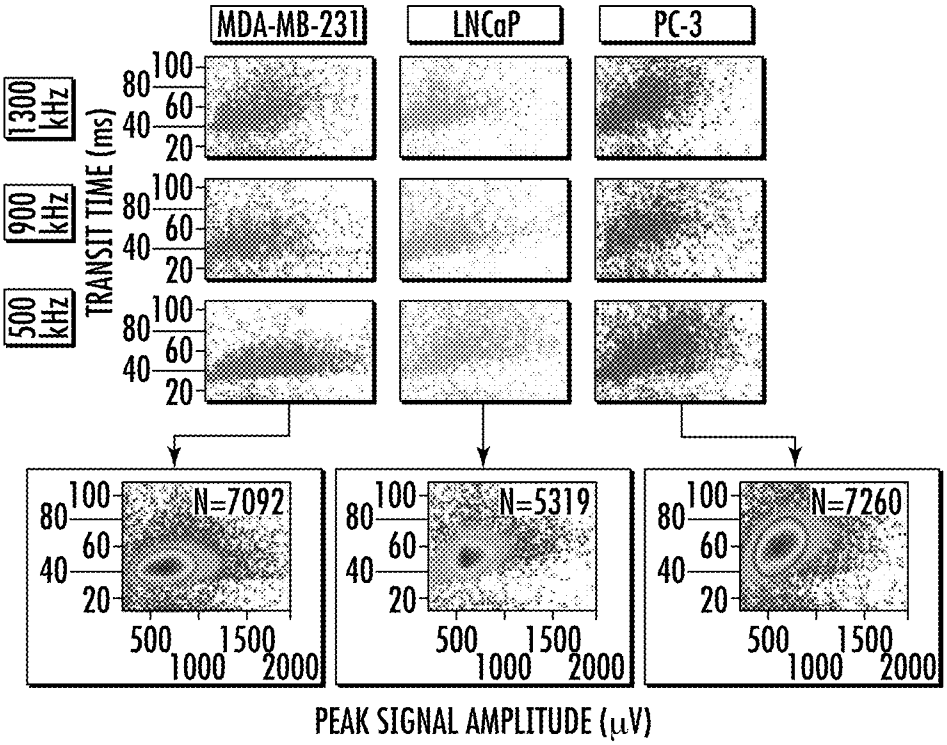
FIG. 11F depicts scatterplots of data obtained using the microfluidic device of FIG. 11A, showing cell transit time versus peak signal amplitude for three cell lines for each of the three sensor network banks, along with resulting scatter heatmaps of the combined bank data for each cell line.
Figure 11G:
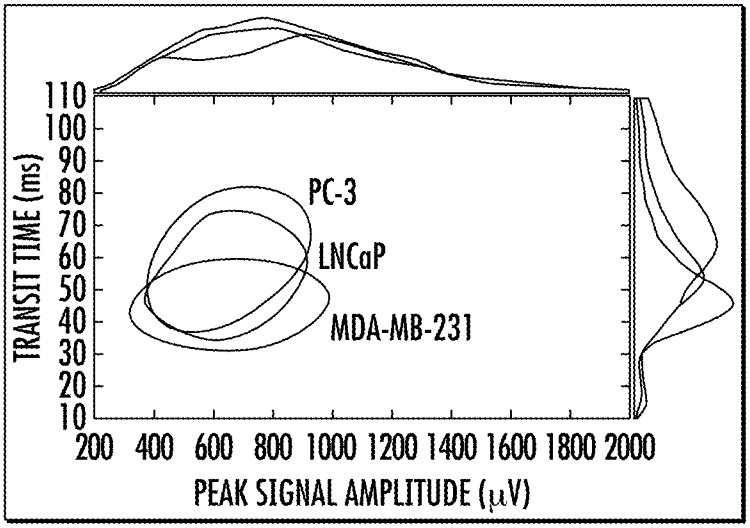
FIG. 11G depicts a 50% density contour plot for the first cell line, the second cell line, and the third cell line of FIG. 11F, along with marginal density distributions of the transit times and peal signal amplitudes.
Figure 11I:
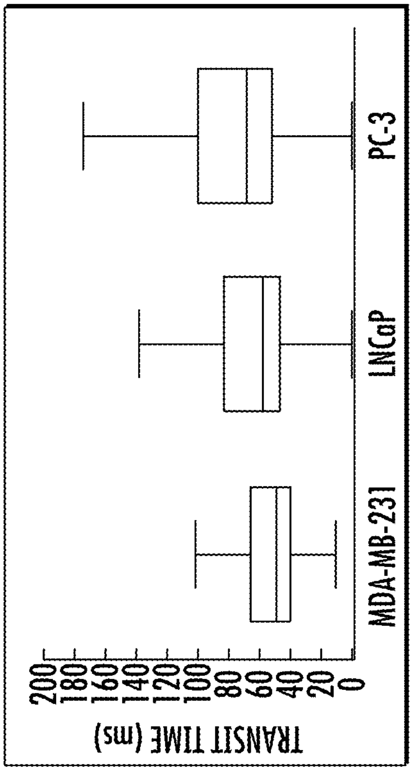
FIG. 11I depicts a box-whisker plot showing medians of cell transit times and interquartile ranges for the first cell line, the second cell line, and the third cell line of FIG. 11F.
Figure 11H:
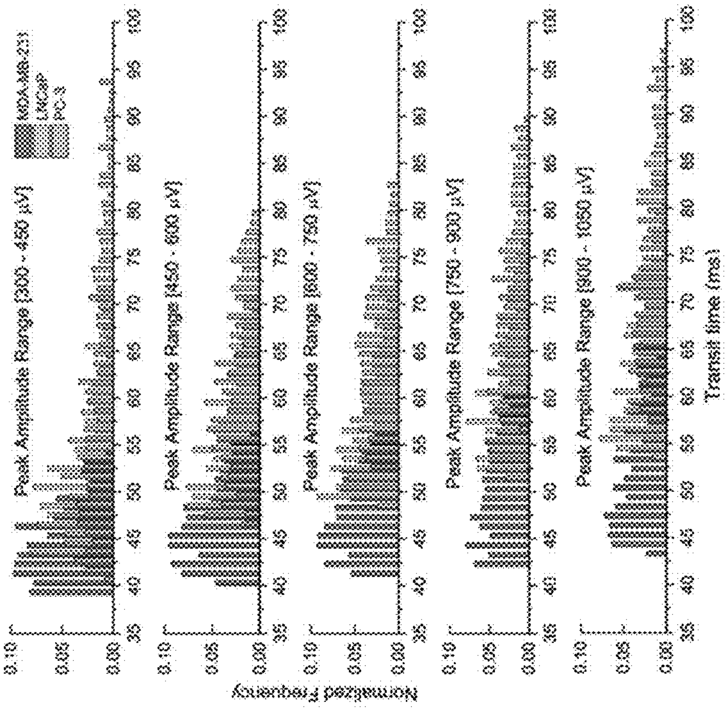
FIG. 11H depicts histograms of cell transit times for ranges of peak signal amplitudes for the first cell line, the second cell line, and the third cell line of FIG. 11F.

To aggregate measurements from individual sensor networks operating at different frequencies, we normalized the data from individual blocks to eliminate the frequency-dependent artifacts. These artifacts are due to the fact that differences in excitation frequency cause a change in the peak signal amplitude, which we use to determine the cell size. These frequency-dependent signal amplitudes can be attributed to the fact that the electrical equivalent model of a human cell is an R-C network, and as such has a frequency dependent impedance. Another artifact that affects signal amplitude, but is not frequency dependent, is the asymmetry in the electrical traces. These traces serving the three sensor networks were of varying lengths due to the sensors' distribution on the glass slide which led to differences between voltage drops across these traces which in turn have effects on the signal amplitude. To remove these artifacts from our measurements, we calculated the mean peak signal amplitude for all the waveforms in each sensor network and using the 500 kHz bank mean as a reference, determined a scaling factor with which to normalize the waveforms from the sensor networks operated at other frequencies (see FIG. 11E). Here, we assumed each sensor network received a representative fraction of the cell population under test, which could be justified given the larger number of cells analyzed by each sensor network. Finally, the data from all sensor networks were aggregated to form the final characterization results (see FIG. 11F). Since all experiments for the different cell lines were performed under the same fluidic and electrical conditions, we are able to directly compare their respective transit time data (see FIG. 11G). To validate the frequency-enhanced version of our technique, we employed our frequency-multiplexed device on the three different cell lines, namely PC-3 (human prostate adenocarcinoma), LNCaP (human prostate carcinoma), and MDA-MB-231 (human mammary adenocarcinoma). In agreement with the stiffness ranking found in literature, we found that PC-3 cells were stiffer than LNCaP and MDA-MB-231 cells. This was shown in the stiffness ranking that is consistent throughout all the size-gated transit time distributions (see FIG. 11H). The stiffness ranking is also reflected in the average transit times of the different samples (see FIG. 11I). At $1.5\times10^6$ cells/mL concentration, we have achieved a combined cell mechanophenotyping throughput of −150 cells/s. It should be noted that the throughput could further be increased by operating extra blocks at more frequencies as the Coulter technique works reliably at excitation frequencies between the 102 kHz and 104 kHz ranges due to cell membrane and cytoplasm frequency response. We can in theory use any number of frequencies, and therefore blocks, in this range as long as the inter-frequency separation is large enough for the signal conditioning electronics to perform demodulation correctly.

As described herein, a cell deformability assay may combine an array of microconstrictions with an electrical sensor network monitoring cell transit through all of those microconstrictions to rapidly profile the mechanical properties of cell populations. Concurrent recording of data from multiple cells that squeeze through parallel microconstrictions allows the otherwise-slow transit-time based mechanical assessment to be employed for high-throughput cell mechanophenotyping. Moreover, on-chip Coulter sensors distributed across the device perform spatiotemporal measurements and directly report results in an electrical format, eliminating the need for external imaging instruments and making the system a standalone platform. Finally, the device architecture composed of polymer-based microfluidic features together with a micropatterned metal layer on a glass slide creating a disposable assay that can be practically employed for biomedical testing.

To scale the sample processing throughput, we have maximally utilized the capacity of the electrical interface to perform our deformability assay by managing the data generated from a network of distributed on-chip sensors through information multiplexing techniques that are commonly used in wireless communications. Our multiplexing strategy combined with our sensor architecture allowed us to both rapidly log cells when they are not in a slowing microconstriction and discriminate concurrent signals coming from a multitude of sensors through computation. At the fundamental level, our barcoded sensors circumvent the trade-off between the time spent by a cell within a microconstriction and the measurement throughput and enable the design of multiple parallel microconstrictive channels to match the processing speed of an unconstrained microfluidic channel independent of the constriction length or width. Moreover, running individual coded sensor networks at different frequency bands adds an extra layer of multiplexing that offers further scalability to our assay in terms of the sample processing throughput.

The described technique probes cells by subjecting them to precisely defined microconstrictions, which can be utilized beyond mechanophenotyping of cells to obtain complementary information. These applications range from studies of frictional forces in cell-surface interactions to cell membrane poration for drug delivery. By increasing the throughput of microconstriction-based measurements, we potentially enable a variety of measurements in addition to mechanical measurements to be performed without paying a throughput penalty compared to noncontact techniques that rely on hydrodynamic manipulation of cells.

Cell mechanical properties provide complementary information to established chemical biomarkers and present an opportunity to define cell state with higher precision via label-free measurements. We have introduced an electronic microchip-based cell deformability assay that can reach sample processing throughputs, currently only achievable by bulkier and much more expensive technologies. The ability to rapidly and practically perform mechanophenotyping of samples with a disposable electronic assay can help obtain statistically significant numbers of measurements and eventually establish cell mechanical properties as standard biomarkers for basic research and clinical applications.

For the electrical sensor design, the 7-bit Gold sequence-based digital codes used for multiplexing the sensors were created using a process similar to that described by Liu et al. The 3rd order polynomials $x^3+x^2+1$ and $x^3+x+1$ were used to represent two linear-feedback shift-registers set to an initial state of "001" and "111". All nine of the generated Gold sequences were used to design the sensors. Each sensor is composed of a positive, negative and reference electrode, where the excitation signal is provided via the reference electrode and remaining two acted as current sinks that routed the detections to the output. The positioning and ordering of the positive and negative electrode fingers followed the generated binary Gold sequences, and the reference electrode interweaved through these fingers such that every positive and negative electrode finger was adjacent to a complementary reference electrode. These positive-reference and negative-reference electrode pairs represented "1" and "0", respectively. All electrode fingers are 5 μm wide, 30 μm long (exposed within the channel) and are separated by 5 μm. Each fluidic channel was assigned two identical sensors, separated by 380 μm, one on either side of the constriction.

For the microfluidic device fabrication, the device may include a glass substrate with micro-patterned coplanar electrodes that serve as the code-multiplexed Coulter sensors and a polydimethylsiloxane (PDMS) microfluidic layer. We used conventional microfabrication techniques and soft lithography to fabricate the device. Briefly, we created the coplanar electrodes on a glass wafer using a lift-off process. A 1.5 μm-thick negative photoresist was patterned using optical lithography followed by e-beam deposition of 20 nm-thick Cr and 480 nm-thick Au film stacks. The lift-off process was performed in acetone. The microfluidic layer was fabricated using soft lithography. A 15 μm-thick SU-8 photoresist was patterned on a silicon wafer using optical lithography to fabricate the mold. A PDMS prepolymer and crosslinker (Sylgard 184, Dow Corning) were mixed at a 10:1 ratio and poured on the mold, degassed and then cured at 65° C. for 4 hours. The cured PDMS was then peeled off from the mold and placed in oxygen plasma along with the glass substrate for surface activation. Finally, the two parts were aligned under a microscope and bonded to create the final device.

As model biological samples, we used PC-3 (obtained from Dr. John F. McDonald, Georgia Institute of Technology), MDA-MB-231 (ATCC-CRL-1740) (ATCC; Manassas, VA) and LNCaP (ATCC-CRL-1740) (ATCC; Manassas, VA) cell lines. For the single frequency device, two different sample of MDA-MB-231 cells were treated with Latrunculin A (Sigma-Aldrich; St. Louis, MO) and formaldehyde (Sigma-Aldrich; St. Louis, MO) and suspended in Phosphate Buffered Saline (PBS). The PC-3, MDA-MB-231 and LNCaP cells were cultured in F-12K Medium (ATCC-30-2004) (ATCC; Manassas, VA), Dulbecco's Modified Eagle's medium (DMEM) (Corning; Corning, NY) and Roswell Park Memorial Institute (RPMI 1640) (Corning; Corning, NY) respectively. All these media were supplemented with 10% FBS (Fetal Bovine Serum; Seradigm, Radnor, PA) in 5% CO2 atmosphere at 37° C. until the cells reached 80% confluence. Prior to experiments, the cells were trypsinized for two minutes, pelleted, resuspended in PBS and mixed gently to dissociate cell clusters that may have formed. Finally, the suspension was diluted with PBS to a cell concentration of $1.5\times10^6$ cells/mL. For the LatA exposure, 100 μg of LatA in lyophilized powder form was reconstituted in dimethyl sulfoxide (DMSO), then diluted in PBS to form a 5.9 nM stock solution. The trypsinized and pelleted MDA-MB-231 cells were mixed with 1 mL of 1 nM LatA and incubated at 37° C. for 60 mins. The cells were pelleted once more and resuspended in PBS. For cell fixation, 100 μL of 4% paraformaldehyde (PFA) was diluted in 4 mL of PBS. The trypsinized and pelleted MDA-MB-231 cells were mixed with diluted 4% PFA and incubated at 37° C. for 10 mins. The cells were pelleted once more and resuspended in PBS.

During the above-described experiment, the cell sample was loaded into a sealed 10 mL laboratory tube and pneumatically driven through the device using a software-controlled pressure regulator (MFCSEZ, Fluigent). The driving pressure was 100 mbar for both single-frequency and multi-frequency devices. In the case of the single-frequency device, the electrical networks were excited using a 800 mVpp, 500 kHz sinusoidal signal generated by the lock-in amplifier (HF2LI, Zurich Instruments). For the multi-frequency device, the 500 kHz and 900 kHz sine signals were generated by the lock-in amplifier, whereas the 1300 kHz signal was obtained using a waveform generator (33612A, Keysight), all at 800 mVpp. For both devices, the current outputs of the device were converted to voltages and amplified via transimpedance amplifiers, then passed through differential amplifiers, one for the entry and another for the exit network, before being fed to the lock-in amplifier for demodulation and recording.

The demodulated signal stream produced by the lock-in amplifier was recorded at a sampling rate of 115,000 samples/s. This recording was then passed to our suite of custom algorithms (MATLAB). The first algorithm generates the template library to be used downstream in the signal processing. The second algorithm uses these templates to match the signal waveforms to their corresponding templates (and therefore, channels) and aggregates pertinent information on the identified waveforms such as timestamp, peak signal amplitude (computed from the correlation process), corresponding channel ID and excitation frequency. The third algorithm performs signal amplitude normalization if necessary, computes transit times, discards erroneous values, removes outliers and produces the data used in our peak signal amplitude vs. transit time plots.

Figure 12:
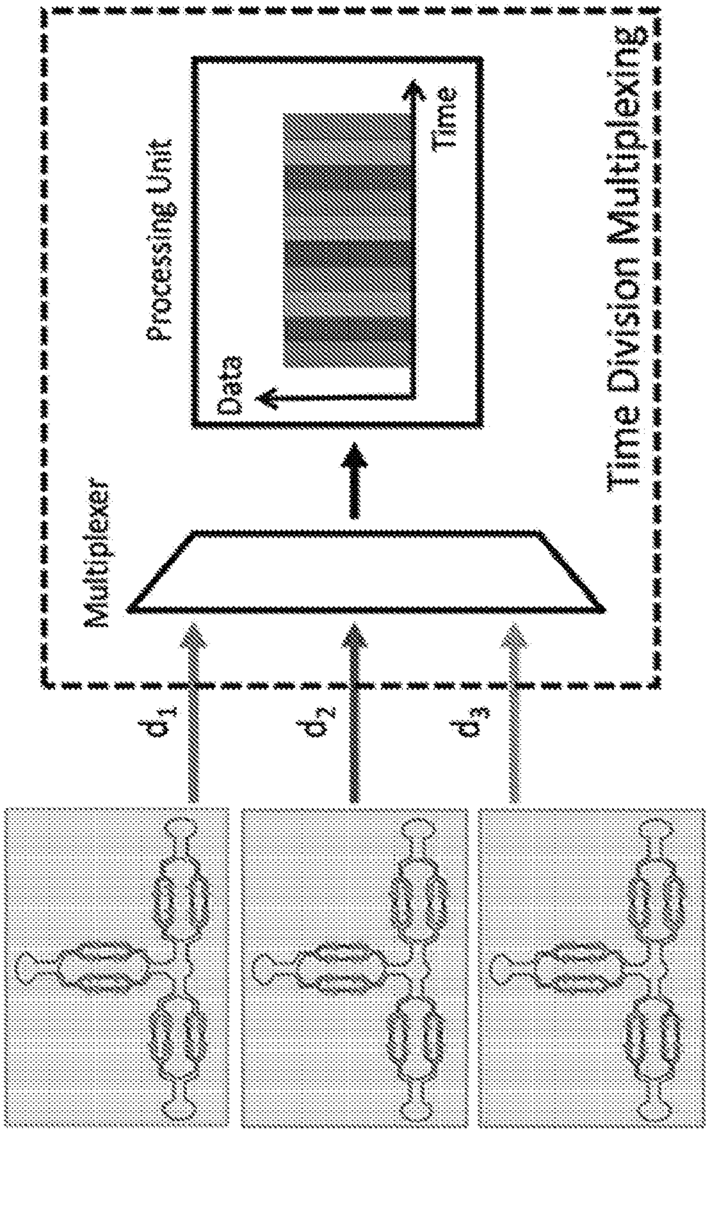
FIG. 12 depicts a schematic diagram of time-division multiplexing as may be implemented with a microfluidic device in accordance with one or more embodiments of the disclosure.

FIG. 12 schematically illustrates time-division multiplexing as may be implemented with a microfluidic device in accordance with one or more embodiments of the disclosure. In an effort to further increase the throughput beyond what may be achieved with frequency multiplexing, time-division multiplexing may be used. This technique allows the use of multiple instances of the frequency multiplexing device, running each of the signal streams (which are the previously described code+frequency multiplexed data) into a multiplexer that samples each of these streams and outputs a single waveform that is essentially an interleaving of all the individual streams. In signal processing, each stream may be untangled, then the frequency and code demultiplexing may be performed as described above.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment. The term "based at least in part on" and "based on" are synonymous terms which may be used interchangeably herein.

What is claimed is:

1. A microfluidic device for cell mechanophenotyping, the microfluidic device comprising:

an inlet; and a plurality of branches, wherein each branch comprises:

an outlet;

a first channel in fluid communication with the inlet and the outlet, the first channel comprising:

a first upstream zone having a first cross-sectional area in a lateral direction perpendicular to a direction of fluid flow through the first channel;

a first downstream zone having a second cross-sectional area in the lateral direction; and a first constriction zone positioned between the first upstream zone and the first downstream zone and having a third cross-sectional area in the lateral direction, the third cross-sectional area being less than each of the first cross-sectional area and the second cross-sectional area;

a second channel arranged in parallel with the first channel and in fluid communication with the inlet and the outlet, the second channel comprising:

a second upstream zone having a fourth cross-sectional area in the lateral direction;

a second downstream zone having a fifth cross-sectional area in the lateral direction; and a second constriction zone positioned between the second upstream zone and the second downstream zone and having a sixth cross-sectional area in the lateral direction, the sixth cross-sectional area being less than each of the fourth cross-sectional area and the fifth cross-sectional area;

a first sensor pair positioned along the first channel, the first sensor pair comprising:

a first entry sensor positioned along the first upstream zone and configured to detect a first cell flowing through the first upstream zone; and a first exit sensor positioned along the first downstream zone and configured to detect the first cell flowing through the first downstream zone; and a second sensor pair positioned along the second channel, the second sensor pair comprising:

a second entry sensor positioned along the second upstream zone and configured to detect a second cell flowing through the second upstream zone; and a second exit sensor positioned along the second downstream zone and configured to detect the second cell flowing through the second downstream zone;

wherein the first entry sensor comprises a first plurality of electrodes having a first electrode configuration, wherein the first exit sensor comprises a second plurality of electrodes having the first electrode configuration, wherein the second entry sensor comprises a third plurality of electrodes having a second electrode configuration different from the first electrode configuration, and wherein the second exit sensor comprises a fourth plurality of electrodes having the second electrode configuration;

wherein having the second electrode configuration different from the first electrode configuration enables assignment of a unique identifier to each of the first channel and the second channel.

2. The microfluidic device of claim 1, wherein the first entry sensor is further configured to generate a first entry sensor waveform in response to detecting the first cell flowing through the first upstream zone, wherein the first exit sensor is further configured to generate a first exit sensor waveform in response to detecting the first cell flowing through the first downstream zone, wherein the first entry sensor waveform comprises a first sensor code corresponding to the first channel, wherein the first exit sensor waveform comprises the first sensor code, wherein the second entry sensor is further configured to generate a second entry sensor waveform in response to detecting the second cell flowing through the second upstream zone, wherein the second exit sensor is further configured to generate a second exit sensor waveform in response to detecting the second cell flowing through the second downstream zone, wherein the second entry sensor waveform comprises a second sensor code corresponding to the second channel, and wherein the second exit sensor waveform comprises the second sensor code.

3. The microfluidic device of claim 2, further comprising a lock-in amplifier configured to generate an excitation signal for exciting the first sensor pair and the second sensor pair, wherein the lock-in amplifier is further configured to:

receive an output signal comprising the first entry sensor waveform, the first exit sensor waveform, the second entry sensor waveform, and the second exit sensor waveform; and demodulate the output signal.

4. The microfluidic device of claim 3, further comprising a processing unit configured to:

receive the demodulated output signal;

determine, based at least in part on the demodulated output signal, a first cell transit time for the first cell; and determine, based at least in part on the demodulated output signal, a second cell transit time for the second cell.

5. The microfluidic device of claim 4, wherein the processing unit is further configured to:

determine, based at least in part on the demodulated output signal, a first cell size of the first cell; and determine, based at least in part on the demodulated output signal, a second cell size of the second cell.

6. The microfluidic device of claim 1, further comprising:

a first plurality of protrusions extending into the first constriction zone; and a second plurality of protrusions extending into the second constriction zone.

7. The microfluidic device of claim 1, further comprising a substrate and a microfluidic layer attached to one another, wherein the first sensor pair and the second sensor pair are positioned on the substrate, and wherein the first channel and the second channel are at least partially defined in the microfluidic layer.

8. The microfluidic device of claim 1, further comprising a feed channel extending from the inlet and in fluid communication with the first channel and the second channel.

9. The microfluidic device of claim 8, wherein the feed channel comprises:

a third upstream zone having a seventh cross-sectional area in the lateral direction, the seventh cross-sectional area being greater than each of the first cross-sectional area and the fourth cross-sectional area;

a third downstream zone having an eighth cross-sectional area in the lateral direction; and an expansion zone positioned between the third upstream zone and the third downstream zone and having a ninth cross-sectional area in the lateral direction, the ninth cross-sectional area being greater than each of the seventh cross-sectional area and the eighth cross-sectional area.

10. The microfluidic device of claim 8, wherein the feed channel comprises:

a third upstream zone having a linear shape;

a third downstream zone having a linear shape; and an inertial focuser positioned between the third upstream zone and the third downstream zone and having a contoured shape configured to inhibit cell overlap in the lateral direction.

11. The microfluidic device of claim 8, further comprising a plurality of protrusions extending vertically into the feed channel and configured to inhibit cell overlap in a vertical direction.

12. The microfluidic device of claim 8, further comprising a plurality of micropillars extending into the feed channel and configured to direct cells to one of the first channel or the second channel based on cell size.

13. The microfluidic device of claim 1, wherein the microfluidic device comprises three branches.

14. A method for cell mechanophenotyping, the method comprising:

flowing a solution comprising a plurality of cells through a microfluidic device of claim 1.

15. The method of claim 14, further comprising:

generating, via the first entry sensor, a first entry sensor waveform in response to detecting the first cell flowing through the first upstream zone, wherein the first entry sensor waveform comprises a first sensor code corresponding to the first channel;

generating, via the first exit sensor, a first exit sensor waveform in response to detecting the first cell flowing through the first downstream zone, wherein the first exit sensor waveform comprises the first sensor code;

generating, via the second entry sensor, a second entry sensor waveform in response to detecting the second cell flowing through the second upstream zone, wherein the second entry sensor waveform comprises a second sensor code corresponding to the second channel; and generating, via the second exit sensor, a second exit sensor waveform in response to detecting the second cell flowing through the second downstream zone, wherein the second exit sensor waveform comprises the second sensor code.

16. The method of claim 15, further comprising:

generating, via a lock-in amplifier, an excitation signal for exciting the first entry sensor, the first exit sensor, the second entry sensor, and the second exit sensor;

receiving, via the lock-in amplifier, an output signal comprising the first entry sensor waveform, the first exit sensor waveform, the second entry sensor waveform, and the second exit sensor waveform; and demodulating, via the lock-in amplifier, the output signal.

17. The method of claim 16, further comprising:

receiving, via a processing unit, the demodulated output signal;

determining, via the processing unit and based at least in part on the demodulated output signal, a first cell transit time for the first cell; and determining, via the processing unit and based at least in part on the demodulated output signal, a second cell transit time for the second cell.

18. The method of claim 17, wherein:

determining the first cell transit time comprises determining the first cell transit time based at least in part on a first entry timestamp associated with the first entry sensor waveform and a first exit timestamp associated with the first exit sensor waveform; and determining the second cell transit time comprises determining the second cell transit time based at least in part on a second entry timestamp associated with the second entry sensor waveform and a second exit timestamp associated with the second exit sensor waveform.

19. The method of claim 17, further comprising:

determining, via the processing unit and based at least in part on the demodulated output signal, a first cell size of the first cell; and determining, via the processing unit and based at least in part on the demodulated output signal, a second cell size of the second cell.

20. The method of claim 14, wherein the first entry sensor does not detect the first cell flowing through the first constriction zone, wherein the first exit sensor does not detect the first cell flowing through the first constriction zone, wherein the second entry sensor does not detect the second cell flowing through the second constriction zone, and wherein the second exit sensor does not detect the second cell flowing through the second constriction zone.

* * * * *